United States Patent
Torii et al.

(10) Patent No.: US 8,570,582 B2
(45) Date of Patent: *Oct. 29, 2013

(54) IMAGE FORMING APPARATUS, IMAGE FORMING APPARATUS UTILIZATION SYSTEM, AND METHOD FOR GENERATING IMAGE DATA

(71) Applicants: Osamu Torii, Chiba (JP); Hiroki Hiraguchi, Tokyo (JP)

(72) Inventors: Osamu Torii, Chiba (JP); Hiroki Hiraguchi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,746

(22) Filed: Nov. 13, 2012

(65) Prior Publication Data
US 2013/0094059 A1 Apr. 18, 2013

Related U.S. Application Data

(63) Continuation of application No. 12/805,504, filed on Aug. 3, 2010, now Pat. No. 8,339,648.

(30) Foreign Application Priority Data

Aug. 31, 2009 (JP) ................................ 2009-200617

(51) Int. Cl.
G06F 15/00 (2006.01)
(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS 8,339,648 B2 * 12/2012 Torii et al. .................... 358/1.15
2008/0174790 A1 7/2008 Noguchi et al.

FOREIGN PATENT DOCUMENTS

JP 2003087479 A 3/2003

* cited by examiner

Primary Examiner — Saeid Ebrahimi Dehkordy
(74) Attorney, Agent, or Firm — Harness, Dickey & Pierce, P.L.C.

(57) ABSTRACT

An image forming apparatus including an acquisition unit configured to acquire a plurality of combinations of document reading settings and delivery destination information of image data from a storage device configured to store the plurality of combinations, a reception unit configured to display the plurality of combinations acquired by the acquisition unit and receive a selection of the plurality of combinations by a user, a duplication identification unit configured to determine, upon the reception unit receiving the selection, whether the selected plurality of combinations contain duplicated delivery destination information, and a control unit configured to control, upon the duplication identification unit determining that the selected plurality of combinations selected contain the duplicated delivery destination information, a transmission of image data such that the image data is transmitted once to a delivery destination corresponding to the duplicated delivery destination information.

20 Claims, 42 Drawing Sheets

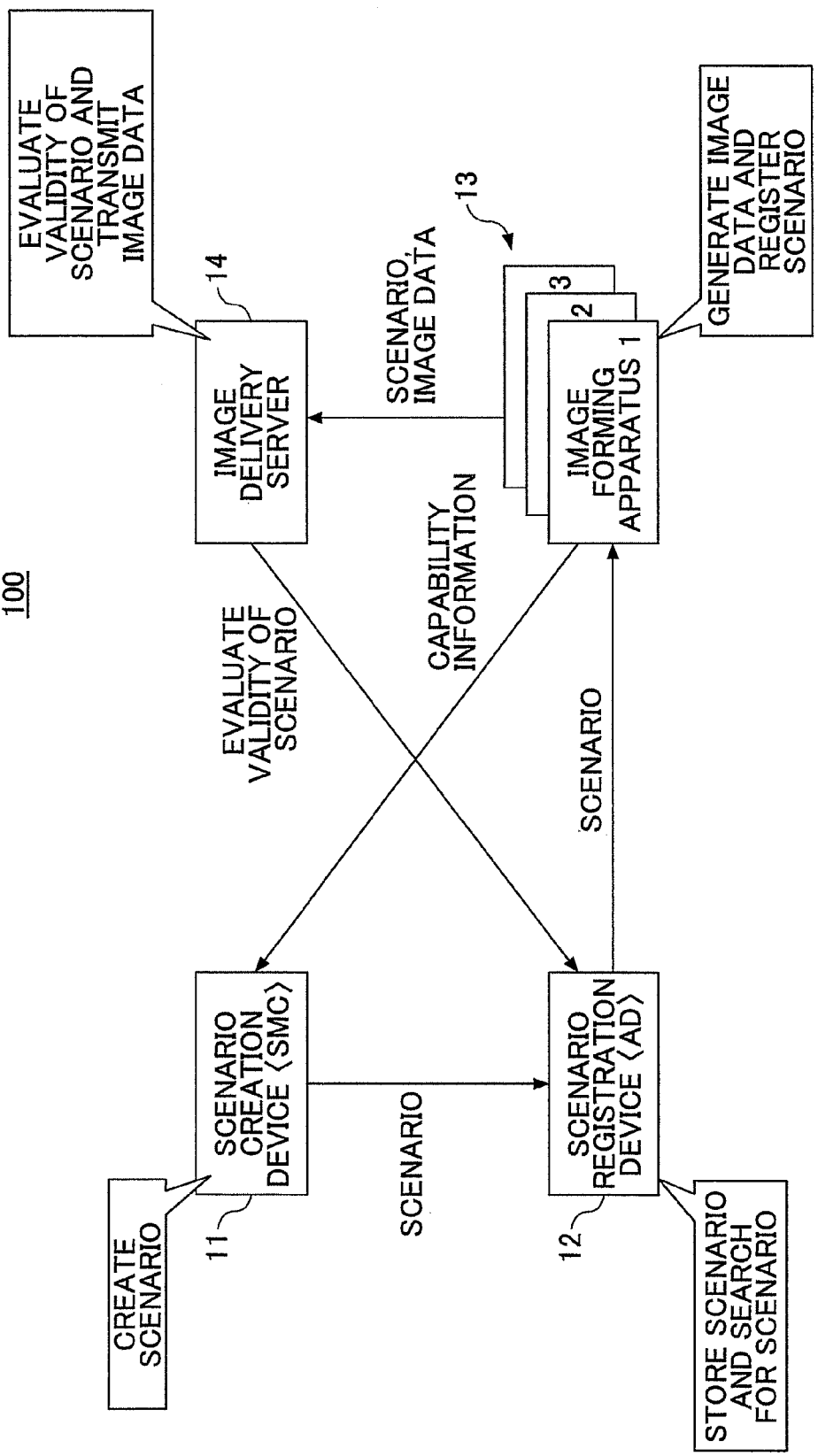

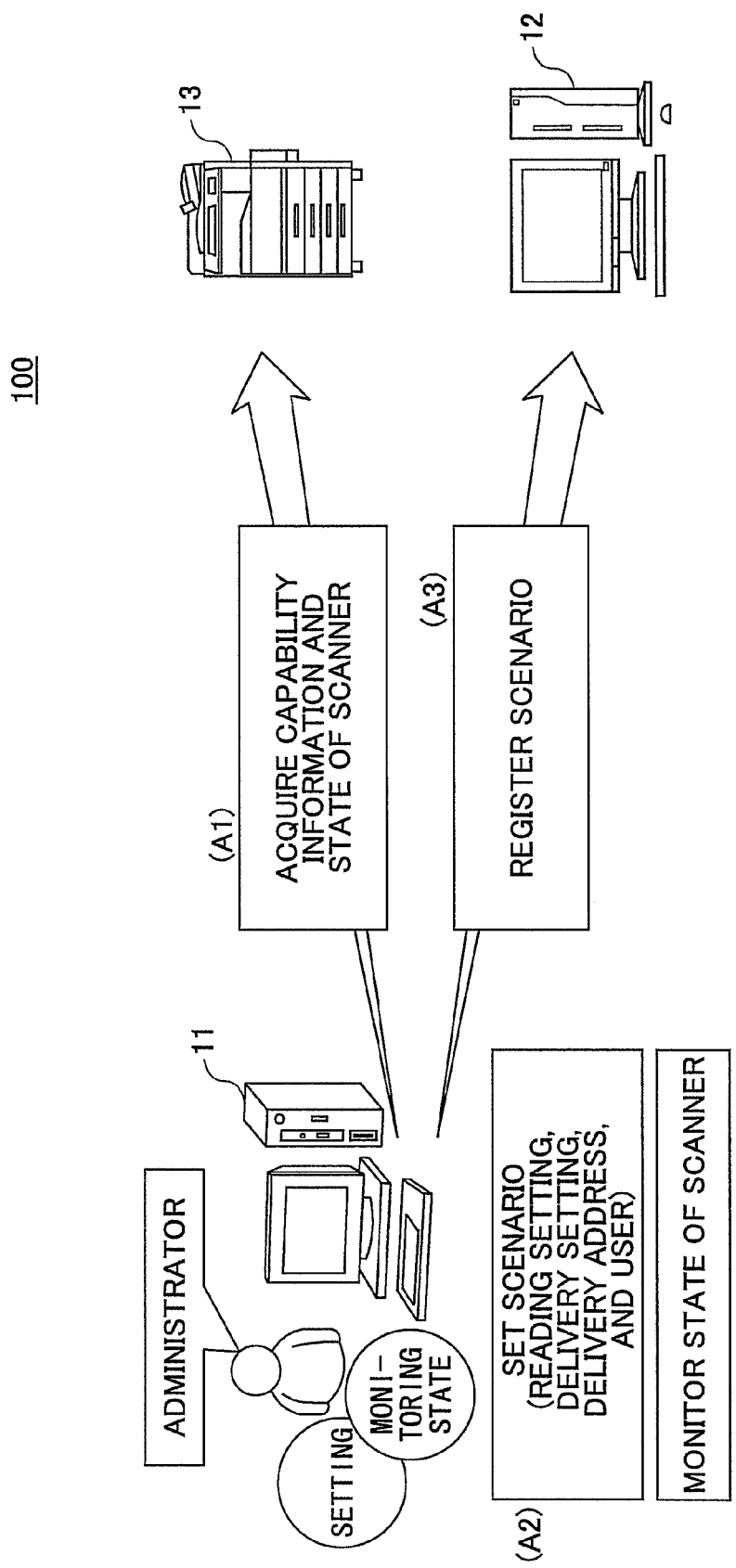

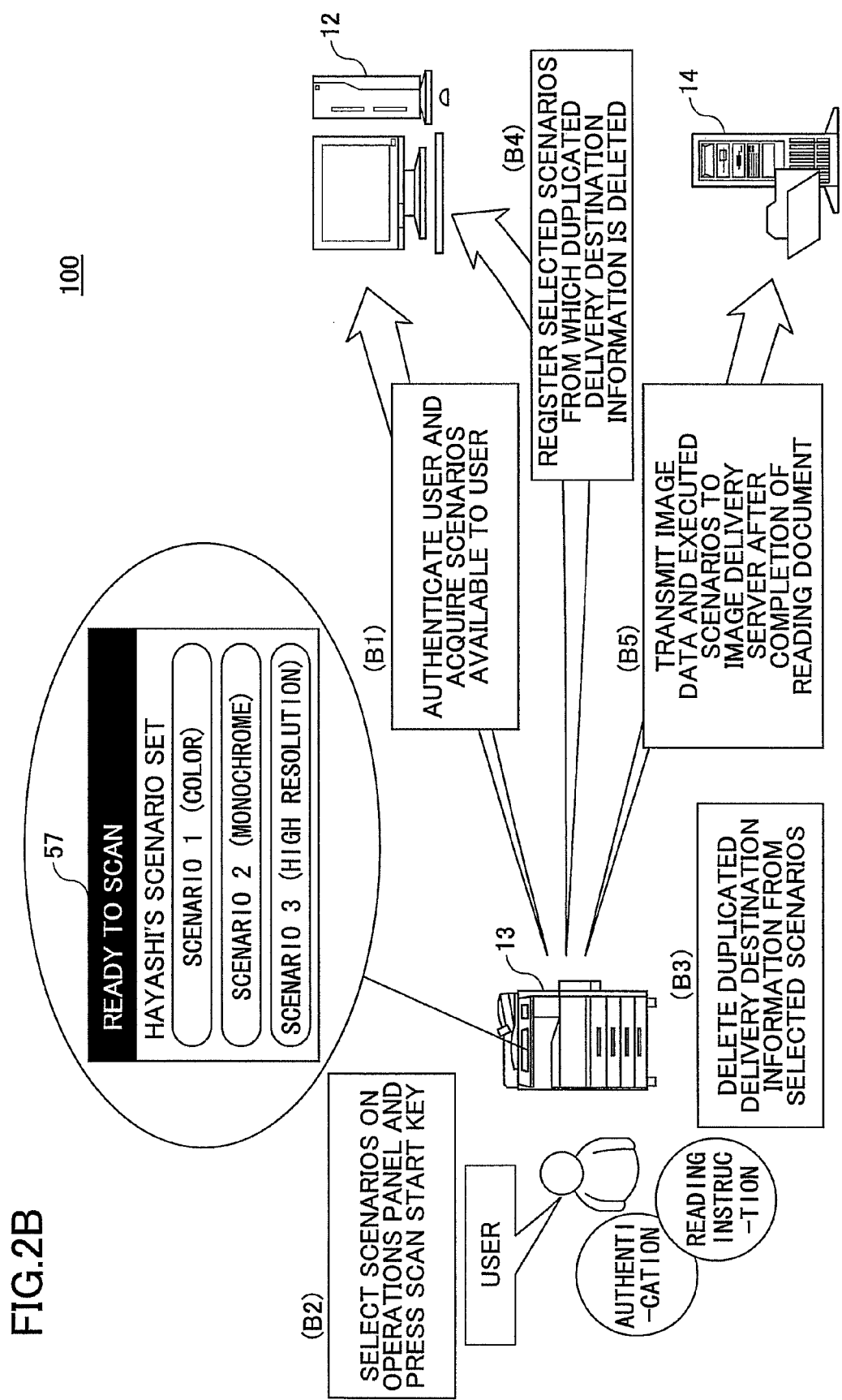

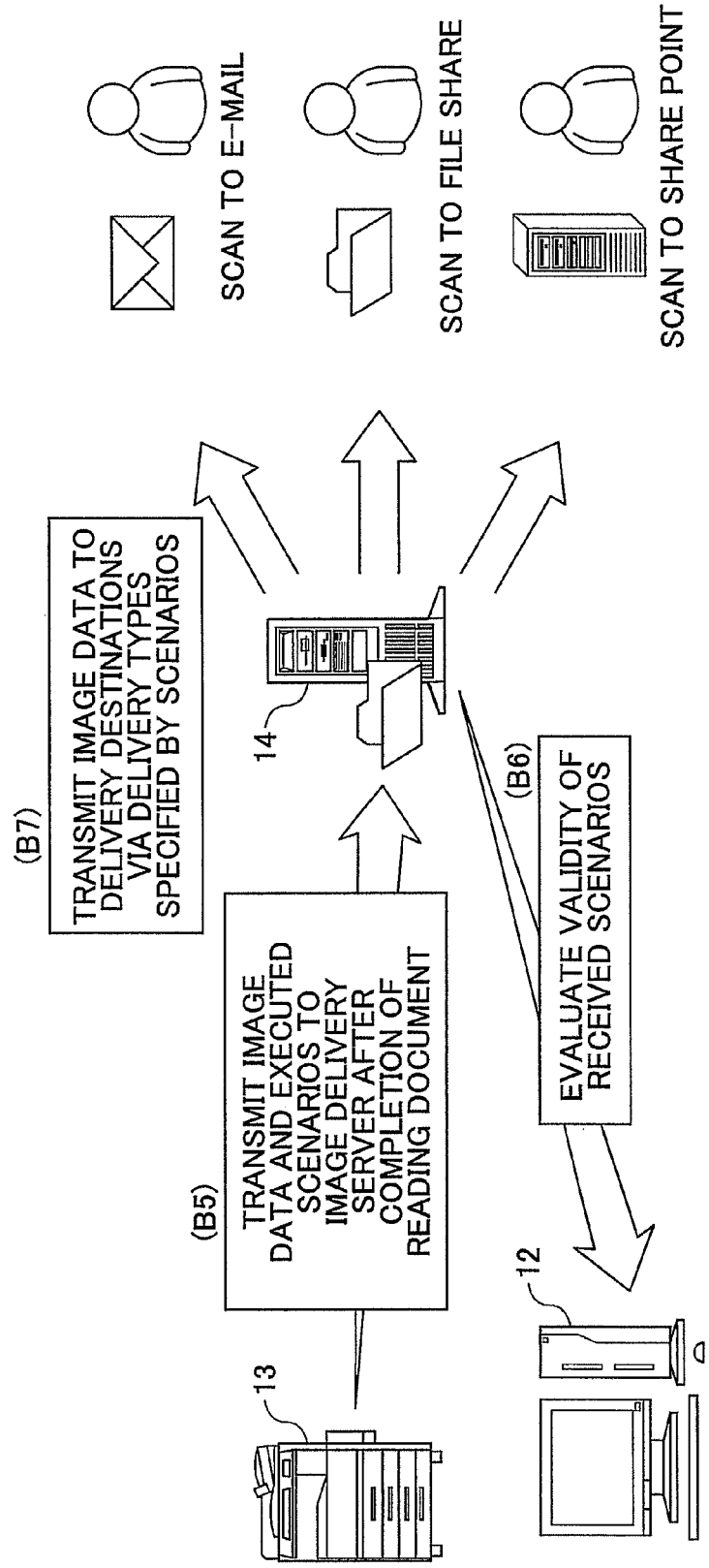

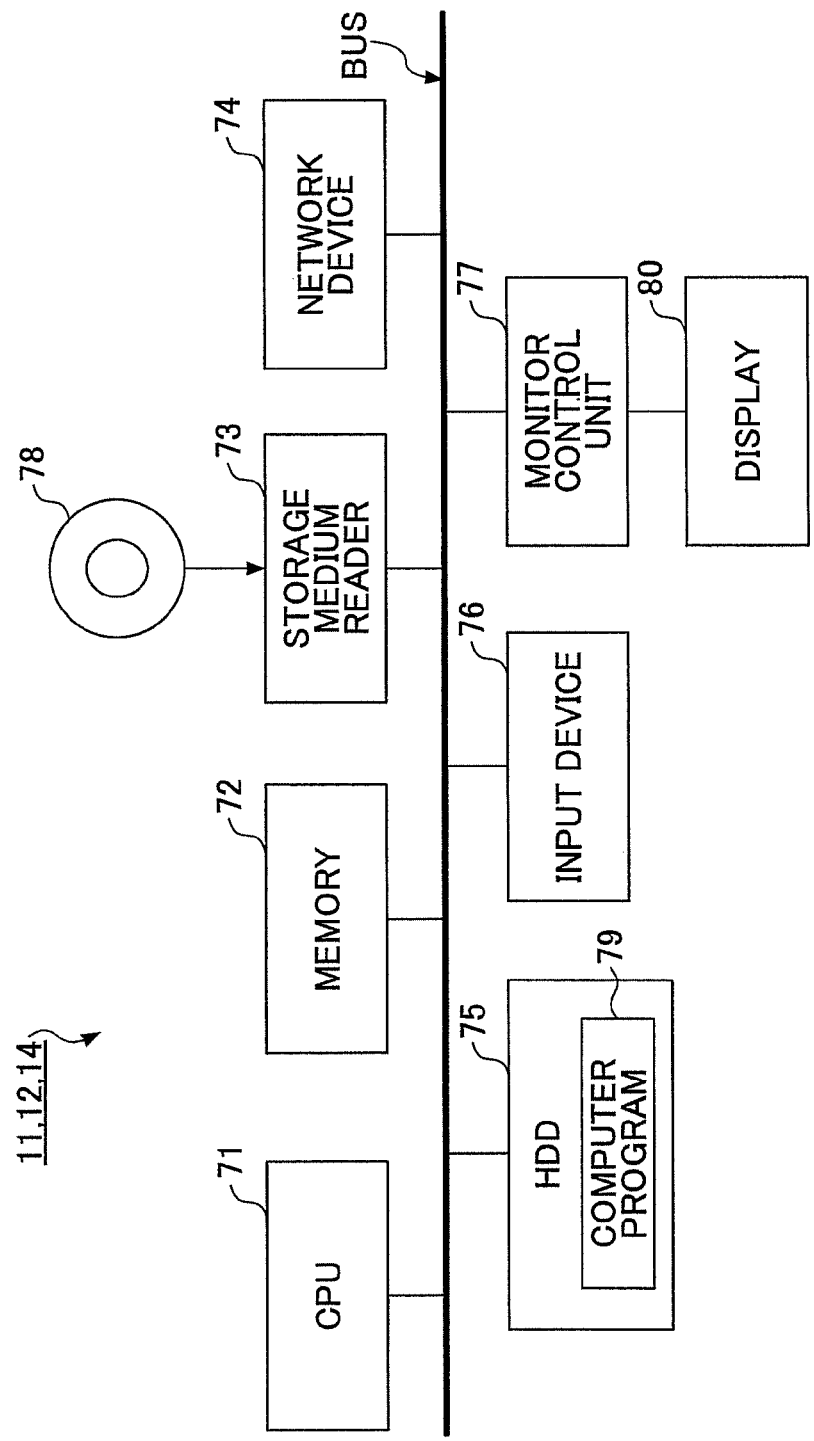

FIG.5

| | READING SETTING | | | | DELIVERY SETTING | | USER NAME | PASSWORD | MODEL | APPARATUS IDENTIFIER |
|---|---|---|---|---|---|---|---|---|---|---|
| | RESOLUTION | DENSITY | COLOR MODE | PAPER SIZE | DELIVERY TYPE | DELIVERY ADDRESS | | | | |
| SCENARIO 1 | 200 dpi | AUTO-DENSITY | FULL COLOR | A4SEF | E-MAIL | AAA@aaa BBB@bbb | AAA DDD EEE | ****** | MFP-A | 111111 |
| SCENARIO 2 | 600 dpi | HIGH | MONOCHROME | B4SEF | E-MAIL | BBB@bbb CCC@ccc | BBB | **** | MFP-A | 222222 |
| SCENARIO 3 | 100 dpi | MODERATE | MONOCHROME | A3SEF | FTP | DDD/ddd | CCC | ***** | MFP-B | 333333 |

FIG.7A

| REGISTERED ITEM / REGISTERED SCENARIO | READING SETTING | | | | DELIVERY SETTING | |
|---|---|---|---|---|---|---|
| | RESOLUTION | DENSITY | COLOR MODE | PAPER SIZE | DELIVERY TYPE | DELIVERY ADDRESS |
| SCENARIO 1 | 200 dpi | AUTO-DENSITY | FULL COLOR | A4SEF | E-MAIL | AAA@aaa BBB@bbb |

FIG.7B

| REGISTERED ITEM / REGISTERED SCENARIO | READING SETTING | | | | DELIVERY SETTING | |
|---|---|---|---|---|---|---|
| | RESOLUTION | DENSITY | COLOR MODE | PAPER SIZE | DELIVERY TYPE | DELIVERY ADDRESS |
| SCENARIO 1 | 200 dpi | AUTO-DENSITY | FULL COLOR | A4SEF | E-MAIL | AAA@aaa |

FIG.7C

| REGISTERED SCENARIO \ REGISTERED ITEM | READING SETTING | | | | DELIVERY SETTING | |
|---|---|---|---|---|---|---|
| | RESOLUTION | DENSITY | COLOR MODE | PAPER SIZE | DELIVERY TYPE | DELIVERY ADDRESS |
| SCENARIO 1 | 200 dpi | AUTO-DENSITY | FULL COLOR | A4SEF | E-MAIL | AAA@aaa BBB@bbb |
| SCENARIO 2 | 600 dpi | HIGH | MONOCHROME | B4SEF | E-MAIL | BBB@bbb CCC@ccc |
| SCENARIO 3 | 100 dpi | MODERATE | MONOCHROME | A3SEF | FTP | DDD/ddd |
| SCENARIO 1' | 200 dpi | AUTO-DENSITY | FULL COLOR | A4SEF | E-MAIL | AAA@aaa |

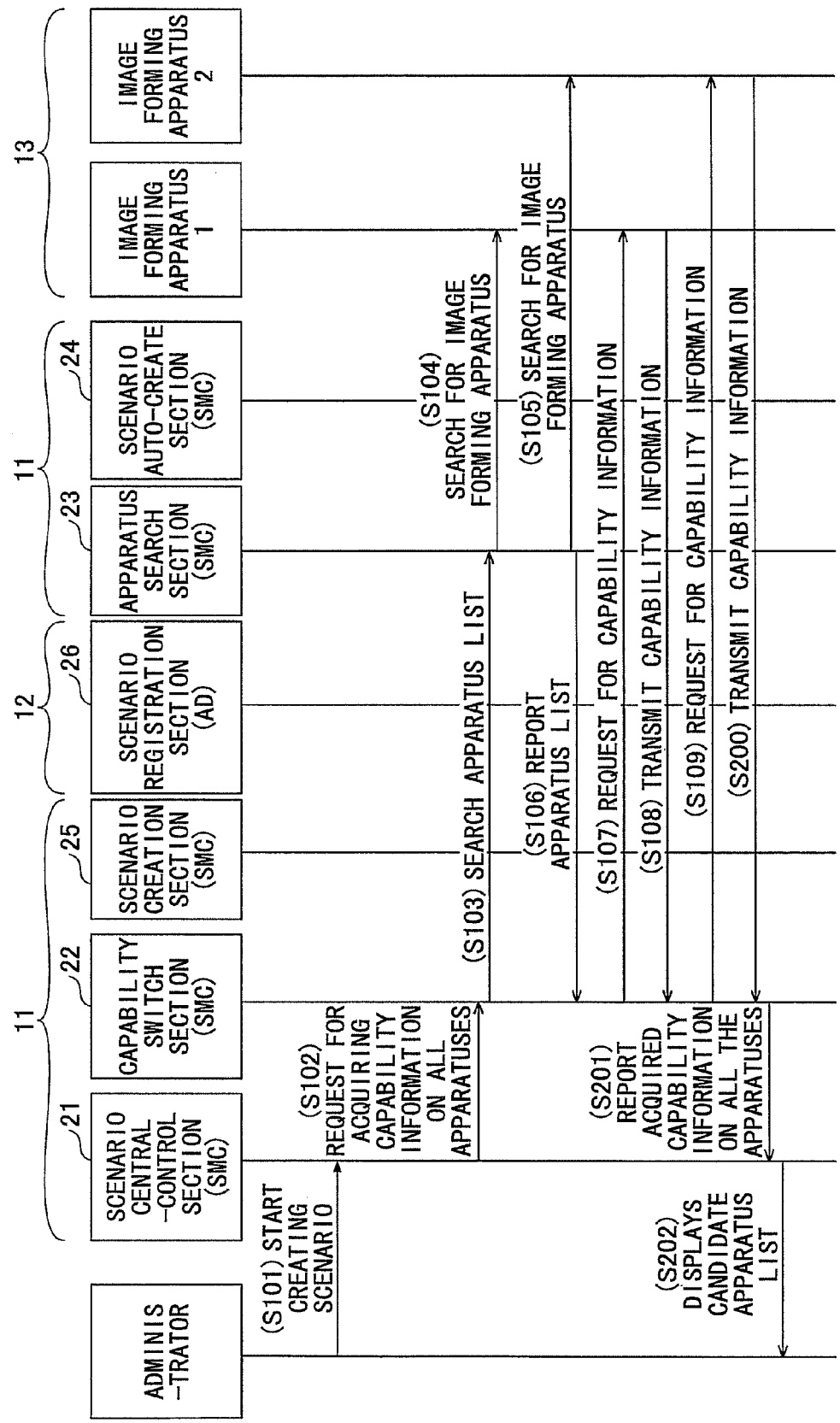

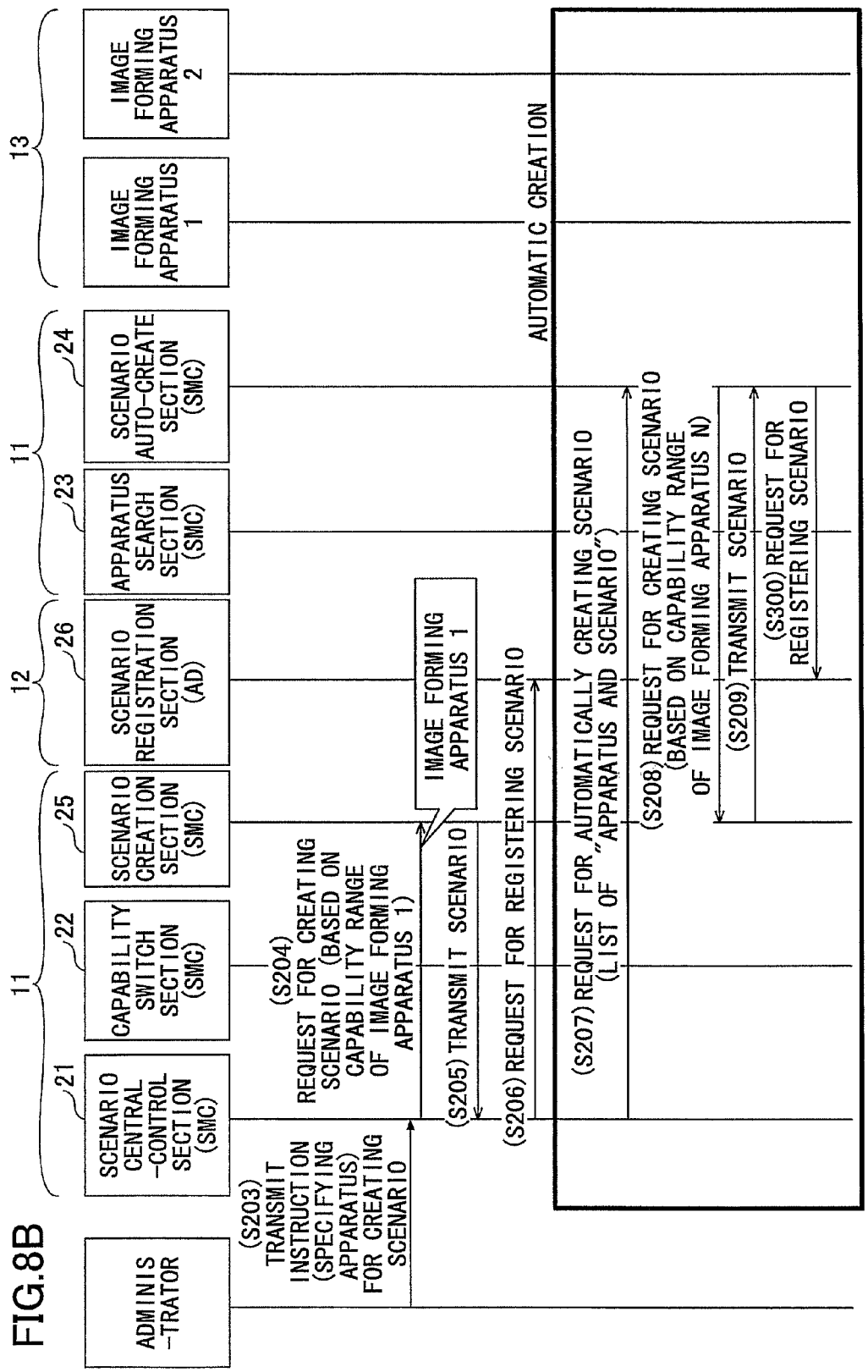

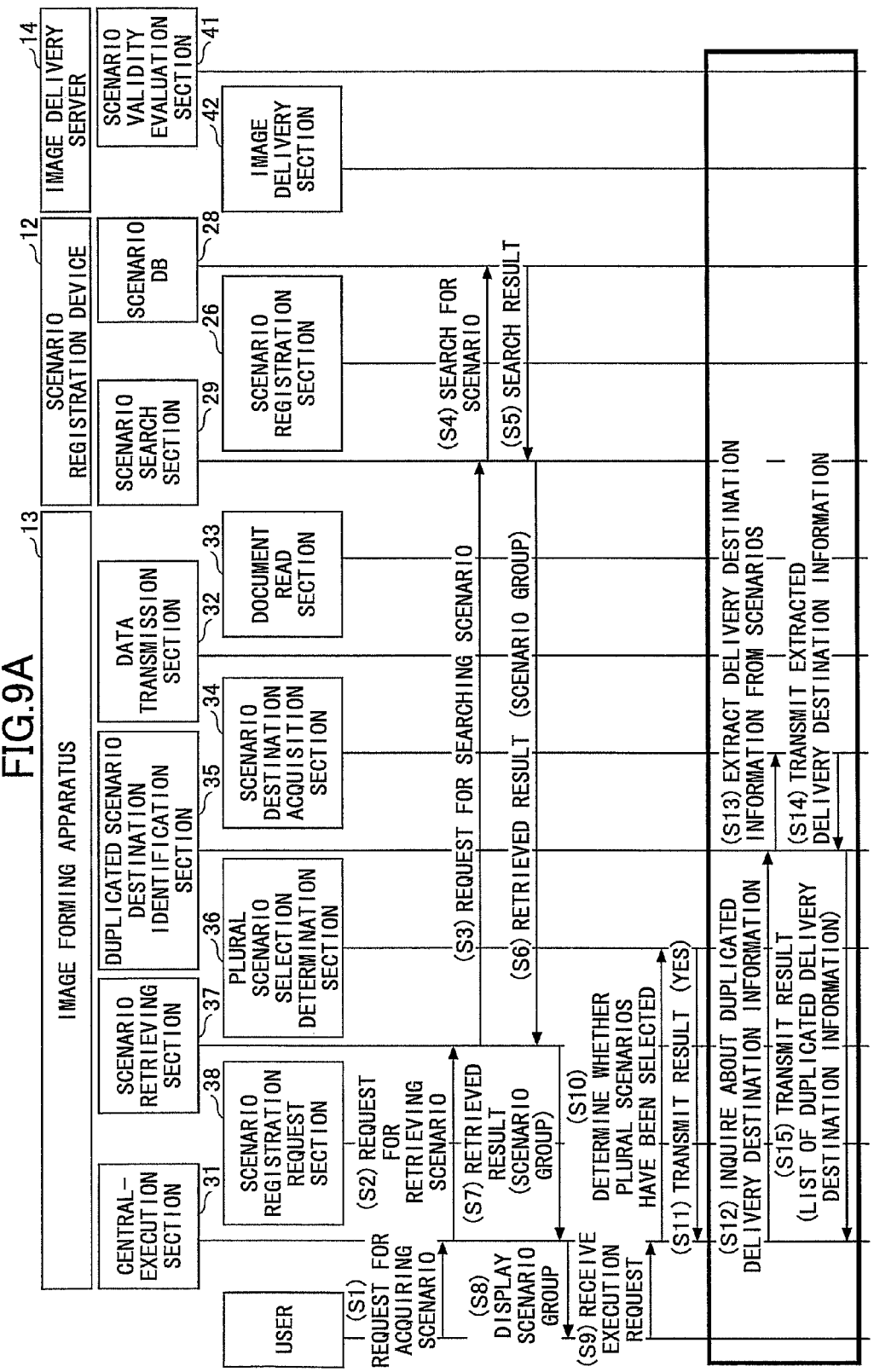

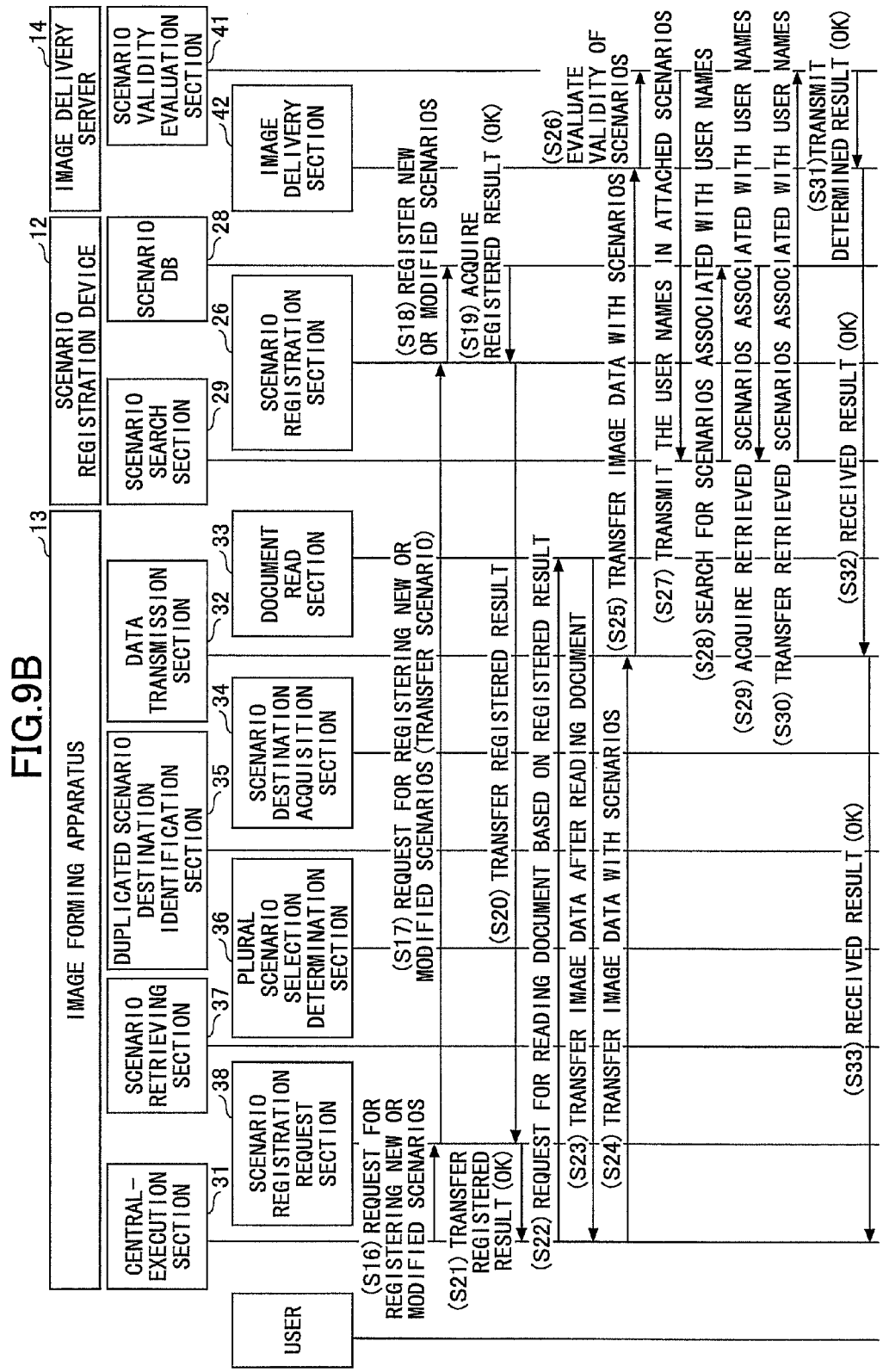

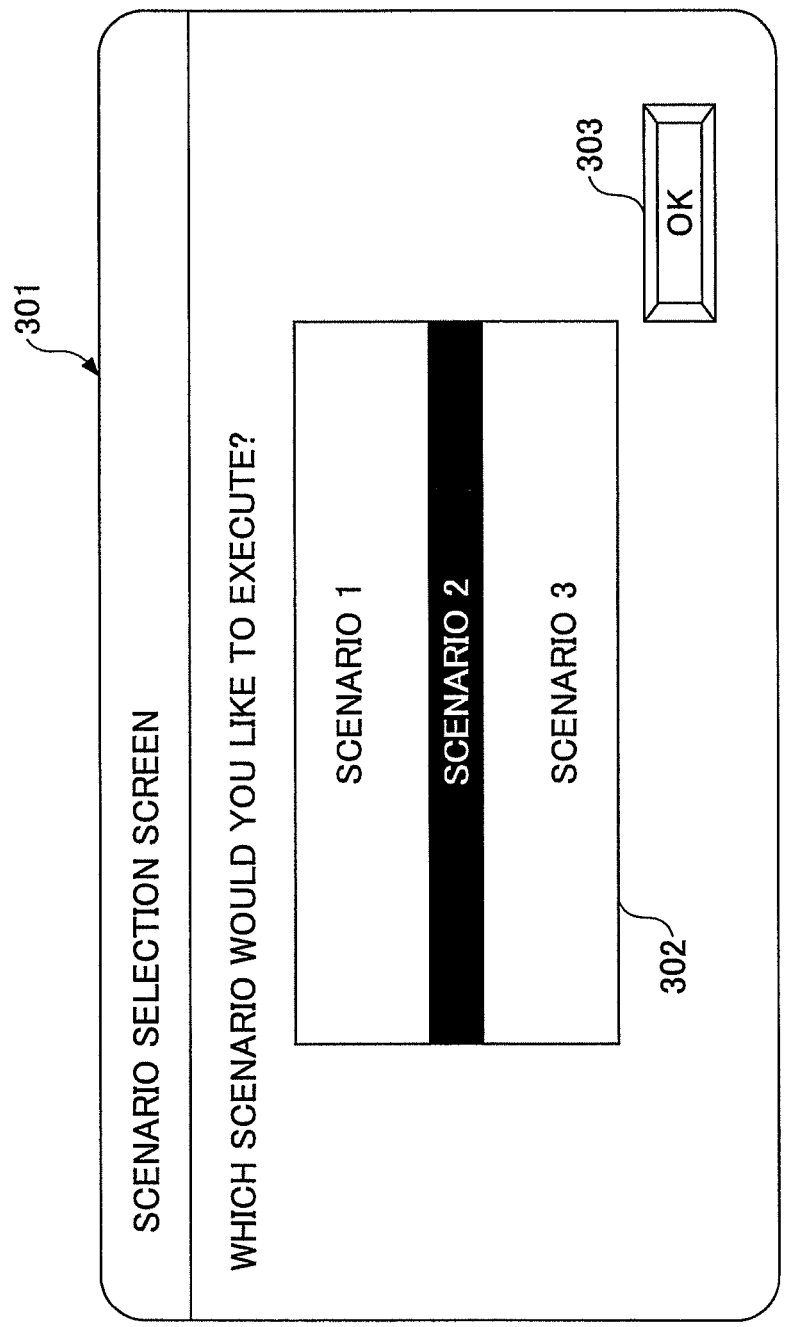

FIG.11

| REGISTERED ITEM / REGISTERED SCENARIO | READING SETTING | | | | | DELIVERY SETTING | |
|---|---|---|---|---|---|---|---|
| | RESOLUTION | DENSITY | COLOR MODE | PAPER SIZE | | DELIVERY TYPE | DELIVERY ADDRESS |
| SCENARIO 1 | 200 dpi | AUTO-DENSITY | FULL COLOR | A4SEF | | E-MAIL | AAA@aaa BBB@bbb |
| SCENARIO 2 | 600 dpi | HIGH | MONOCHROME | B4SEF | | E-MAIL | BBB@bbb CCC@ccc |
| SCENARIO 3 | 100 dpi | MODERATE | MONOCHROME | A3SEF | | FTP | DDD/ddd |

FIG.12A

| REGISTERED ITEM / REGISTERED SCENARIO | READING SETTING | | | | DELIVERY SETTING | |
|---|---|---|---|---|---|---|
| | RESOLUTION | DENSITY | COLOR MODE | PAPER SIZE | DELIVERY TYPE | DELIVERY ADDRESS |
| SCENARIO 1 | 200 dpi | AUTO-DENSITY | FULL COLOR | A4SEF | E-MAIL | AAA@aaa BBB@bbb |
| SCENARIO 2' | 600 dpi | HIGH | MONOCHROME | B4SEF | E-MAIL | CCC@ccc |
| SCENARIO 3 | 100 dpi | MODERATE | MONOCHROME | A3SEF | FTP | DDD/ddd |

FIG.12B

| REGISTERED ITEM / REGISTERED SCENARIO | READING SETTING | | | | DELIVERY SETTING | |
|---|---|---|---|---|---|---|
| | RESOLUTION | DENSITY | COLOR MODE | PAPER SIZE | DELIVERY TYPE | DELIVERY ADDRESS |
| SCENARIO 1 | 200 dpi | AUTO-DENSITY | FULL COLOR | A4SEF | E-MAIL | AAA@aaa BBB@bbb |
| SCENARIO 3 | 100 dpi | MODERATE | MONOCHROME | A3SEF | FTP | DDD/ddd |

FIG.12C

| REGISTERED ITEM / REGISTERED SCENARIO | READING SETTING | | | | DELIVERY SETTING | |
|---|---|---|---|---|---|---|
| | RESOLUTION | DENSITY | COLOR MODE | PAPER SIZE | DELIVERY TYPE | DELIVERY ADDRESS |
| SCENARIO 1-1 | 200 dpi | AUTO-DENSITY | FULL COLOR | A4SEF | E-MAIL | AAA@aaa |
| SCENARIO 2-1 | 600 dpi | HIGH | MONOCHROME | B4SEF | E-MAIL | CCC@ccc |
| SCENARIO 3 | 100 dpi | MODERATE | MONOCHROME | A3SEF | FTP | DDD/ddd |
| SCENARIO 2-2 | 600 dpi | HIGH | MONOCHROME | B4SEF | E-MAIL | BBB@bbb |

FIG.13

BEFORE REGISTRATION

| REGISTERED ITEM / REGISTERED SCENARIO | READING SETTING | | | | DELIVERY SETTING | |
|---|---|---|---|---|---|---|
| | RESOLUTION | DENSITY | COLOR MODE | PAPER SIZE | DELIVERY TYPE | DELIVERY ADDRESS |
| SCENARIO 1 | 200 dpi | AUTO-DENSITY | FULL COLOR | A4SEF | E-MAIL | AAA@aaa BBB@bbb |
| SCENARIO 2 | 600 dpi | HIGH | MONOCHROME | B4SEF | E-MAIL | BBB@bbb CCC@ccc |
| SCENARIO 3 | 100 dpi | MODERATE | MONOCHROME | A3SEF | FTP | DDD/ddd |

AFTER REGISTRATION

| REGISTERED ITEM / REGISTERED SCENARIO | READING SETTING | | | | DELIVERY SETTING | |
|---|---|---|---|---|---|---|
| | RESOLUTION | DENSITY | COLOR MODE | PAPER SIZE | DELIVERY TYPE | DELIVERY ADDRESS |
| SCENARIO 1 | 200 dpi | AUTO-DENSITY | FULL COLOR | A4SEF | E-MAIL | AAA@aaa BBB@bbb |
| SCENARIO 2 | 600 dpi | HIGH | MONOCHROME | B4SEF | E-MAIL | BBB@bbb CCC@ccc |
| SCENARIO 3 | 100 dpi | MODERATE | MONOCHROME | A3SEF | FTP | DDD/ddd |
| SCENARIO 2' | 600 dpi | HIGH | MONOCHROME | B4SEF | E-MAIL | CCC@ccc |

FIG.14

BEFORE REGISTRATION

| REGISTERED ITEM / REGISTERED SCENARIO | READING SETTING | | | | DELIVERY SETTING | |
|---|---|---|---|---|---|---|
| | RESOLUTION | DENSITY | COLOR MODE | PAPER SIZE | DELIVERY TYPE | DELIVERY ADDRESS |
| SCENARIO 1 | 200 dpi | AUTO-DENSITY | FULL COLOR | A4SEF | E-MAIL | AAA@aaa BBB@bbb |
| SCENARIO 2 | 600 dpi | HIGH | MONOCHROME | B4SEF | E-MAIL | BBB@bbb CCC@ccc |
| SCENARIO 3 | 100 dpi | MODERATE | MONOCHROME | A3SEF | FTP | DDD/ddd |

AFTER REGISTRATION

| REGISTERED ITEM / REGISTERED SCENARIO | READING SETTING | | | | DELIVERY SETTING | |
|---|---|---|---|---|---|---|
| | RESOLUTION | DENSITY | COLOR MODE | PAPER SIZE | DELIVERY TYPE | DELIVERY ADDRESS |
| SCENARIO 1 | 200 dpi | AUTO-DENSITY | FULL COLOR | A4SEF | E-MAIL | AAA@aaa BBB@bbb |
| SCENARIO 2 | 600 dpi | HIGH | MONOCHROME | B4SEF | E-MAIL | BBB@bbb CCC@ccc |
| SCENARIO 3 | 100 dpi | MODERATE | MONOCHROME | A3SEF | FTP | DDD/ddd |
| SCENARIO 1-1 | 200 dpi | AUTO-DENSITY | FULL COLOR | A4SEF | E-MAIL | AAA@aaa |
| SCENARIO 2-1 | 600 dpi | HIGH | MONOCHROME | B4SEF | E-MAIL | CCC@ccc |
| SCENARIO 2-2 | 600 dpi | HIGH | MONOCHROME | B4SEF | E-MAIL | BBB@bbb |

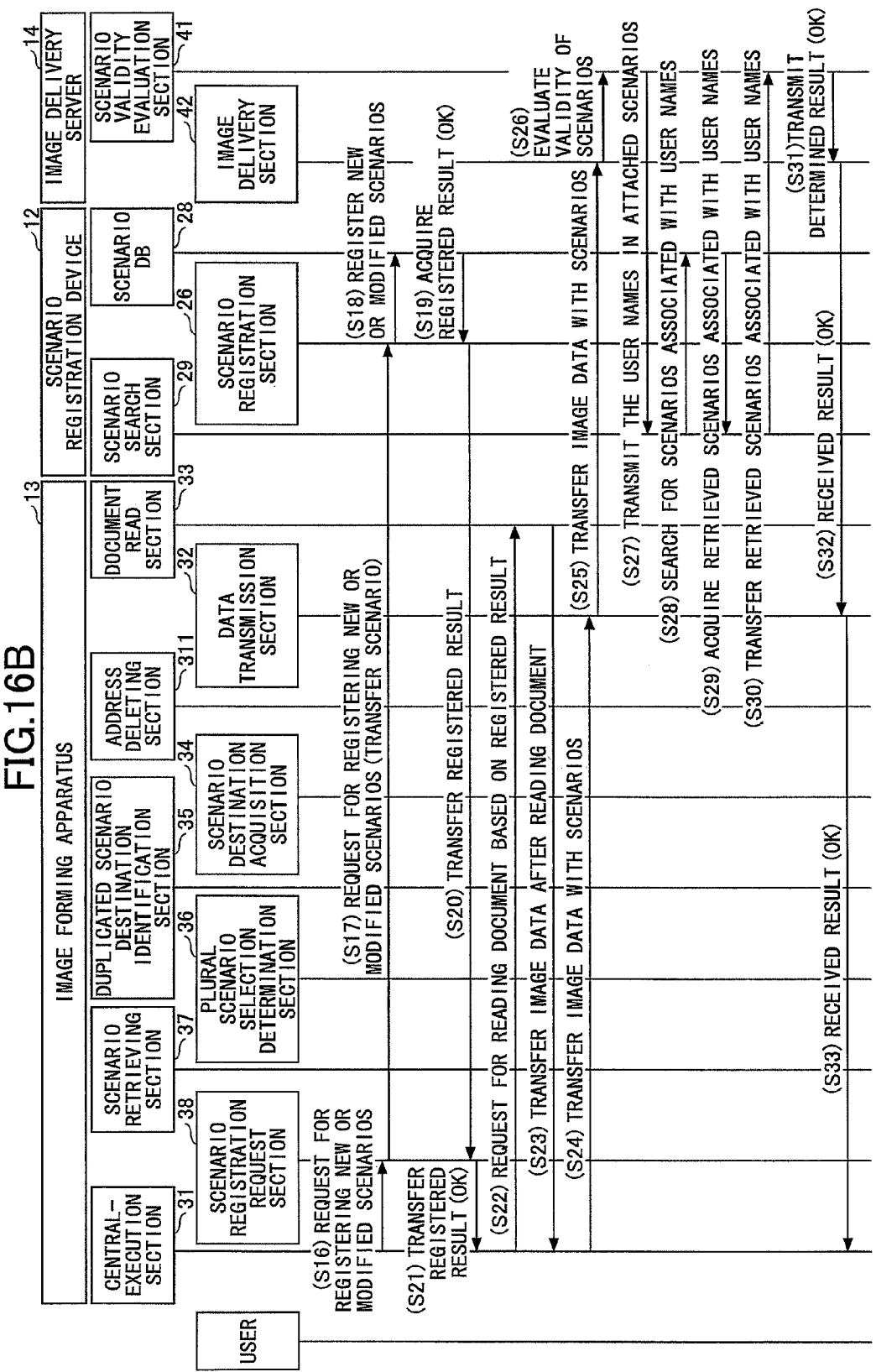

FIG.18

| ORDER OF SELECTION | SCENARIO'S SEQUENTIAL NUMBER |
|---|---|
| 1 | SCENARIO 1 |
| 2 | SCENARIO 2 |
| 3 | SCENARIO 3 |

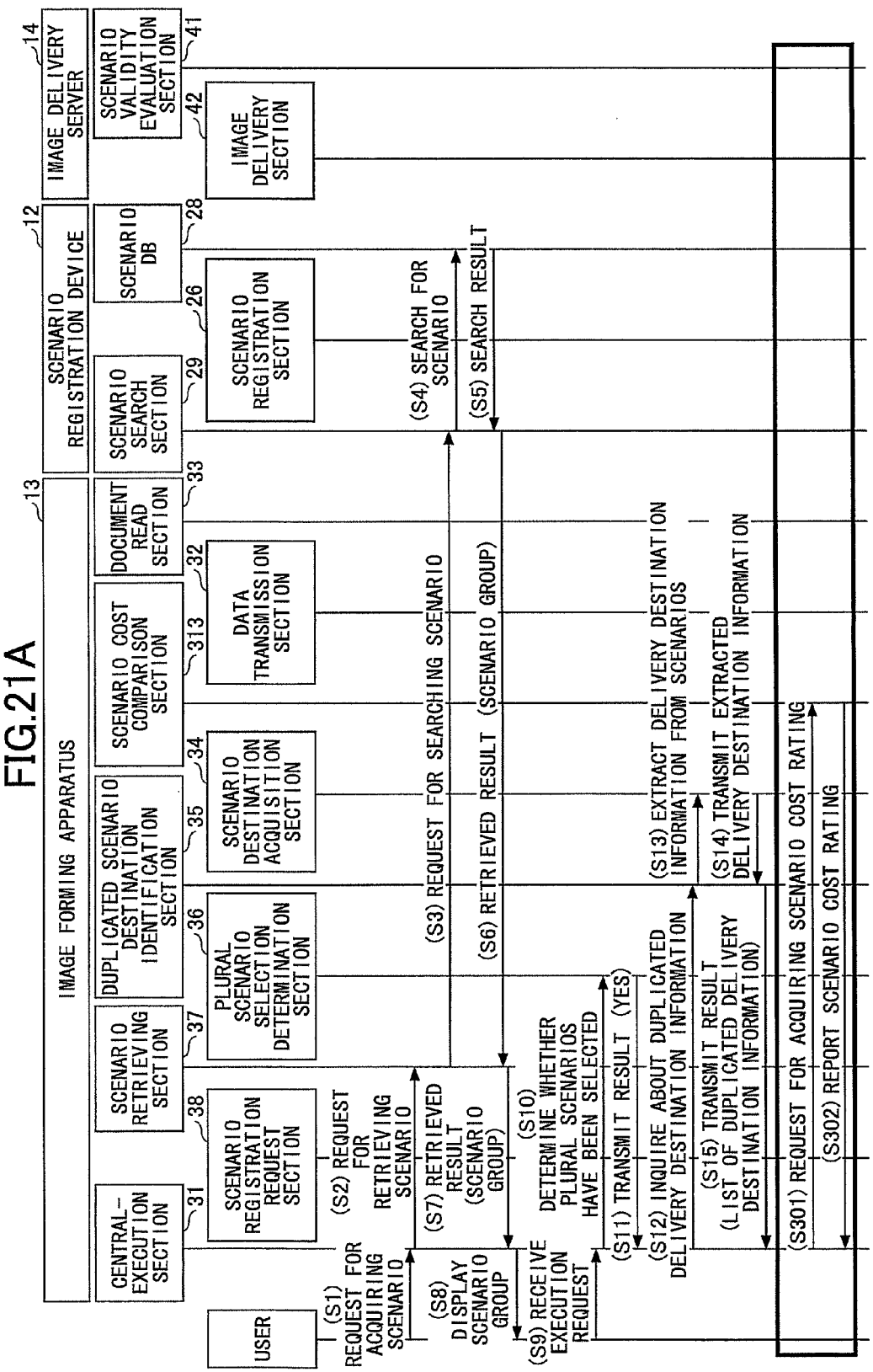

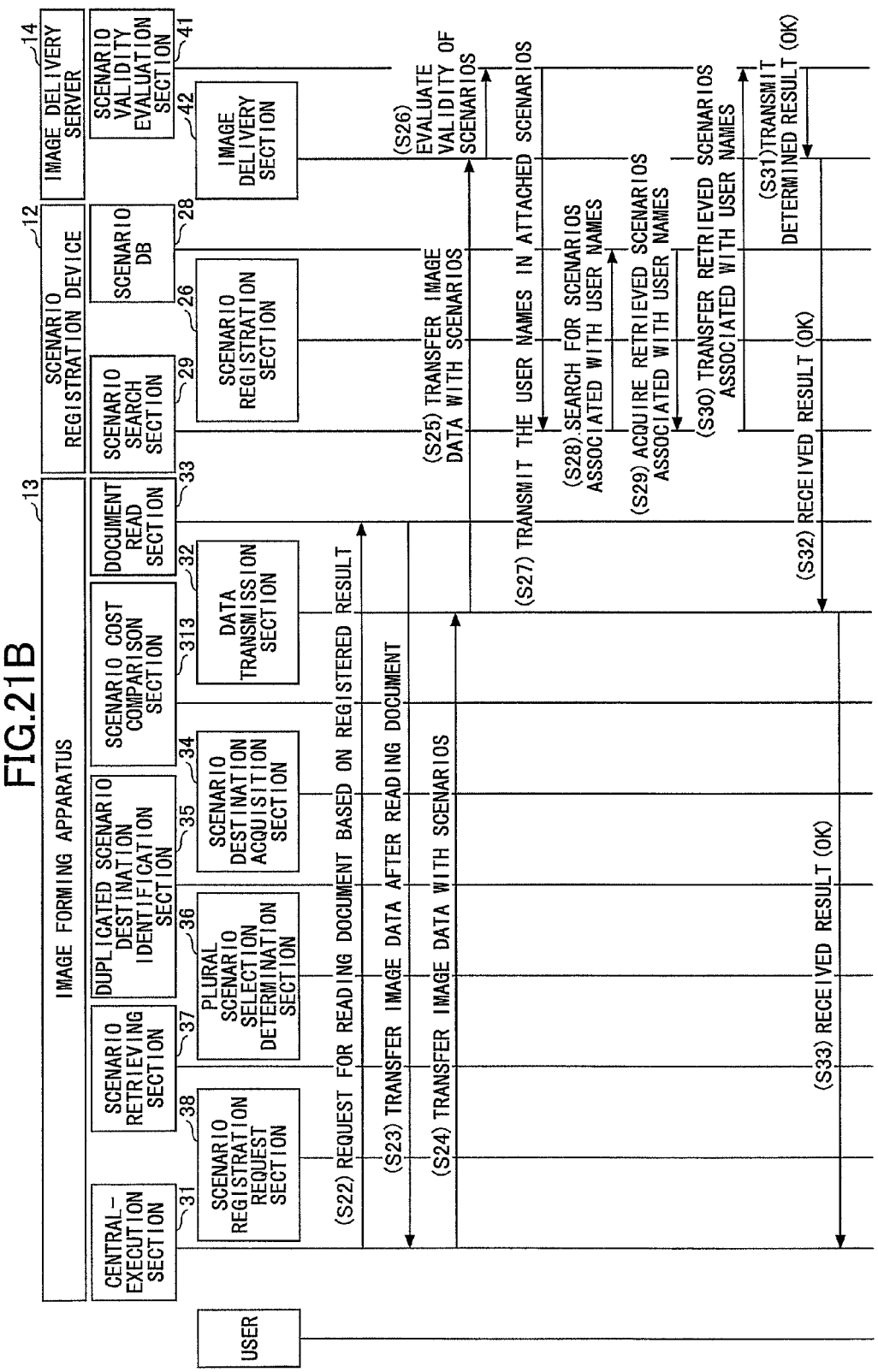

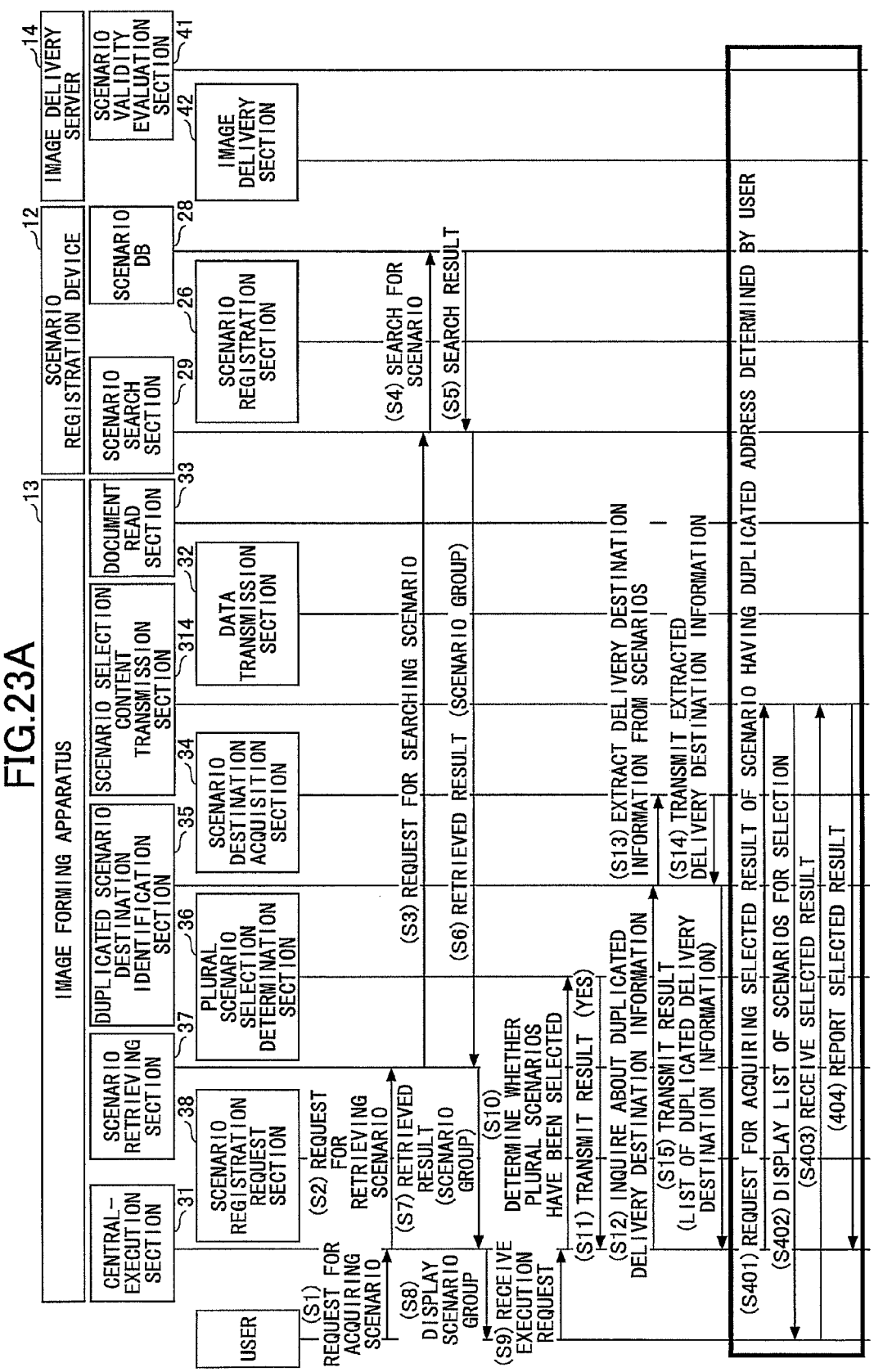

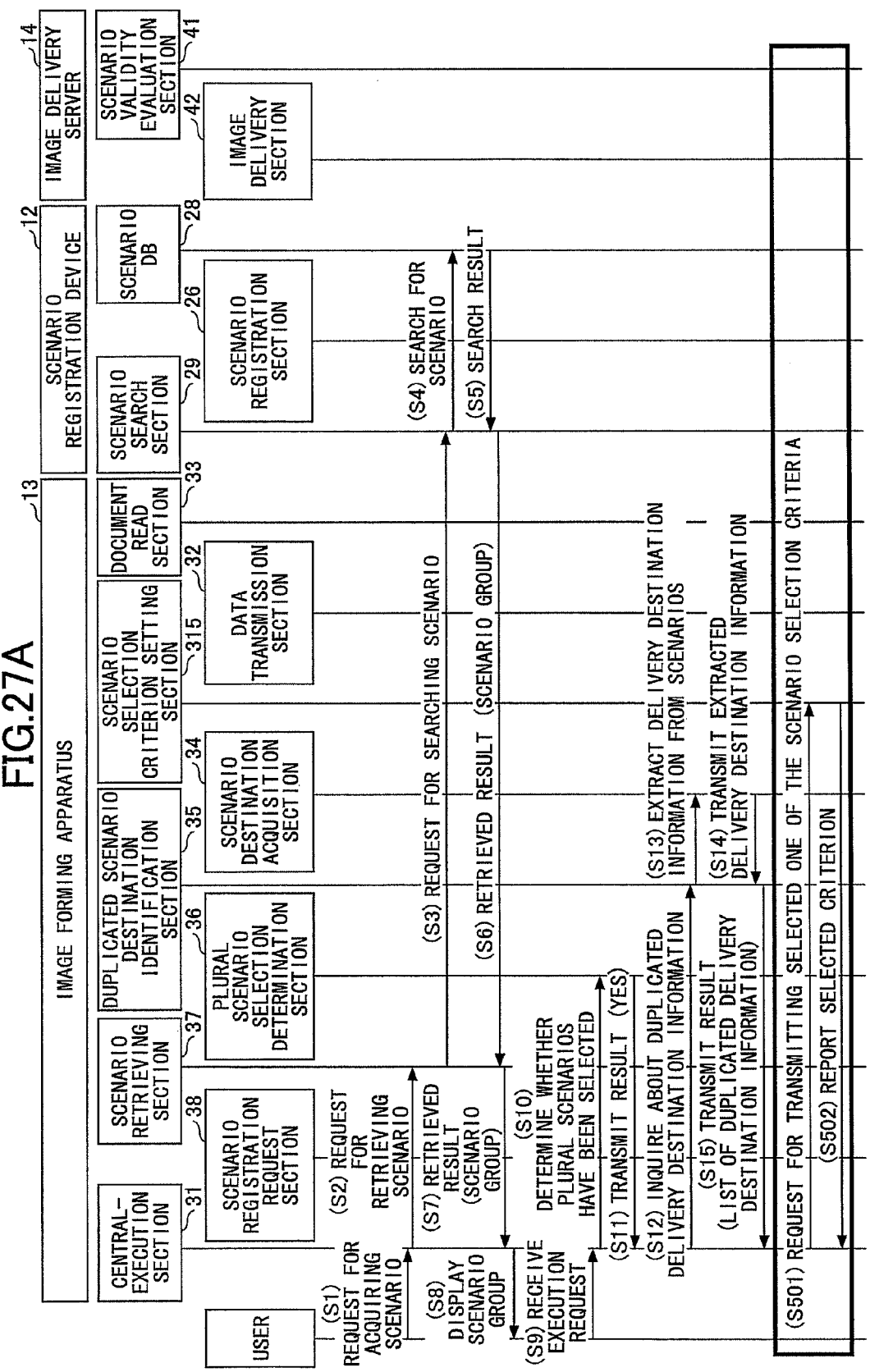

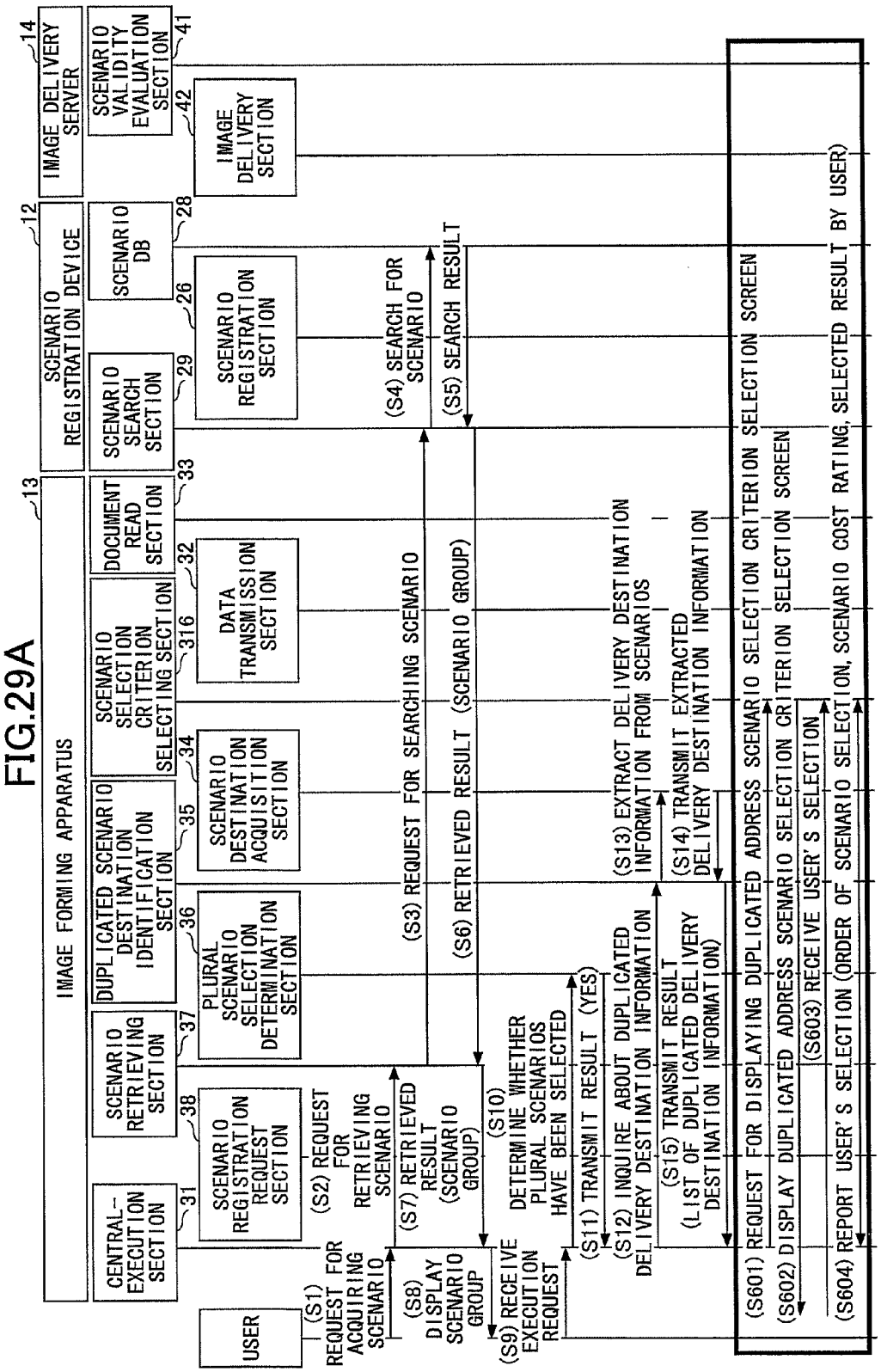

IMAGE FORMING APPARATUS, IMAGE FORMING APPARATUS UTILIZATION SYSTEM, AND METHOD FOR GENERATING IMAGE DATA

PRIORITY STATEMENT

This application is a continuation of U.S. application Ser. No. 12/805,504 filed on Aug. 3, 2010 and claims priority to Japanese Patent Application No. 2009-200617 filed Aug. 31, 2009, the entire contents of each of which are hereby incorporated herein by reference.

BACKGROUND OF THE INVENTION

1. Field of the Invention

The invention generally relates to an image forming apparatus that generates image data based on scenarios. Specifically, the invention relates to an image forming apparatus having an excellent user-friendly interface capable of facilitating a user's understanding of a relationship between destinations and processing conditions for image data when the image forming apparatus generates the image data based on plural scenarios, an image forming apparatus utilization system and a method for generating the image data in the image forming apparatus.

2. Description of the Related Art

Directory services are often utilized in network systems. A directory service allows searching user information stored in servers over a computer network such as a LAN, including accessible printers and servers, from clients. One such a directory service is known as an "Active Directory".

Various types of directory services may be available. In one example of the directory service technology (e.g., Japanese Laid-Open Patent Publication No. 2003-087479), different processing conditions for corresponding image forming apparatuses are stored in an external server in advance, and one of the image forming apparatuses is caused to retrieve the corresponding processing condition from the server, set the retrieved processing condition, and execute processing based on the set processing condition. With this directory service technology, a user is capable of executing desired processing on the image forming apparatus with a minimum operation of the image forming apparatus.

Japanese Laid-Open Patent Publication No. 2003-087479 discloses an image reading system that can easily set read information such as read conditions and destinations of image readers connected to a network with excellent user-friendliness. In the image reading system having a scanner and a scan server mutually connected via a network, when the scanner receives the user ID, the scanner transmits the user ID to the scan server via the network, the scan server determines whether the transmitted user ID matches a user ID registered in an internal memory of the scan server, and if the transmitted user ID matches the user ID registered in the internal memory of the scan server, the scan server transmits the read information corresponding to the user ID to the scanner.

Such an image reading system utilizing the scanner disclosed in Japanese Laid-Open Patent Publication No. 2003-087479 is capable of transmitting the image data scanned by the scanner via electronic mail; however, setting for the delivery (i.e., transmission of the image data) such as a method for delivering the image data or delivery destination of the image data are registered in the external server. Accordingly, in the related art directory service technology, if a user desires to transmit image data to plural destinations (e.g., plural email addresses), the user also needs to select plural processing conditions. However, since the selected plural processing conditions are mutually different from one another, it is generally difficult for the user to understand to which destinations the image data are to be transmitted, and under which processing conditions such image data are to be read. That is, it is generally difficult for the user to understand a relationship between destinations and corresponding image data.

SUMMARY OF THE INVENTION

Accordingly, embodiments of the present invention may provide a novel and useful image forming apparatus having an excellent user-friendly interface capable of facilitating a user's understanding of a relationship between destinations and processing conditions for image data when plural processing conditions are selected in the directory service, an image forming apparatus utilization system and a method for generating the image data in the image forming apparatus solving one or more of the problems discussed above.

In one embodiment, there is provided an image forming apparatus including an acquisition unit configured to acquire a plurality of combinations of document reading settings and delivery destination information of image data from a storage device configured to store the plurality of combinations, a reception unit configured to display the plurality of combinations acquired by the acquisition unit and receive a selection of the plurality of combinations by a user, a duplication identification unit configured to determine, upon the reception unit receiving the selection, whether the selected plurality of combinations contain duplicated delivery destination information, and a control unit configured to control, upon the duplication identification unit determining that the selected plurality of combinations selected contain the duplicated delivery destination information, a transmission of image data such that the image data is transmitted once to a delivery destination corresponding to the duplicated delivery destination information.

According to another embodiment, there is provided a method including acquiring, using an image forming apparatus, a plurality of combinations of document reading settings and delivery destination information of image data from a storage device configured to store the plurality of combinations, displaying, using the image forming apparatus, the plurality of combinations acquired by the image forming apparatus and receive a selection of the plurality of combinations by a user, determining, using the image forming apparatus, whether a selection, by a user, of the plurality of selected combinations contain duplicated delivery destination information upon the image forming apparatus receiving the selection, and controlling, using the image forming apparatus, a transmission of image data such that the image data is transmitted once to a delivery destination corresponding to the duplicated delivery destination information upon the image forming apparatus determining that the selection contain the duplicated delivery destination information.

According to still another embodiment, there is provided a system including an image forming apparatus configured to read a document to generate image data, a storage device configured to store a plurality of combinations of document reading settings and delivery destination information of the image data, and an image delivery apparatus configured to deliver the image data, the image forming apparatus, the storage device, and the image delivery apparatus being connected via a network, the image forming apparatus further including an acquisition unit configured to acquire a plurality of combinations of document reading settings and delivery destination information of image data from a storage device configured to store the plurality of combinations, a reception unit configured to display the plurality of combinations acquired by the acquisition unit and receive a selection of the plurality of combinations by a user, a duplication identification unit configured to determine, upon the reception unit receiving the selection, whether the selected plurality of combinations contain duplicated delivery destination information, and a control unit configured to control, upon the duplication identification unit determining that the selected plurality of combinations selected contain the duplicated delivery destination information, a transmission of image data such that the image data is transmitted once to a delivery destination corresponding to the duplicated delivery destination information.

BRIEF DESCRIPTION OF THE DRAWINGS

Other objects and further features of embodiments will be apparent from the following detailed description when read in conjunction with the accompanying drawings, in which:

FIG. 1 is a schematic diagram illustrating a configuration example of an image forming apparatus utilization system according to a first embodiment;

FIGS. 2A through 2C are schematic diagrams illustrating examples of operations of the image forming apparatus utilization system;

FIG. 4 is a diagram illustrating an example of a hardware configuration of a scenario making device (SMC), a scenario registering device (AD), and an image delivery server;

FIG. 5 is a diagram illustrating an example of a scenario;

FIGS. 7A through 7C are diagrams illustrating examples of editing scenarios;

FIGS. 8A and 8B depict a sequence diagram illustrating an example of a procedure for registering a scenario regardless of capability of an image forming apparatus in the image forming apparatus utilization system;

FIGS. 9A and 9B depict a sequence diagram illustrating an example of a procedure in which scenarios are executed while preventing duplicated transmission of image data to same delivery addresses when the scenarios have the same delivery addresses in the image forming apparatus utilization system;

FIG. 10 is a diagram illustrating an example of a scenario selection screen displayed on an operations panel;

FIG. 11 is a diagram illustrating an example of a set of plural selected scenarios;

FIGS. 12A, 12B and 12C are diagrams illustrating different types of methods in which image data are transmitted once to the delivery destinations in the scenarios when two or more scenarios include the duplicated delivery destination information;

FIG. 13 is a diagram illustrating an example of a scenario DB before registering the scenarios and after registering the scenarios;

FIG. 14 is a diagram illustrating another example of the scenario DB before registering the scenarios and after registering the scenarios;

FIGS. 16A and 16B depict a sequence diagram illustrating an example of a procedure in which one of duplicated delivery destination information contained in plural scenarios is deleted and the validity of the deleted delivery destination information is evaluated;

FIG. 18 is a diagram illustrating an example of scenarios' sequential numbers recorded by a scenario selected order determination section that are shown in the order of selection;

FIGS. 21A and 212 depict a sequence diagram illustrating an example of a procedure in which a cheapest scenario is specified;

FIGS. 23A and 23B depict a sequence diagram illustrating an example of a procedure in which a user selects a scenario that includes duplicated delivery destination information;

FIGS. 27A and 27B depict a sequence diagram illustrating an example of a procedure in which an image forming apparatus selects the scenarios based on the scenario selection criterion selected (set) by the user;

FIGS. 29A and 29B depict a sequence diagram illustrating an example of a procedure in which an image forming apparatus selects the scenarios based on the scenario selection criterion selected (set) by the user.

DESCRIPTION OF THE PREFERRED EMBODIMENTS

Figure 3:
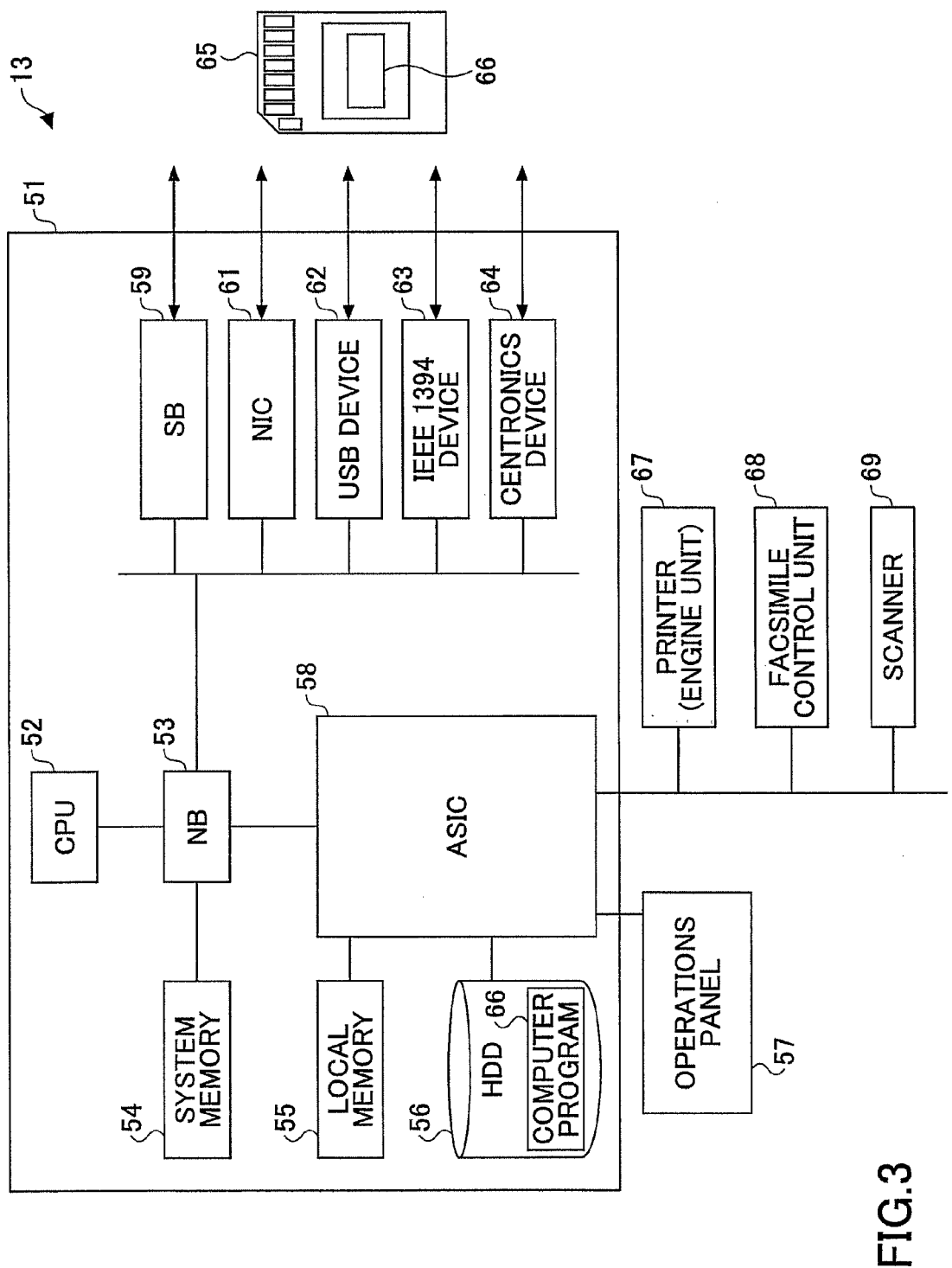
FIG. 3 is a diagram illustrating an example of a hardware configuration of an image forming apparatus.

In the following, preferred embodiments are described with reference to the accompanying drawings.

[First Embodiment]

An image forming apparatus utilization system according to a first embodiment is described with reference to FIGS. 1 and 2. FIG. 1 is a schematic diagram illustrating a configuration of an image forming apparatus utilization system 100 according to the first embodiment. The image forming apparatus utilization system 100 includes a scenario creation device 11 (hereinafter called a "SMC 11") 11 configured to create later described scenarios; a scenario registration device 12 (hereinafter called an "AD 12"); image forming apparatuses 1, 2, 3, . . . (or image forming apparatuses 13 as a whole) configured to include the SMC 11, to provide apparatus capability information required by the SMC 11 when the SMC 11 creates a scenario, to read an original document to generate image data, and to transmit the generated image data and the created scenario; and an image delivery server 14 configured to receive the transmitted image data and scenarios from the image forming apparatus 13, to carry out, after having evaluated the validity of the received scenario, processing (e.g., transmission of the image data to another information processing apparatus) on the received image data based on a delivery method specified by the scenario.

Note that in this embodiment, the SMC 11, the AD 12, and the image delivery server 14 are treated as separate computers; however, their functions may be integrated in one or two computers. The respective functions of the SMC 11, the AD 12, and the image delivery server 14 may be implemented as application software that can be executed as separate functions in a computer.

Note also that in the following, an operator who operates the SMC 11 to register a scenario is called an "administrator", and an operator who operates the image forming apparatus 13 to utilize the registered scenario is called a "user". The administrator and the user may be the same operator. In this embodiment, a scanning condition is given as an example of the processing condition; however, the processing condition may include a copying condition or a printing condition.

FIGS. 2A through 2C are schematic diagrams illustrating examples of operations of the image forming apparatus utilization system 100.

<Scenario Registration>

(A1) The administrator operates the SMC 11 to create a scenario. The scenario is a collection of setting information on the image forming apparatus 13 including a "reading setting", a "delivery setting", a "user name", a "password", a "model", and an "apparatus identifier".

The SMC 11 includes a user interface called a "scanner management console" that is implemented as a function or application software of a specific OS (e.g., Windows (Registered Trademark) VISTA and 7 or equivalents). The scanner management console is an example of the user interface via which the administrator communicates with the image forming apparatuses 13 and the AD 12 or the administrator sets various types of information. The SMC 11 communicates with the image forming apparatuses 13 based on a predetermined protocol such as a WS-EWS.

In order to create scenarios, capability information of the image forming apparatuses 13 may be needed. The SMC 11 queries the image forming apparatus 13 about the capability information or state of the image forming apparatus 13 (see FIG. 2A). Note that the image forming apparatus 13 in this embodiment is a scanner apparatus.

(A2) When the SMC 11 requests the image forming apparatus 13 to provide its capability information, the image forming apparatus 13 provides its capability information to the SMC 11 in response to that request. Note that the SMC 11 may receive the capability information of the image forming apparatus 13 before the administrator's operation to create a scenario or simultaneously with the administrator's operation to create a scenario.

The SMC 11 displays the capability information received from the image forming apparatus 13. The administrator may register a reading setting for the image forming apparatus 13 within a range based on the capability information of the image forming apparatus 13. The administrator may also register a "user name" and a "password" of the user who utilizes the delivery setting and the reading setting for the image forming apparatus 13.

(A3) The SMC 11 then registers a scenario including the above various types of information in the AD 12. The AD 12 saves (stores) the scenario including the above various types of information. The AD 12 organizes PCs, scanners, printers, copiers, and facsimile machines connected over plural networks into a hierarchy of a domain (an administrative unit of users and computers). For example, The administrator may define a scanner that can be connected to from a PC. So far, a process flow of the scenario registration is described.

As will be described later, when the SMC 11 creates one scenario (a first scenario) based on the image forming apparatus 1, the SMC 11 newly creates second or third scenarios by applying the first scenario to the image forming apparatuses 2 and 3. Accordingly, when the first scenario for the image forming apparatus 1 is registered, the second and third scenarios that can implement the same processing for the image forming apparatuses 2 and 3 may be automatically registered.

<Use of Scenario>

Next, a procedure of the use of the scenario is described (see FIGS. 23 and 2C).

(B1) A user carries out an authentication operation on (logs into) the image forming apparatus 13, and the image forming apparatus 13 acquires the scenarios authorized for the login user. Since scenarios are associated with corresponding users who are authorized to use the scenarios, the scenarios associated with the users who are authorized to use the image forming apparatus 13 are transmitted to the image forming apparatus 13.

(B2) The user selects one or more of the scenarios displayed on an operations panel 57 of the image forming apparatus 13 and then presses a start key to scan a document. Note that an operation of the image forming apparatus 13 based on the scenario is also called an "execution of scenario".

(B3) In this embodiment, when the user selects plural different scenarios and the selected different scenarios include duplicated delivery destination information, the duplicated delivery destination information among the selected different scenarios is deleted from the plural scenarios such that the same image data are not transmitted to the same delivery destination two or more times. That is, if the plural different scenarios include the duplicated delivery destination information, the image forming apparatus 13 carries out the later described different processing on the plural different scenarios.

(B4) When the selection of scenarios are changed, the image delivery server 14 is configured not to be allowed to deliver the image data based on the changed selection of scenarios for security reasons. However, since the image forming apparatus 13 registers the changed selection of scenarios in the AD 12, the image delivery server 14 can deliver the image data based on the changed selection of scenarios.

(B5) The image forming apparatus 13 reads the image data based on a scenario reading setting, and transmits the read image data and the selected scenarios (changed selection of scenarios) to the image delivery server 14. The image forming apparatus 13 communicates with the image delivery server 14 based on a predetermined protocol such as a WS-EWS (see FIG. 2C).

(B6) The image delivery server 14 determines whether the selected scenarios received with the image data are registered in the AD 12. In this manner, the validity of the selected scenarios executed by the image forming apparatus 13 can be evaluated (scenario validity evaluation), thereby obtaining security for delivering the image data.

Thus, since the image forming apparatus 13 registers the changed selection of scenarios in the AD 12, the image delivery server 14 is capable of determining whether the selected scenarios received with the image data are registered in the AD 12. The image delivery server 14 transmits the image data when it has determined that the scenarios are valid.

(B7) The image delivery server 14 carries out processing on the image data such as delivering based on a delivery setting (e.g., delivery types, delivery destinations) contained in the scenarios. As illustrated in FIG. 2B, the delivery types include "Scan to E-mail", "Scan to FileShare", and "Scan to Sharepoint".

[Hardware Configuration of Image Forming Apparatus]

FIG. 3 is a diagram illustrating an example of a hardware configuration of the image forming apparatus 13. The image forming apparatus 13 is a multifunction peripheral (MFP) that includes a scanner 69, a printer 67, and a facsimile control unit 68. In this embodiment, the image forming apparatus 13 is described as the MFP; however, the image forming apparatus 13 may be configured to at least include the scanner 69.

The image forming apparatus 13 further includes a controller 51 and an operations panel 57. The controller 51 includes a CPU 52, a system memory 54, a north bridge (NB) 53, a south bridge (SB) 59, an application specific integrated circuit (ASIC) 58, a local memory 55, an HDD 56, a network interface card (NIC) 61, a USB device 62, an IEEE 1394 device 63, and a Centronics device 64.

A storage medium 65 is removable from the USB device 62, and a computer program 66 stored in the storage medium 65 is installed in the HDD 56 from the storage medium 65. The computer program 66 may be installed in the HDD 56 via the NIC 61 from a not-shown server.

The CPU 52 controls the hardware of the entire image forming apparatus 13. The CPU 52 executes processes for application software and function of an OS. The NB 53 is a bridge. The SB 59 is a bridge to connect a PCI bus to a ROM and peripherals. The system memory 54 may be utilized as a graphic memory for the image forming apparatus 13. The local memory 55 is utilized as a copying image buffer or a code buffer.

The ASIC 58 is an image processing IC having a hardware component for image processing. The HDD 56 is an example of a storage (i.e., an auxiliary storage) that accumulates data such as image data, document data, the computer program 66, and font data. The NIC 61 is an interface that connects the image forming apparatus to the networks. The USE device 62, the IEEE 1394 device 63, and the Centronics device 64 are interfaces complying with the corresponding standards, which are connected to a PC to receive data such as printing data.

The operations panel 57 is an operations unit to receive information input by a user and to display an outcome of the input to the user. The operations panel 57 includes a touch panel on a display and a hardware keyboard arranged around the touch panel. The printer 67 may be either a monochrome plotter or a color plotter that forms an image per page based on print job data or image data scanned by the scanner 69, and transfers the formed image onto a sheet of paper. For example, the printer 67 forms a toner image on a photoconductor drum based on an electrophotographic imaging process where a laser beam is used, transfers the formed toner image onto a sheet of paper, fixes the transferred toner image on the sheet by the application of heat and pressure on it, and outputs the sheet with the fixed image.

The scanner 69 also optically scans a document placed on a contact glass, carries out an AD (analog-to-digital) conversion on reflected light of the scanned document, carries out various image processing such as image region separation, background removing processing, y-conversion, isolated point removing processing, color conversion processing, and scaling processing to obtain digital data having a predetermined resolution, thereby forming image data.

The facsimile control unit 68 is connected via a network control unit (NCU) to a public telecommunication network, and carries out facsimile transmission based on a communication protocol (communication process) compatible with facsimile machines complying with standards such as G3 or G4. Note that the facsimile control unit 68 includes a memory to temporarily store facsimile data received while the image forming apparatus is turned off.

[Hardware Configuration of SMC, Ad, and Image Delivery Server]

The SMC 11, the AD 12, and the image delivery server 14 are respective computers, an entity of which is a personal computer or a workstation. The hardware configuration is common to the SMC 11, the AD 12, and the image delivery server 14, so that the description of the hardware configuration is given based on the SMC 11 as an example.

FIG. 4 is a diagram illustrating an example of a hardware configuration of the SMC 11, the AD 12, and the image delivery server 14. The SMC 11 includes a CPU 71 and a memory 72 having a ROM or a RAM that are connected to a bus line. The bus line is connected with an HDD 75 that is a large-capacity storage, an input device 76 such as a keyboard or a mouse, a monitor control unit 77 that is connected to a display 80 such as a LCD or a CRT, and a storage medium reader 73 that reads a storage medium 78 such as an optical disk via predetermined interfaces. The bus line is also connected to a predetermined network device 74 that communicates with networks including the Internet or with external devices such as a USE via predetermined interfaces. The HDD 75 of the SMC 11 includes a computer program 79 that automatically creates scenarios (SMC 11 case only). The HDD 75 of the AD 12 includes a computer program 79 that registers the scenarios, and the HDD 75 of the image delivery server 14 includes a computer program 79 that delivers image data. Such a computer program 79 is read by the storage medium reader 73 from the storage medium 78 or is downloaded via the networks such as the Internet so as to be installed in the HDD 75 of the SMI 11, AD 12 or image delivery server 14. After the installation of the computer program 79, the SMC 11 is capable of automatically creating scenarios or supporting an administrator to create scenarios.

Figure 6:
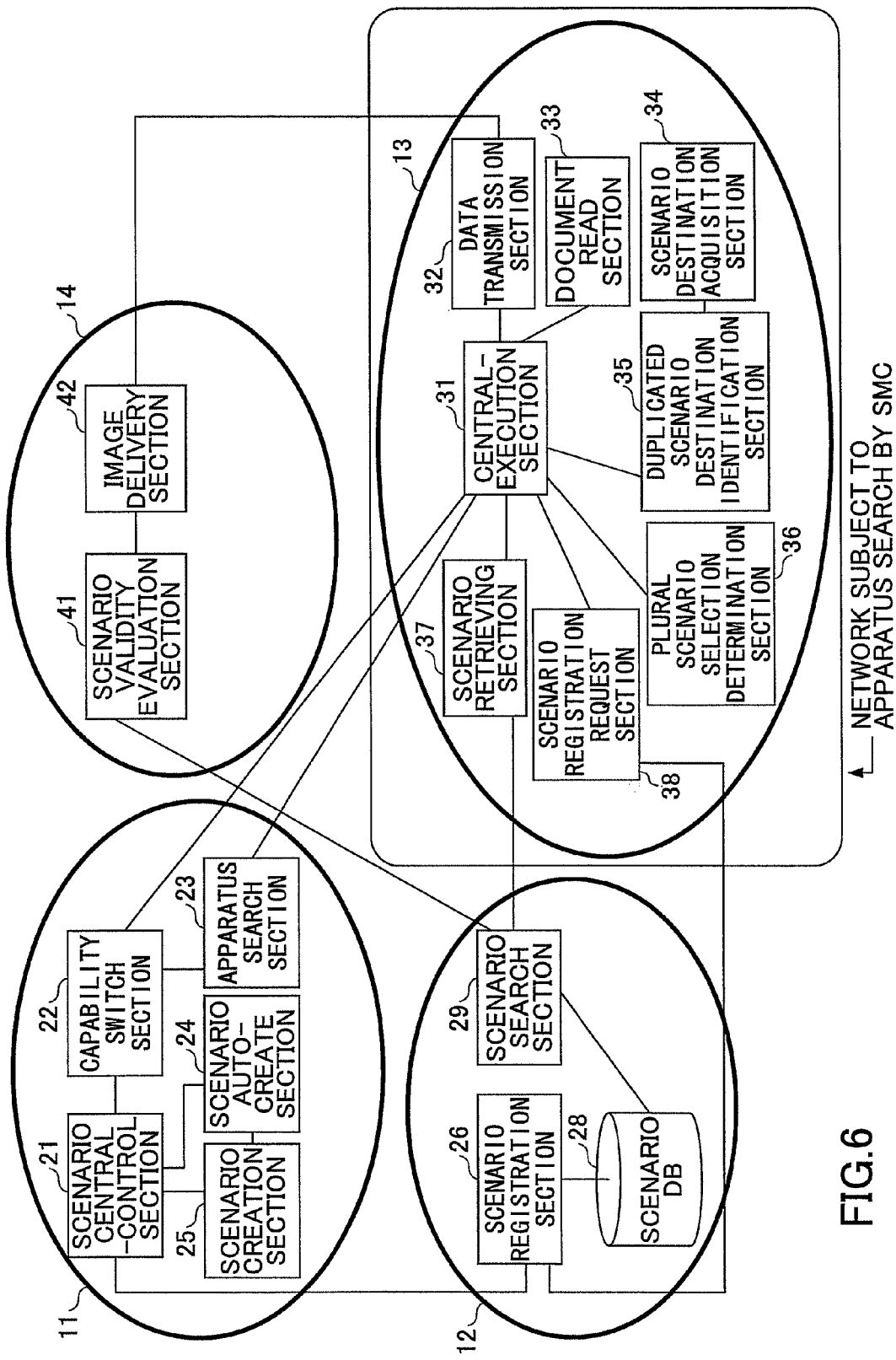
FIG. 6 is a block diagram illustrating an example of functional components of the image forming apparatus utilization system according to the first embodiment.

The CPU 71 of the SMC 11 retrieves the computer program 79 from the HDD 75 and executes the computer program 79 utilizing the RAM of the memory 72 as a working memory, thereby implementing a scenario central-control section 21, a scenario creation section 25, a capability switch section 22, a scenario auto-creation section 24, and an apparatus search section 23 as illustrated in FIG. 6. Likewise, the CPU 71 of the ADC 12 retrieves the computer program 79 from the HDD 75 and executes the computer program 79 utilizing the RAM of the memory 72 as a working memory, thereby implementing a scenario registration section 26 and a scenario search section 29 as illustrated in FIG. 6. Likewise, the CPU 71 of the image delivery server 14 retrieves the computer program 79 from the HDD 75 and executes the computer program 79 utilizing the RAM of the memory 72 as a working memory, thereby implementing a scenario validity evaluation section 41 and an image delivery section 42 as illustrated in FIG. 6.

In the network device 74, communication connections of a physical layer and a data link layer are established between the SMC 11, the AD 12, the image delivery server 14 and the image forming apparatus 13 in order to communicate with one another based on a TCP/IP protocol. For example, the communication between the AD 12 and the image forming apparatus 13 is carried out based on a lightweight directory access protocol (LDAP) which is located at a higher layer than the layer of the TCP/IP. The LDAP is a versatile protocol in directory services, and is used to search the AD 12 for a scenario from the image forming apparatus 13.

Note that the SMC 11, the AD 12, and the image delivery server 14 may be integrated in one computer as described above. Alternatively, the SMC 11 and the AD 12 may be integrated in one computer, and the image delivery server 14 is implemented in a separate computer. Further, the SMC 11 and the image delivery server 14 may be integrated in one computer, and the AD 12 is implemented in a separate computer. Moreover, the AD 12 and the image delivery server 14 may be integrated in one computer, and the SMC 11 is implemented in a separate computer.

[Scenario]

First, descriptions of scenarios are given below with reference to FIG. 5. FIG. 5 is a diagram illustrating examples of scenarios that are registered in a later described scenario DB 28. Each of the scenarios includes registered information corresponding to a "reading setting", a "delivery setting", a "user name", a "password", a "model", and an "apparatus identifier" as illustrated in FIG. 5. The "reading setting" includes "resolution", "density", a "color mode", and a "paper size" items, in which corresponding information on each of the scenarios is registered. The delivery setting includes a "delivery type" and an "address" items, in which corresponding information on each of the scenarios is registered. The "address" contains delivery destination information to identify duplicated addresses or delivery destinations.

The user name is used for identifying a user, and the password is used for authenticating a user who has logged into the image forming apparatus. The apparatus identifier is a unique value assigned to each of the image forming apparatuses (i.e., image forming apparatuses 1 to 3 in FIG. 1). The apparatus identifier identifies one of the image forming apparatuses 13 (image forming apparatuses 1 to 3) for which a scenario registered in the scenario DB 28 is generated. That is, the registered scenario can be effective in the image forming apparatus 13 identified by the apparatus identifier.

The image forming apparatus 13 acquires a scenario from the AD 12 and sets the acquired scenario to the reading setting based on which the scanner 69 is operated. Note that a scenario reading setting including "resolution", "density", a "color mode", and a "paper size" corresponds to the reading setting based on which the scanner 69 is operated. In this manner, the image forming apparatus 13 is capable of reading a document to generate image data without the user's operating the operations panel 57 to set the "resolution", "density", "color mode", and "paper size".

Note that whether all or part of the reading setting set by the application of the scenario reading setting can be changed by the user's operation of the operations panel 57 may vary with a design policy for each directory service. In the first embodiment, if the scenario transmitted together with the image data to the image delivery server 14 differs from the one registered in the AD 12 due to the change in the transmitted scenario, the image delivery server 14 is configured not to transmit the image data.

In addition, when the image data and the corresponding scenario are transmitted to the image delivery server 14, the image delivery server 14 evaluates the validity of the transmitted scenario, and delivers, if the transmitted scenario is valid, the image data based on the delivery setting contained in the transmitted scenario. Thus, the scenario is a prescribed condition that defines how image data are generated and how the image data are delivered.

[Functional Configuration of Image Forming Apparatus Utilization System]

FIG. 6 is a block diagram illustrating an example of functional components of the image forming apparatus utilization system 100 according to the first embodiment.

<SMC 11>

The SMC 11 includes the scenario central-control section 21, the capability switch section 22, the apparatus search section 23, the scenario auto-creation section 24, and a scenario creation section 25. The SMC 11 creates a scenario to register it with the AD 12. There are two methods for creating a scenario: 1) the administrator operates the SMC 11 to create a scenario; and 2) the SMC automatically creates a scenario identical to the one created by the administrator.

The capability switch section 22 acquires corresponding capability information of the image forming apparatuses 13. The capability information includes equivalent information to information registered in the reading setting. In order to request the capability information from the image forming apparatuses 13, the capability switch section 22 requires corresponding location information on the image forming apparatuses 13 connected over the networks. The location information is communication information that is used for communicating with the image forming apparatuses 13 connected over the networks. The location information includes the apparatus identifier, the model, a MAC address, and an IP address of the image forming apparatus 13. The capability switch section 22 requests the apparatus search section 23 to acquire the location information on the image forming apparatus 13 in the network subject to search and provide the acquired location information on the image forming apparatus 13 to the capability switch section 22.

The apparatus search section 23 acquires the location information on the image forming apparatus 13 in the network subject to search. The apparatus search section 23 requests a central-execution section 31 (scenario reception unit) of the image forming apparatus 13 to search a network search area set by the administrator (e.g., specified by a network address) for the location information based on the WS-EWS protocol as described above. The image forming apparatuses 13 in the network subject to search may be limited to those having a scanner function.

The location information on the image forming apparatus 13 may be searched by the apparatus search section 23 based on a simple network protocol (SNMP). The SNMP is a protocol based on which a network system is managed by monitoring apparatuses connected over the network. The apparatus search section 23 simultaneously transmits the search requests (i.e., location information) to the apparatuses in the network.

The respective image forming apparatuses 13 store their location information in a database called a management information base (MIB) or MIB2. The respective image forming apparatuses 13 specify their location information from their apparatus information and transmit the location information to the apparatus search section 23. Accordingly, in this embodiment, the SMC 11 corresponds to an SNMP manager of the SNMP protocol, and the image forming apparatus 13 corresponds to an SNMP agent.

The apparatus search section 23 transfers the acquired location information to the capability switch section 22 (e.g., stored in the RAM). The capability switch section 22 requests the image forming apparatuses 13 in the network to provide the corresponding capability information based on the location information (e.g., apparatus identifier, model, MAC address, and IP address). In this process, the WS-EWS protocol, or the SNMP protocol and MIB2 may be used in a similar manner as the searching process, or HTTP and FTP protocols may also be used.

The scenario central-control section 21 is a control section for creating a scenario. Specifically, the scenario central-control section 21 acquires the capability information of the image forming apparatus 13 from the capability switch section 22, and requests the scenario creation section 25 to create a scenario. For example, when the administrator operates the SMC 11 to create a scenario for the image forming apparatus 1, scenario central-control section 21 transfers the scenario created by the administrator to the scenario creation section 25. The scenario creation section 25 modifies the scenario in a predetermined format and stores the modified scenario in the memory 72 or the HDD 75. The scenario central-control section 21 requests the scenario registration section 26 of the AD 12 to register the scenario created by the scenario creation section 25.

Further, when creating scenarios for the image forming apparatuses 2, 3, 4 . . . (hereinafter called image forming apparatus n; n=2, 3, 4 . . . ) other than that for the image forming apparatus 1, the scenario central-control section 21 transfers the scenario for the image forming apparatus 1 created by the SMC 11 to scenario creation section 25 to create a scenario for the image forming apparatus 2, and the scenario central-control section 21 transfers the scenario created by the scenario creation section 25 to the scenario auto-creation section 24. The scenario auto-creation section 24 requests the scenario creation section 25 to create a scenario corresponding to the image forming apparatus n. As described above, the scenario auto-creation section 24 collaborates with the scenario creation section 25 to automatically create the scenario corresponding to the image forming apparatus n. Note that the scenario creation section 25 makes a copy of the scenario for the image forming apparatus 1 created by the administrator as a scenario for the image forming apparatus n.

The above process of automatic creation of the scenario for the image forming apparatus n is only one example, and alternatively, the scenario for the image forming apparatus n may be automatically created by the scenario auto-creation section 24 alone. In this embodiment, a "scenario creation" indicates a process in which the administrator operates the SMC 11 to create a scenario for the image forming apparatus 1, and an "automatic scenario creation" indicates a process in which the SMC 11 creates a scenario based on the scenario for the image forming apparatus 1 created by the administrator.

The scenario central-control section 21 automatically creates the scenario for the image forming apparatus n in different manners as follows.

a. The scenario central-control section 21 automatically creates the scenario for the image forming apparatus n regardless of the capability of the image forming apparatus n.

b. The scenario central-control section 21 automatically creates the scenario for the image forming apparatus n based on the capability of the image forming apparatus n.

b1. The scenario central-control section 21 automatically creates the scenario for the image forming apparatus n based on the image forming apparatus 1 having a model identical to the image forming apparatus n.

b2. The scenario central-control section 21 automatically creates the scenario for the image forming apparatus n based on the image forming apparatus 1 having a specification identical to the image forming apparatus n.

When the scenario central-control section 21 automatically creates the scenario for the image forming apparatus n by the b1 or b2 manner, the scenario central-control section 21 determines whether to automatically create the scenario for the image forming apparatus n. If the scenario central-control section 21 determines to automatically create the scenario, the scenario central-control section 21 requests the scenario auto-creation section 24 to create the scenario. In the b1 or b2 manner, the scenario central-control section 21 automatically creates the scenario for the image forming apparatus n based on the capability of the image forming apparatus n. Accordingly, it is possible to create a scenario that excludes a capability that is not supported by the image forming apparatus n.

For example, there may be a case where the image forming apparatus 1 is capable of carrying out color printing based on the scenario for the image forming apparatus 1 created by the administrator, but the capability information of the image forming apparatus n indicates no color printing capability of the image forming apparatus n. In such a case, the scenario central-control section 21 determines not to create the scenario for the image forming apparatus n based on the result of whether the image forming apparatus n includes the model or specification identical to the image forming apparatus 1. Further, the image forming apparatus 1 is capable of reading a document at 600 dpi resolution based on the scenario for the image forming apparatus 1 created by the administrator, but the capability information of the image forming apparatus n indicates that the image forming apparatus n has a maximum resolution of 400 dpi. In such a case, the scenario central-control section 21 is capable of determining not to create the scenario for the image forming apparatus n.

<AD 12>

The AD 12 includes a scenario registration section 26, a scenario search section 29, and a scenario DB 28. The scenario registration section 26 is connected to the scenario DB 28. The scenario registration section 26 of the AD 12 receives a scenario from the scenario central-control section 21 of the SMC 11, and registers it with the scenario DE 28. The scenario registered in the scenario DB 28 can be searched for by the image forming apparatus 13. The scenario registration section 26 stores the registered scenario in the scenario DB 28, an entity of which may be an HDD 75 or a solid state drive (SSD).

Note that the scenario registration section 26 of the AD 12 receives a scenario registration request and the scenario from a scenario registration request section 38 (scenario registration request unit) of the image forming apparatus 13, and registers the received scenario in the scenario DB 28. A method for registering the scenario includes 1) registering a new scenario by adding it as a new entry to the existing scenarios, and registering a new scenario by overwriting part of the existing scenarios with the new scenario. In this embodiment, a description of the method 1) is given as an example.

The scenario search section 29 receives a user name and an apparatus identifier of the image forming apparatus 13 from a scenario retrieving section 37 (scenario retrieving unit) of the image forming apparatus 13, searches for scenarios associated with the user name and the apparatus identifier of the image forming apparatus 13, and transmits to the scenario retrieving section 37 of the image forming apparatus 13 all the corresponding scenarios associated with the user name and the apparatus identifier of the image forming apparatus 13.

Likewise, the scenario search section 29 receives a user name and an apparatus identifier of the image delivery server 14 from the scenario validity evaluation section 41 of the image delivery server 14, searches for scenarios associated with the user name and the apparatus identifier of the image delivery server 14, and transmits to scenario validity evaluation section 41 of the image delivery server 14 all the corresponding scenarios associated with the user name and the apparatus identifier of the image delivery server 14.

<Image Forming Apparatus 13>

The image forming apparatus 13 includes the scenario retrieving section 37, the central-execution section 31, a data transmission section 32, a document read section 33, a scenario destination acquisition section 34 (scenario destination acquisition unit), a duplicated scenario destination identification section 35 (duplicated scenario destination identification unit), a plural scenario selection determination section 36, and the scenario registration request section 38. Corresponding functional components of the above sections may be implemented by causing the CPU 52 of the image forming apparatus 13 to execute the computer program 66.

Operations of the image forming apparatus 13 are briefly described below. A user inputs his or her user name and password combination to log into the image forming apparatus 13. The user may alternatively input his or her user name by selecting his or her user name preregistered with the image forming apparatus 13 on the operations panel 57. In this case, the password associated with his or her user name is automatically specified when the user selects his or her user name.

The user operates the operations panel 57 to retrieve scenarios. The image forming apparatus 13 receives the operation result of the operations panel 57 to acquire the scenarios authorized for the user from the AD 12. The image forming apparatus 13 displays a list of the scenarios received from the AD 12 on the operations panel 57. When the user selects one or more of the scenarios on the operations panel 57, the image forming apparatus 13 receives the selected result and transmit the selected scenarios to a scanner application. In this manner, the reading settings are applied with the selected scenarios such that the reading settings identical to the selected scenarios are set in the image forming apparatus 13. When the user presses a "start" key, the scanner 69 carries out operations based on the reading settings set by the scanner application based on the selected scenarios.

The functional components of the image forming apparatus 13 are described below. The central-execution section 31 controls a sequence of processing from retrieving, the scenarios to transmitting the image data to the image delivery server 14. The scenario retrieving section 37 accesses the scenario DB 28 via the scenario search section 29 of the AD 12 to retrieve the registered scenarios in the scenario DB 28. Specifically, the scenario registration section 37 of the AD 12 requests the scenario search section 29 to retrieve corresponding scenarios based on the apparatus identifier of the image forming apparatus 13 and the user name of the user who is authorized to use the image forming apparatus 13 as keywords.

Note that the AD 12 stores sets of user information for authenticating appropriate users. Each set of user information includes a user name that uniquely identifies a user and a password associated with the user name. Before retrieving scenarios, the AD 12 determines whether to authenticate the user based on the user name and password combination transmitted from the image forming apparatus 13. If the authentication is successful, the scenario search section 29 retrieves the scenarios associated with the user name and the identifier of the image forming apparatus 13 from the scenario DB 28 and transmits the retrieved scenarios to the image forming apparatus 13.

The plural scenario selection determination section 36 determines whether the user has selected plural scenarios. If the plural scenario selection determination section 36 determines that the user has selected plural scenarios, the plural scenarios may have duplicated delivery destination information. If the plural scenarios are selected, the duplicated scenario destination identification section 35 determines whether the plural scenarios include duplicated delivery destination information. The duplicated scenario destination identification section 35 requests the scenario destination acquisition section 34 to acquire scenario destinations contained in the selected plural scenarios. The scenario destination acquisition section 34 extracts delivery destination information from the plural selected scenarios transmitted from the AD 12 and transfers the extracted delivery destination information to the duplicated scenario destination identification section 35. The duplicated scenario destination identification section 35 compares the obtained plural destination information contained in the plural selected scenarios, and determines whether the plural selected scenarios include duplicated delivery destination information.

If the scenarios are modified or changed, the scenario registration request section 38 requests the AD 12 to newly register the modified scenarios in the scenario DB 28. Accordingly, the AD 12 registers the modified scenarios having modified delivery destination information in order not to allow the image delivery server 14 to deliver the same image data twice to the delivery destinations (i.e., delivery addresses) if there are duplicates of delivery destination information in the plural scenarios.

This process is described with reference to FIGS. 7A to 7C. FIG. 7A is a diagram illustrating a scenario 1 shown in FIG. 5. Note that the "user name", "password", "model", and "apparatus identifier" are omitted from the description of the scenario. As illustrated in FIG. 7A, the delivery addresses of the scenario 1 are "AAA@aaa" and "BBB@bbb". For example, there is a case where the user retrieves the scenario 1 for the image forming apparatus 13, and the user deletes the delivery address "BBB@bbb". FIG. 7B illustrates a modified scenario 1 from which the delivery address "BBB@bbb" has been deleted. At this moment, the modified scenario 1 from which the delivery address "BBB@bbb" has been deleted is not registered in the AD 12. Accordingly, if the image forming apparatus 13 executes the modified scenario 1 from which the delivery address "BBB@bbb" has been deleted and transmits the image data associated with the scenario 1 and the modified scenario 1 from which the delivery address "BBB@bbb" has been deleted, the image delivery server 14 determines that the scenario 1 is not valid.

To prevent such an incident, the scenario registration request section 38 requests the AD 12 to register the modified scenario 1 from which the delivery address "BBB@bbb" has been deleted. FIG. 7C is a diagram illustrating an example of the scenario DB 28 that has registered the modified scenario 1 from which the delivery address "BBB@bbb" has been deleted. As illustrated in FIG. 7C, the modified scenario 1 from which the delivery address "BBB@bbb" has been deleted is newly registered as a "scenario 1'" in the scenario DB 28. Since the modified scenario 1 in FIG. 7B is transmitted together with the image data associated with the scenario 1 to the image delivery server 14 and the image delivery server 14 newly registers the modified scenario 1 as the scenario 1' that is associated with the transmitted image data, the image delivery server 14 determines that the scenario 1' is valid.

Referring back to FIG. 6, the document read section 33 optically reads a document based on the scenario to generate image data. The data transmission section 32 transmits the image data generated by the document read section 33 and the scenario used in the reading of the image data to the image delivery server 14.

Note that hereinafter, the modified scenario having modified delivery destination information transmitted together with the image data to the image delivery server 14 is called an "attached scenario", the modified scenario having the modified delivery destination information and registered as a new scenario is called a "new scenario", and the registered scenario remaining in the scenario DB from which duplicated delivery destination information is deleted is called an "original scenario".

<Image Delivery Server 14>

The image delivery server 14 includes the scenario validity evaluation section 41 and the image delivery section 42. The scenario validity evaluation section 41 transmits an query to the scenario search section 26 of the AD 12 to determine whether the attached scenario received with the image data from the image forming apparatus 13 is valid. That is, the scenario validity evaluation section 41 transmits the user name contained in the attached scenario to the scenario search section 29 to search for the registered scenarios associated with the user name. Note that the image delivery server 14 may also transmit the apparatus identifier in the AD 12.

The scenario search section 29 retrieves the scenarios associated with the user name from the scenario DB 28 and transmit the retrieved scenarios associated with the user name to the scenario validity evaluation section 41. The scenario validity evaluation section 41 evaluates the validity of the attached scenario based on whether the attached scenario is contained in the received scenarios from the scenario search section 29. As described above, since the attached scenario having modified delivery destination information is transmitted to the image delivery server 14 and the image delivery server 14 registers the attached scenario as a new scenario in the scenario DB 28, the scenario validity evaluation section 41 can determine that the scenario (new scenario) identical to the attached scenario is registered in the scenario DB 28, that is, the scenario validity evaluation section 41 determines that the attached scenario received from the image forming apparatus 13 is valid.

Note that the evaluation of the validity of the attached scenario may be carried out in the AD 12 side. In such a case, the scenario validity evaluation section 41 transmits the attached scenario to the scenario search section 29 relocated in the AD 12, and the scenario search section 29 determines whether the scenario DB 28 stores (registers) a scenario that matches the attached scenario (i.e., whether the attached scenario matches the new scenario stored in the scenario DB 28). Thereafter, the scenario validity evaluation section 41 receives a determination result on the validity from the scenario search section 29 in the AD 12.

If the attached scenario is determined to be valid, the image delivery section 42 carries out delivery processing on the image data based on the delivery type and delivery address contained in the attached scenario. That is, the image delivery section 42 refers to the delivery setting in the attached scenario, and delivers the image data to the delivery address via the registered delivery type such as FTP, Server Message Block (SMB), and e-mail.

[Operation Procedure]

<Registration Procedure>

A registration procedure in which a scenario from the SMC 11 is registered in the AD 12 is described with reference to FIGS. 8A and 8. FIGS. 8A and 83 depict a sequence diagram illustrating an example of a procedure for registering a scenario regardless of capability of the image forming apparatus n in the image forming apparatus utilization system 100. Note that a procedure for registering a scenario based on the capability of the image forming apparatus n is the same as the procedure for registering the scenario regardless of the capability of the image forming apparatus n in the point in which a scenario is automatically created. Accordingly, the description of the registration procedure based on the capability of the image forming apparatus n is thus omitted.

First, the administrator operates the SMC 11 to activate the scanner management console. The administrator requests the scenario central-control section 21 to create a scenario (S101). The user operates the mouse and keyboard to press a start key or button for initiating the creation of the scenario. The scenario central-control section 21 receives a request for creating the scenario.

The scenario central-control section 21 requests the capability switch section 22 to acquire the capability information of all the apparatuses connected over the network (S102). The capability switch section 22 requests the apparatus search section 23 to search an apparatus list for the image forming apparatuses 13 connected via the network in the image forming apparatus utilization system 100 (S103).

The apparatus search section 23 searches the apparatus list for the image forming apparatuses 13 connected over the network in the image forming apparatus utilization system 100 (S104, S105). In FIGS. 8A and 8B, the apparatus search section 23 detects two image forming apparatuses 1 and 2 (i.e., image forming apparatus 13) as a result of searching the apparatus list; however, the number of image forming apparatuses 13 detected by the apparatus search section 23 may not be limited to two. The number of image forming apparatuses 13 detected by the apparatus search section 23 may be one, or two or more. The image forming apparatuses 1 and 2 detected by the apparatus search section 23 transmit their corresponding location information to the apparatus search section 23. On receiving the corresponding location information on the image forming apparatuses 1 and 2, the apparatus search section 23 generates an apparatus list including the image forming apparatuses 1 and 2 whose location information is acquired. Note that the generated apparatus list includes the corresponding location information such as the apparatus identifier, the model, MAC address, and IP address.

The apparatus search section 23 reports the generated apparatus list including location information on the detected image forming apparatuses 1 and 2 connected over the network to the capability switch section 22 (S106).

Next, the capability switch section 22 requests the image forming apparatuses 1 and 2 in the image forming apparatus utilization system 100 to transmit their corresponding capability information based on the reported apparatus list (S107, S109).

The image forming apparatuses 1 and 2 retrieve their capability information from their corresponding databases such as MIB2, and transmit the retrieved capability information to the capability switch section 22 (S108, S200). The capability switch section 22 thus acquires the corresponding capability information of the image forming apparatuses 1 and 2 connected over the network.

The capability switch section 22 reports the acquired capability information of the image forming apparatuses 1 and 2 to the scenario central-control section 21 (S201).

The scenario central-control section 21 displays a list of candidate apparatuses (i.e., image forming apparatuses 1 and 2 in this case) for creating scenarios to the administrator (S202). Specifically, the scenario central-control section 21 displays a list of the apparatus identifiers, models, and the like corresponding to the image forming apparatuses 1 and 2 on the display 80 of the SMC 11. The user clicks on the desired apparatus identifier or model to display the capability information of the image forming apparatus 1 or 2 on the display 80.

The administrator refers to the list of candidate apparatuses for creating scenarios and their capability information and transmits an instruction to the scenario central-control section 21 to create scenarios (S203). The instruction includes information on specifying (selecting) one of the image forming apparatus 1 and 2. On receiving the instruction including the specification of one of the image forming apparatuses 1 and 2, the scenario central-control section 21 displays the corresponding capability information of one of the image forming apparatuses 1 and 2 on the display 80 (in this case, it is assumed that the image forming apparatus 1 is selected). Accordingly, the administrator creates a scenario within a capability range of the image forming apparatus 1.

The administrator can also specify the "reading setting" including the "resolution", "density", "color mode", and "paper size" for reading the document. The SMC 11 displays a selectable pull-down menu with assignable values for each of the "resolution", "density", "color mode", and "paper size" based on the administrator's operation, and the administrator selects a desired one of the value from the pull-down menu corresponding to the "resolution", "density", "color mode", and "paper size" of the "reading setting". Alternatively, the administrator may directly input a desired value for the "reading setting". The administrator also sets values for the "delivery type", "address", "user name", and "password", "model" items. The value ranges for the above items to be registered are known to the administrator.

The scenario central-control section 21 reports information on the scenario creation set by the administrator to the scenario creation section 25 and requests the scenario creation section 25 to create a scenario (S204). The scenario creation section 25 determines whether necessary information is registered in each of the items in the scenario and whether the information contains disabled parameters or characters, converts the scenario in a predetermined format, and transmits the converted scenario to the scenario central-control section (S205). In this process, the scenario central-control section 21 may display the converted scenario to the administrator to receive the authorization.

The scenario central-control section 21 transmits the converted scenario to the scenario registration section 26 of the AD 12 and requests the scenario registration section 26 to register the converted scenario (S206). The scenario registration section 26 registers the converted scenario with the scenario DB 28. The scenario is thus created and registered in the AD 12.

Subsequently, automatic scenario creation, which is also a characteristic of the embodiment, is described. The scanner management console includes the computer program 79 that automatically creates scenarios, so that the SMC 11 automatically executes the following steps subsequent to step S205.

The scenario central-control section 21 requests the scenario auto-creation section 24 to automatically create a scenario for an image forming apparatus n whose scenario has not been created by the administrator (S207). In this process, the scenario central-control section 21 reports the scenario for the image forming apparatus 1 and the apparatus identifier of the image forming apparatus 1, and also reports the apparatus identifier of the image forming apparatus n to the scenario auto-creation section 24. In addition, the scenario central-control section 21 transmits the capability information of each of the image forming apparatuses 13 to the scenario auto-creation section 24.

The scenario auto-creation section 24 requests the scenario creation section 25 to create a scenario corresponding to the image forming apparatus n (S208). In this process, the scenario auto-creation section 24 transfers the scenario for the image forming apparatus 1, and the apparatus identifier of the image forming apparatus 1, and the apparatus identifier of the image forming apparatus n to the scenario creation section 25.

The scenario creation section 25 creates a scenario corresponding to the image forming apparatus n instructed (specified) by the scenario auto-creation section 24 (S209). Specifically, the scenario auto-creation section 24 generates a scenario for the image forming apparatus n that is identical to the scenario for the image forming apparatus 1, except that the scenario for the image forming apparatus n includes the apparatus identifier differing from that of the image forming apparatus 1. The scenario creation section 25 reports the created scenario corresponding to the image forming apparatus n to the scenario auto-creation section 24.

The scenario auto-creation section 24 transmits the created scenario corresponding to the image forming apparatus n to the registration section 26 (S300). Accordingly, the scenario registration section 26 registers the scenario for the image forming apparatus n, which is the same scenario as that for the image forming apparatus 1.

<Deleting Duplicated Delivery Destination Information>

Next, a procedure of deleting duplicated delivery destination information is described. FIGS. 9A and 9B depict a sequence diagram illustrating an example of a procedure in which scenarios are executed while preventing duplicated transmission of image data to same delivery addresses (duplicated delivery destination information) when the scenarios have the same delivery addresses.

First, the user operates the operations panel 57 of the image forming apparatus 13 to retrieve scenarios from the AD 12 (S1). Note that the user has already logged into the image forming apparatus 13 by inputting his or her user name and password combination via the operations panel 57 or causing the image forming apparatus 13 to read his or her IC card.

The central-execution section 31 receives a result of the operation and requests the scenario retrieving section 37 to retrieve scenarios (S2). Note that the central-execution section 31 may receive a login operation of the user as a scenario retrieving request. The central-execution section 31 transfers the user name and password combination to the scenario retrieving section 37.

The scenario retrieving section 37 further transfers the user name and password combination to the AD 12 to authenticate the user, and also transfers the apparatus identifier of the image forming apparatus 13 to the AD 12 in order to request the scenario search section 29 to search for the scenarios authorized for the user (S3). The scenario search section 29 authenticates the user based on whether the transferred user name and password combination exists in the sets of user information stored in the AD 12. If the authentication is successful, the scenario search section 29 searches the scenario DB 28 using the "user name" and the "identifier" of the image forming apparatus 13 as keywords (S4), and retrieves all the scenarios associated with the "user name" and the "identifier" of the image forming apparatus 13 from the scenario DB 28 (S5).

The scenario search section 29 transmits all the retrieved scenarios (scenario group) associated with the "user name" and the "identifier" of the image forming apparatus 13 to the scenario retrieving section 37 (S6). The scenario retrieving section 37 transfers all the retrieved scenarios (scenario group) associated with the "user name" and the "identifier" of the image forming apparatus 13 to the central-execution section 31 (S7).

The central-execution section 31 displays a list of the retrieved scenarios (scenario group) associated with the "user name" and the "identifier" of the image forming apparatus 13 on the operations panel 57 (S8). The list of the retrieved scenarios (scenario group) may hereinafter be called a "scenario list". FIG. 10 is a diagram illustrating an example of a scenario selection screen 301 displayed on the operations panel 57. As illustrated in FIG. 10, the scenario selection screen 301 displays a message "which scenario would you like to select?", a scenario list 302, and an "OK" button 302.

The scenario list 302 includes a scenario 1, a scenario 2, and a scenario 3 each composed of "scenario+number", but alternatively, the central-execution section 31 may display the scenario list 302 having more straightforward names registered in advance by the user. When the user presses a not-shown "details" button in the scenario list 302, the details of each of the scenarios are displayed on the operations panel 57.

After having looked through the details of each of the scenarios, the user selects one of the scenarios from the scenario list 302. The operations panel 57 then highlights the selected one of the scenarios in the scenario list 302. Subsequently, when the user selects the same scenario in the scenario list 302, the operations panel 57 cancels the highlight of the selected scenario; however, when the user selects a scenario different from the selected one, the operations panel 57 highlights two selected scenarios in the scenario list 302. In this embodiment, it is assumed that plural scenarios are selected in the scenario list 302. Note that if one scenario is allowed to have duplicated delivery destination information registered in it, the procedure of deleting duplicated delivery destinations described in this embodiment may be applied to such a case without the user's selecting plural scenarios in the scenario list 302.

If the user presses the "OK" button while displaying highlighted scenarios in the scenario list 302, the central-execution section 31 receives an execution request for executing the selected scenarios (S9). On receiving the execution request, the central-execution section 31 specifies the selected scenarios and stores these in the HDD or the like. Since each of the scenarios has a corresponding number, the central-execution section 31 specifies the selected scenario by the corresponding number.

Referring back to FIGS. 9A and 9B, the central-execution section 31 requests the duplicated scenario destination identification section 36 to determine whether plural scenarios have been selected (S10). The plural scenario selection determination section 36 determines whether the user has selected plural scenarios, and transmits an obtained result to the central-execution section 31 (S11). Note that there may be some methods for determining whether the user has selected plural scenarios. For example, the plural scenario selection determination section 36 may determine whether the user has selected plural scenarios based on whether plural different scenarios' sequential numbers exist in the scenarios received by the central-execution section 31. Note that the obtained result in this embodiment is "Yes".

If the plural scenarios are selected (i.e., the obtained result is "Yes"), the central-execution section 31 queries the duplicated scenario destination identification section 35 about the duplicated delivery destination information among the plural scenarios (S12). The duplicated scenario destination identification section 35 requests the scenario destination acquisition section 34 to acquire or extract the delivery destination information from the plural scenarios (S13). The scenario destination acquisition section 34 extracts the delivery destination information from each of the plural selected scenarios and transfers the extracted delivery destination information to the duplicated scenario destination identification section 35 (S14). This process is described with reference to FIGS. 7A to 7C.

FIG. 11 is a diagram illustrating an example of a set of selected plural scenarios. FIG. 11 illustrates a case where the user has selected three scenarios (i.e., scenarios 1 to 3). The scenario destination acquisition section 34 extracts corresponding delivery destination information from the selected scenarios 1 to 3 and transfers the corresponding extracted delivery destination information to the duplicated scenario destination identification section 35. In comparing the delivery destination information (i.e., address) of the scenario 1 with that of the scenario 2, the address "BBB@bbb" is a duplicated address contained in the two scenarios 1 and 2. Accordingly, the duplicated scenario destination identification section 35 identifies the address "BBB@bbb" as the duplicated address (duplicated delivery destination information). The duplicated scenario destination identification section 35 transfers all the selected scenarios that include the duplicated delivery destination information (obtained as a result of the query) to the central-execution section 31 (S15).

The central-execution section 31 creates new scenarios or modifies the scenarios including the duplicated delivery destination information such that the image delivery server 14 transmits image data once to the address (duplicated address) in question, and requests the scenario registration request section 38 to register the new or modified scenarios with the AD 12 (S16).

As noted below, there are different methods by which the image forming apparatus 13 carries out processing on the scenarios that include duplicated addresses of the duplicated delivery destination information such that the image delivery server 14 transmits image data once to the duplicated address.

(C1) The duplicated delivery destination information (i.e., duplicated address) is retained in one of the scenarios each having duplicated addresses, and removed from the rest of the scenarios. Referring to FIG. 11 to describe the method (C1), the duplicated address "BBB@bbb" is retained in the scenario 1, and removed from the scenario 2.

FIG. 12A is a diagram illustrating an example of scenarios one of which is modified based on the method (C1). As illustrated in FIG. 12A, since the duplicated address "BBB@bbb" is removed from the scenario 2, there are no more scenarios that include the duplicated delivery destination information (duplicated addresses). Note that alternatively, the duplicated address "BBB@bbb" may be retained in the scenario 2, and be removed from the scenario 1.

(C2) One of the scenarios each having duplicated addresses is retained in the scenarios subject to image processing carried out by the image forming apparatus 13 and the other (s) also having the duplicated address (es) is deleted from the scenarios subject to image processing carried out by the image forming apparatus 13. Referring to FIG. 11 to describe the method (C2), the scenario 1 having the duplicated address "BBB@bbb" is retained in the scenarios subject to image processing carried out by the image forming apparatus 13, and the scenario 2 also having the duplicated address "BBB@bbb" is deleted from the scenarios subject to image processing carried out by the image forming apparatus 13. In this case, the image data are not delivered to the address "CCC@ccc" originally contained in the scenario 2 (see scenario 2 in FIG. 11), however, the image data are not transmitted twice to the duplicated address "BBB@bbb".

FIG. 12B is a diagram illustrating an example of scenarios obtained based on the method (C2). As illustrated in FIG. 12B, since the scenario 2 is deleted from the scenarios subject to image processing carried out by the image forming apparatus 13, there are no more scenarios that include the duplicated delivery destination information (duplicated addresses). Note that in order to transmit the image data to the address "CCC@ccc" contained in the deleted scenario 2, the image forming apparatus 13 may remove the scenario 2 from the scenarios subject to image processing carried out by the image forming apparatus 13, provided that the scenario 2 alone contains a particular address that is not present in the rest of the scenarios.

(C3) New scenarios each with one address (duplicated address) are created based on the scenarios that include the duplicated addresses and the new scenarios are added to the scenarios subject to image processing (new set of scenario) carried out by the image forming apparatus 13. Then, one of the scenarios that includes the duplicated addresses is deleted from the new set of the scenarios subject to image processing carried out by the image forming apparatus 13. Referring to FIG. 11 and FIG. 12C to describe the method (C3), a new scenario 1-1 having the address "AAA@aaa" (see scenario 1-1 in FIG. 12C) and another new scenario 1-2 having the address "BBB@bbb" (not shown) are created based on the original scenario 1 (see scenario 1 in FIG. 11), and a new scenario 2-1 having the address "CCC@ccc" (see scenario 2-1 in FIG. 12C) and another new scenario 2-2 having the address "BBB@bbb" (see scenario 2-2 in FIG. 12C) are created based on the original scenario 2 (see scenario 2 in FIG. 11). Thereafter, one of the scenarios 1-2 and 2-2 each having the duplicated address (in this case "BBB@bbb") is removed from the new set of the scenarios subject to image processing carried out by the image forming apparatus 13 (not-shown scenario 1-2 is removed in this case). Note that the original scenarios based on which the above new scenarios are created are also removed form the new set of the scenarios subject to image processing (i.e., original scenarios 1 and 2 in FIG. 11 in this case).

FIG. 12C is a diagram illustrating an example of scenarios obtained based on the method (C3). As illustrated in 12C, the new set of the scenarios obtained based on the method (C3) includes the scenario 1-1, the scenario 2-1, the scenario 3, and the scenario 2-2. That is, the new scenario 1-2 having the duplicated address "BBB@bbb" has been removed from the newly created scenarios 1-1, 1-2, 2-1, and 2-2 described above. Since the new scenario 1-2 having the duplicated address "BBB@bbb" is removed from the newly created scenarios 1-1, 1-2, 2-1, and 2-2, there are no more duplicated addresses (duplicated delivery destination information) in the new scenarios obtained based on the method (C3). In the method (C3), scenarios having the same delivery addresses but having different reading settings are temporarily created, which makes it easier for the user to select desired scenarios. For example, the user may leave one of the scenarios that has the highest resolution or that has the full-color mode in the reading setting.

Referring back to FIGS. 9A and 9B, the scenario registration request section 38 registers the new scenarios having no duplicated delivery destination information (i.e., addresses) in the AD 12 (S16). Except for the examples of the scenarios illustrated in FIG. 12B, the new scenarios or the modified scenarios are not consistent with the original scenarios registered in the AD 12. Accordingly, the delivery server 14 will not be able to determine whether the new scenarios are valid unless those are registered in the AD 12.

The central-execution section 31 requests the scenario registration request section 38 to register the new scenarios or modified scenarios in the AD 12. Note that the new scenarios or modified scenarios are subject to be registered in the AD 12 provided that they have not been registered in the AD 12. That is, the modified scenario 2' illustrated in FIG. 12A, and the new scenarios 1-1, 2-1, and 2-2 illustrated in FIG. 12C are subject to be registered in the AD 12. Note that with the examples of the scenarios illustrated in FIG. 12B, one of the scenarios is merely deleted by the above method (C2), so that there are no modified or new scenarios to be registered in the AD 12.

The scenario registration request section 38 specifies the new scenarios and modified scenarios having no duplicated delivery destination information to be registered in the AD 12. The scenario registration request section 38 transfers new scenarios and modified scenarios having no duplicated delivery destination information to the scenario registration section 26 of the AD 12 and requests the scenario registration section 26 to register the transferred scenarios (S17).

The scenario registration section 26 newly registers the received scenarios in the scenario DB 28 (S18). FIG. 13 is a diagram illustrating an example of the scenario DB 28 before registering the modified scenario and after registering the modified scenario based on the method (C1). The scenario DB 28 after registering the modified scenario includes a newly registered scenario 2' that is obtained by deleting the address "BBB@bbb" from the original scenario 2, in addition to the original scenarios 1 through 3. FIG. 14 is a diagram illustrating an example of the scenario DE 28 before registering the new scenarios and after registering the new scenarios based on the method (C3). As illustrated in FIG. 14, the scenario DB 28 after registering the new scenarios includes newly registered scenarios 1-1 (the first row in FIG. 12C), 2-1 (the second row in FIG. 12C), and 2-2 (the fourth row in FIG. 12C), in addition to the original scenarios 1 through 3.

That is, the number of scenarios registered in the scenario DB 28 is increased by the number of newly registered scenarios. Alternatively, the new scenarios or modified scenarios may overwrite the original scenarios. Further, the central-execution section 31 switches between whether to newly register the new scenarios or modified scenarios with the scenario DB 28 or whether to allow the new scenarios or modified scenarios to overwrite the original scenarios in the scenario DE based on the user's selection.

Referring back to FIGS. 9A and 9B, the scenario registration section 26 acquires the registered results from the scenario DB 28 (S19), and transfers the acquired registered results to the scenario registration request section 38 (S20). The scenario registration request section 38 transfers the received registered results to the central-execution section 31 (S21).

Next, the central-execution section 31 requests the document read section 33 to read a document based on the new scenarios or modified scenarios having no duplicated delivery destination information (i.e., registered results) (S22). The document read section 33 sets the reading setting of the scenario as a parameter to operate the scanner 69 to read the document to generate image data. The document read section 33 transfers the image data to the central-execution section 31 (S23). Since the plural scenarios are selected, the document read section 33 reads the document based on each of the scenarios to generate plural image data, and transfers the generated plural image data to the central-execution section 31.

The central-execution section 31 transfers the generated plural image data together with the selected plural scenarios based on which the document has been read to the data transmission section 32 (S24). The data transmission section 32 transfers the generated plural image data together with the selected plural scenarios based on which the document has been read to the image delivery section 42 of the image delivery server 14 (S25).

The image delivery section 42 requests the scenario validity evaluation section 41 to evaluate the validity of the attached scenarios (S26). The image delivery section 42 transfers the attached scenarios to the scenario validity evaluation section 41.

The scenario validity evaluation section 41 transmits the user names contained in the attached scenarios to the scenario search section 29 to search for the registered scenarios associated with the respective user names (S27). The scenario search section 29 searches the scenario DB 28 for the scenarios associated with the respective user names (S28). The scenario search section 29 acquires the retrieved scenarios associated with the user names contained in the scenarios (S30) and transfers all the retrieved scenarios associated with the user names to the scenario validity evaluation section 41 (S30).

The scenario validity evaluation section 41 determines whether the scenarios attached to the transferred image data match the scenarios transferred from the scenario search section 29, and transmits the determined result to the image delivery section 42 (S31). Note that since only the scenarios having no duplicated delivery destination information are registered in the scenario DB 28, the determined result in this case is "OK".

The image delivery section 42 transmits the received result indicating that the reception of the image data delivery has normally been completed to the data transmission section 32 of the image forming apparatus 13 (S32). The data transmission section 32 transfers the received result indicating that the reception of the image data delivery has normally been completed to the central-execution section 31 (S33). Note that after step S29, the image delivery section 42 delivers the image data based on each of the delivery settings in the scenarios.

As described above, in the image forming apparatus utilization system 100 according to the first embodiment, if plural scenarios are selected, duplicated delivery destination information are deleted from the plural scenarios by one of the above-described methods. Accordingly, although the document is read based on the different reading conditions to generate image data, the image data may be prevented from being transmitted two or more times to the same address. Further, since computers to which the image data are delivered may be prevented from receiving the image data two or more times, storage regions of such computers may have an increase in their available capacities. Moreover, the transmission cost may also be reduced.

[Second Embodiment]

An image forming apparatus utilization system 100 according to a second embodiment capable of modifying scenarios such that the image delivery server 14 transmits image data once to the duplicated addresses of the delivery destination information is specifically described.

Figure 15:
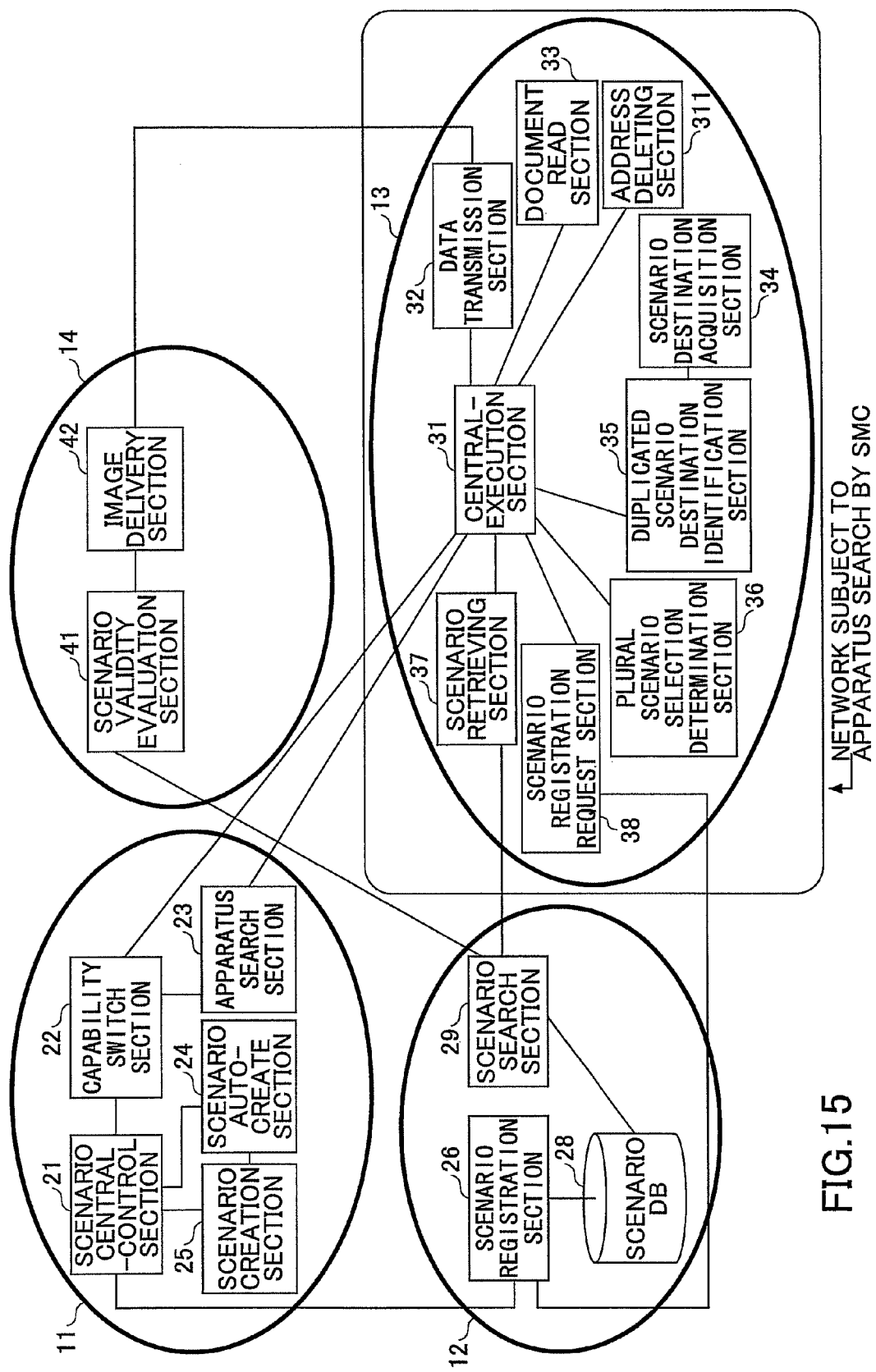
FIG. 15 is a block diagram illustrating an example of functional components of an image forming apparatus utilization system according to a second embodiment.

FIG. 15 is a block diagram illustrating an example of functional components of the image forming apparatus utilization system 100 according to the second embodiment. As illustrated in FIG. 15, components identical to those of FIG. 6 are provided with the same reference numerals and the descriptions thereof are omitted. In the image forming apparatus utilization system 100 according to the second embodiment, the image forming apparatus 13 includes an address deleting section 311 (e.g., scenario processing unit). The address deleting section 311 is configured to delete duplicated delivery destination information in the plural scenarios. Accordingly, in the second embodiment, the specific component (element) for carrying out the method C1 is explicitly described. The address deleting section 311 retains the duplicated delivery destination information (i.e., duplicated address) in one of the scenarios having duplicated addresses, and deletes it from the rest of the scenarios.

Figure 16A:
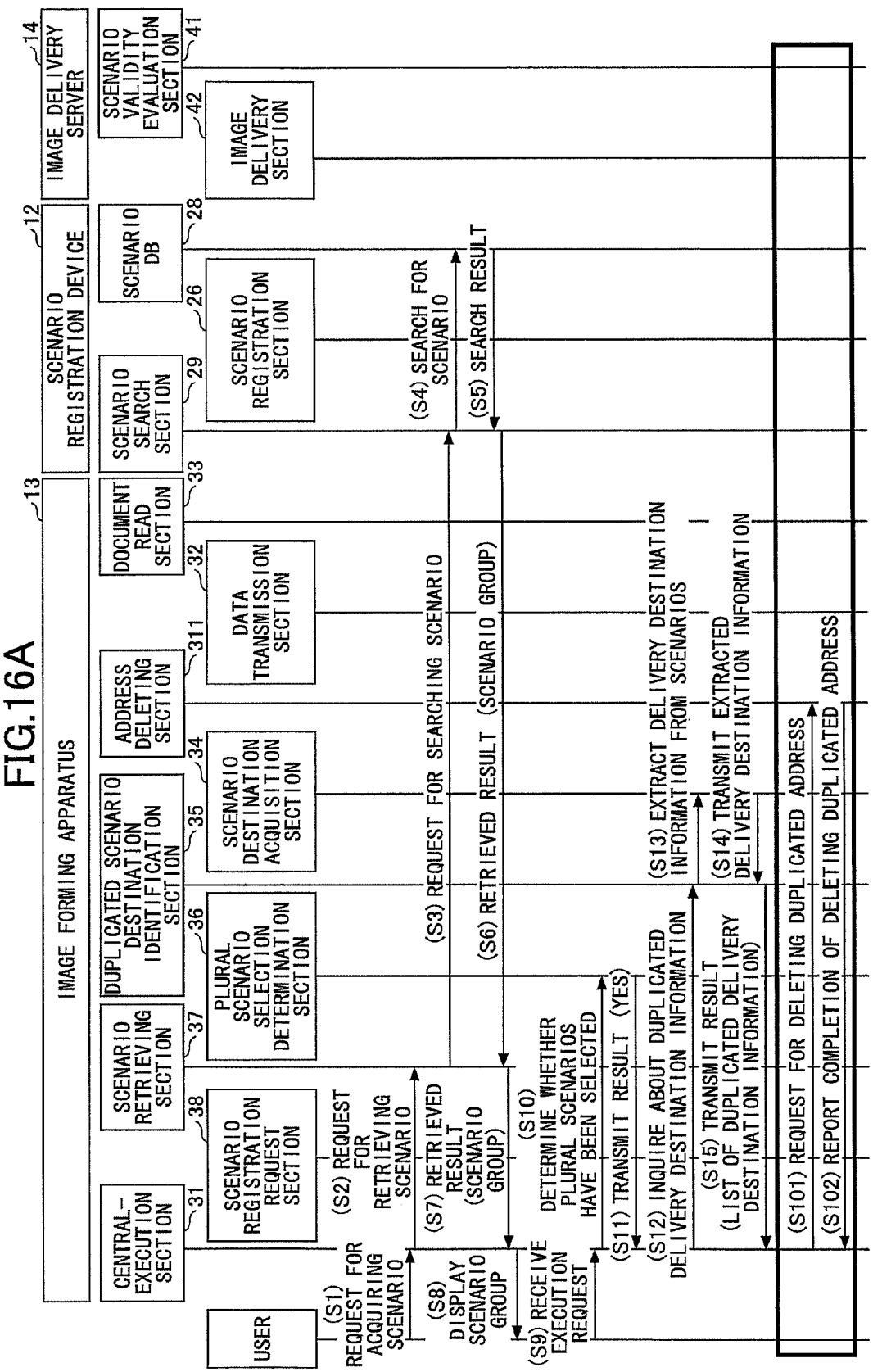

FIGS. 16A and 16B depict a sequence diagram illustrating an example of a procedure in which one of duplicated delivery destination information contained in plural scenarios is deleted and the validity of the deleted delivery destination information is evaluated. Note that in FIGS. 16A and 16B, components identical to those of FIGS. 9A and 9B are provided with the same reference numerals and the descriptions thereof are omitted. Note that steps S1 through S15 of the second embodiment illustrated in FIGS. 16A and 16B are identical to those of the first embodiment.

As illustrated in the second embodiment, the duplicated scenario destination identification section 35 transfers all the selected scenarios that include the duplicated delivery destination information (obtained as a result of the query) to the central-execution section 31 (S15) as illustrated in FIGS. 16A and 16B.

The central-execution section 31 requests the address deleting section 311 to delete the duplicated delivery destination information (S101). The address deleting section 311 acquires all the duplicated delivery destination information from the central-execution section 31, and deletes the duplicated delivery destination information based on the following procedure:

(i) The address deleting section 311 specifies scenarios having duplicated delivery destination information. Referring back to FIG. 11 as an example, the address deleting section 311 specifies the scenarios 1 and 2.

(ii) The address deleting section 311 selects one of the specified scenarios having duplicated delivery destination information in order to leave the duplicated delivery destination information in the selected scenario alone. There may be several methods to select one of the specified scenarios having duplicated delivery destination information. For example, the selection may be determined based on the scenarios themselves, based on the scenarios' sequential numbers, or the order of scenario selection. When the selection of the scenario is determined based on the scenarios themselves, the address deleting section 311 selects one of the specified scenarios in which the duplicated delivery destination information is to be retained based on the resolution (high or low resolution), or the color mode for reading a document (full color or monochrome). Such methods to select one of the scenarios are registered in advance with the address deleting section 311. Referring still to FIG. 11 as the example, it is assumed that the scenario 1 is selected for one of the scenarios that only includes the duplicated delivery destination information.

(iii) The address deleting section 311 deletes the duplicated delivery destination information from the rest of the specified scenarios having duplicated delivery destination information excluding only the selected one that is allowed to include the duplicated delivery destination information. Referring to FIG. 11, the address deleting section 311 deletes the address "BBB@bbb" from the scenario 2. Accordingly, the scenario 2 includes the address "CCC@aaa" alone as illustrated in FIG. 12A.

The address deleting section 311 reports the completion of deleting the above address to the central-execution section 31 (S102).

Subsequent processing (i.e., steps) is the same as that, described in the first embodiment, and the description thereof is thus omitted. The central-execution section 31 requests the scenario DB 28 to newly register the modified scenario (s) (e.g., the scenario 2 in the example of FIG. 11) from which the duplicated delivery destination information (e.g., address "BBB@bbb") has been deleted (S16). The scenario registration request section 38 transfers the modified scenario 2 illustrated as the "scenario 2'" in FIG. 12A to the scenario registration section 2 of the AD 12 and requests the scenario registration section 26 to register the transferred modified scenario 2 (i.e., scenario 2') (S17). The scenario DB 28 registers the scenarios 1 through 3, and the scenario 2' as illustrated in FIG. 13.

As described above, in the image forming apparatus utilization system 100 according to the second embodiment, if plural scenarios are selected, duplicated delivery destination information are deleted from the plural scenarios by the above-described method. Accordingly, although the document is read based on the different reading conditions to generate image data, the image data may be prevented from being transmitted two or more times to the same address. Further, since computers to which the image data are delivered may be prevented from receiving the image data two or more times, storage regions of such computers may have an increase in their available capacities. Moreover, the transmission cost may also be reduced.

[Third Embodiment]

An image forming apparatus utilization system 100 according to a third embodiment capable of causing the image delivery server 14 to transmit image data once to the duplicated address of the delivery destination information without having to register new scenarios or modified scenarios by utilizing the order of scenario selection is specifically described.

Figure 17:
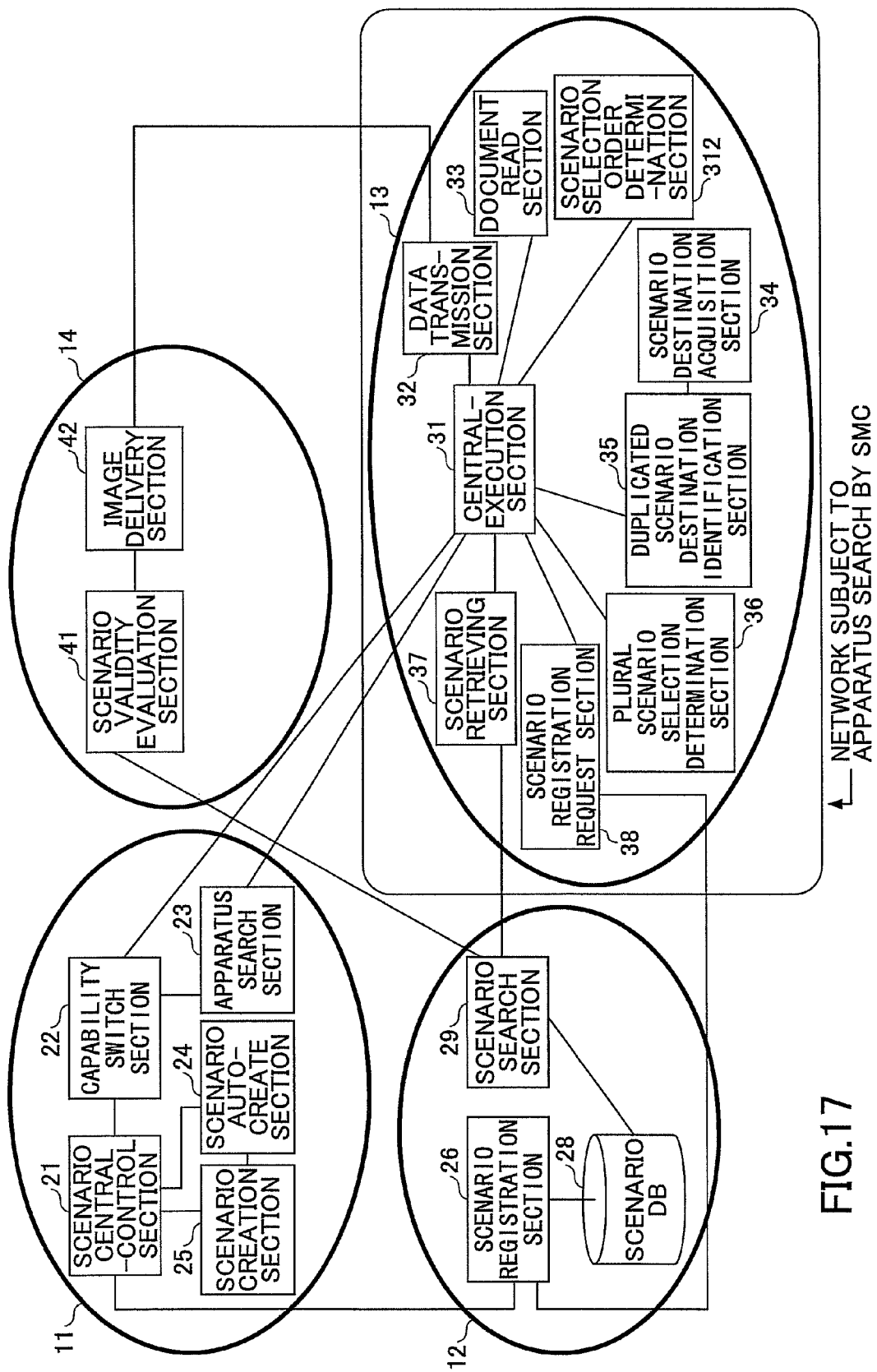
FIG. 17 is a block diagram illustrating an example of functional components of an image forming apparatus utilization system according to a third embodiment.

FIG. 17 is a block diagram illustrating an example of functional components of the image forming apparatus utilization system 100 according to the third embodiment. As illustrated in FIG. 17, components identical to those of FIG. 6 are provided with the same reference numerals and the descriptions thereof are omitted. In the image forming apparatus utilization system 100 according to the third embodiment, the image forming apparatus 13 includes a scenario selection order determination section 312 (scenario selection order determination unit). The scenario selection order determination section 312 identifies a selected order of scenarios when the user has selected plural scenarios. As illustrated in FIG. 10, the user sequentially selects the scenarios from the scenario selection screen 301 displayed on the operations panel 57. The central-execution section 31 detects the selected content. The scenario selection order determination section 312 acquires a scenario's sequential number whenever the user selects one of the scenarios and stores the scenario in the RAM or the HDD in the order of selection.

FIG. 18 is a diagram illustrating an example of scenarios' sequential numbers recorded by the scenario selection order determination section 312 that are shown in a selected order. The scenarios' sequential numbers are associated with their selected order and stored in the scenario selection order determination section 312. The scenario selection order determination section 312 reports selected order of the plural scenarios to the central-execution section 31, and the central-execution section 31 requests the document read section 33 to read the one of the scenarios having the duplicated delivery destination information that has been selected first.

If the scenario having the duplicated delivery destination information is selected in that manner, the scenario need not be modified. Accordingly, the scenario registration section 26 does not need to newly register the modified scenario in the scenario DB 28.

Figure 19A:
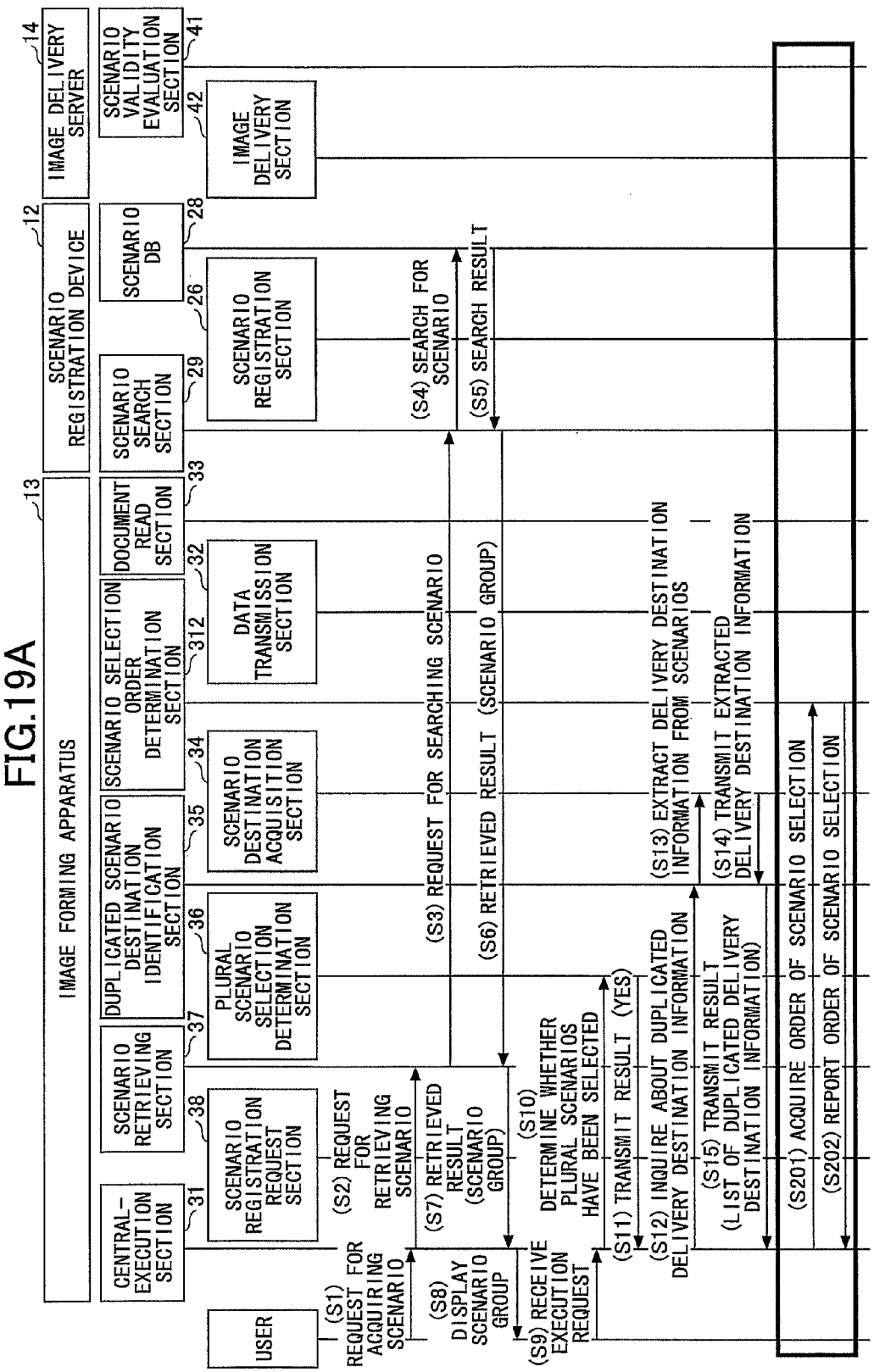
FIGS. 19A and 19B depict a sequence diagram illustrating an example of a procedure in which a first scenario in the order of selection is specified.
Figure 19B:
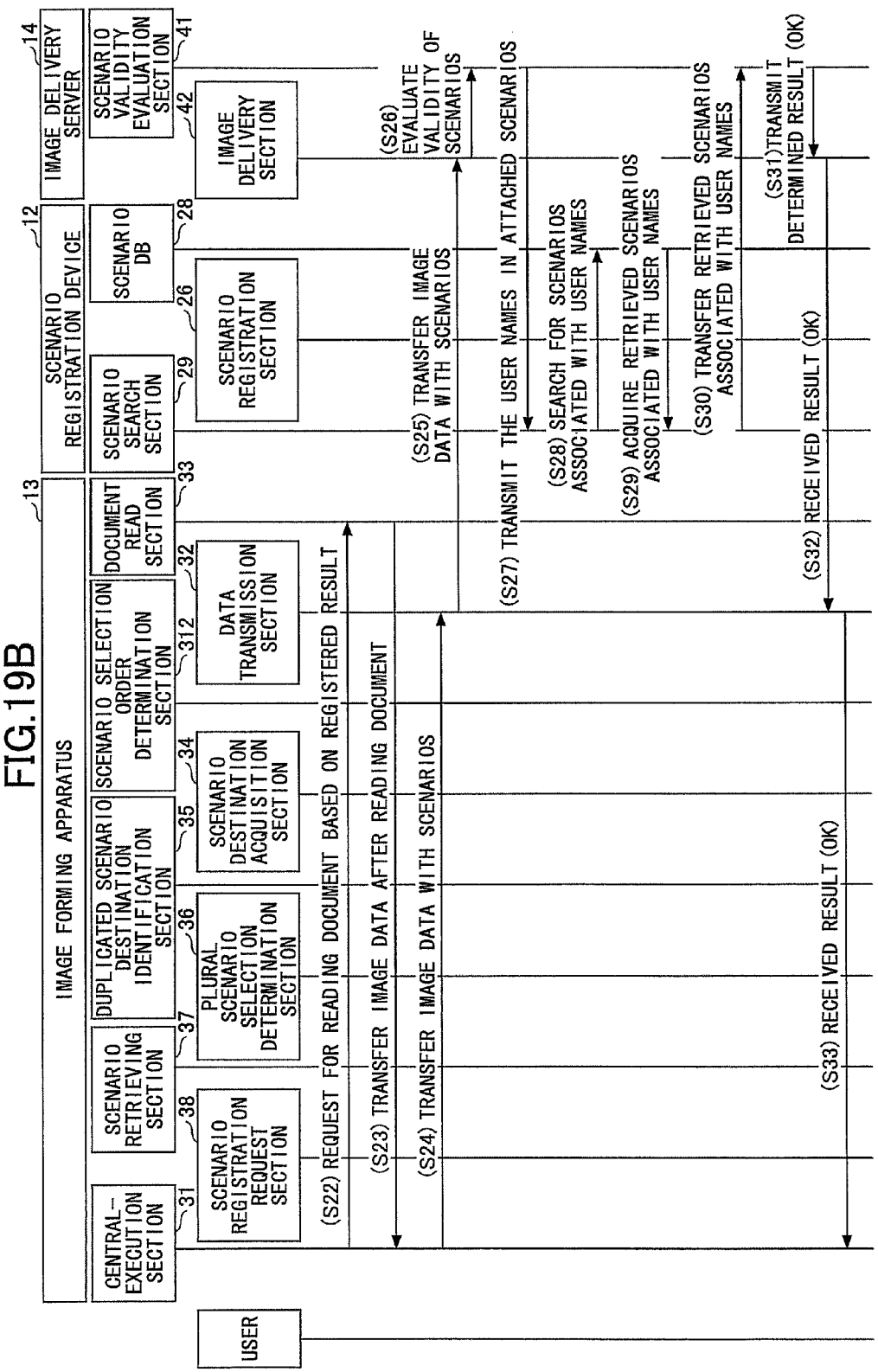

FIGS. 19A and 19B depict a sequence diagram illustrating an example of a procedure in which the image forming apparatus 13 specifies a first scenario in the order of selection and executes the specified scenario. Note that in FIGS. 19A and 19B, components identical to those of FIGS. 9A and 9B are provided with the same reference numerals and the descriptions thereof are omitted. Note that steps S1 through S15 of the third embodiment illustrated in FIGS. 19A and 19D are identical to those of the first and second embodiments. The scenario selection order determination section 312 stores the selected order of the scenarios illustrated in FIG. 18 insteps S1 through S15, in particular, in step S9.

As illustrated in the first and the second embodiments, the duplicated scenario destination identification section 35 transfers all the selected scenarios that include the duplicated delivery destination information (obtained as a result of the query) to the central-execution section 31 (S15) as illustrated in FIGS. 19A and 19B.

The central-execution section 31 requests the scenario selection order determination section 312 to provide the order of scenario selection (S201). The scenario selection order determination section 312 reports the order of scenario selection for the selected scenarios to the central-execution section 31 (S202).

Note that since the order of scenario selection is reported for each of the selected scenarios (i.e., scenarios 1 through 3 in FIG. 10), the order of scenario selection for the scenario that includes no duplicated delivery destination information (i.e., the scenario 3 in FIG. 10) is also reported. Thus, the central-execution section 31 needs to specify the scenario having duplicated delivery destination information (in this case scenario 3) among the scenarios (1 through 3) whose order of scenario selection is reported from the duplicated scenario destination identification section 35. Referring back to the example in FIG. 11, since the duplicated delivery destination information is the address "BBB@bbb", the central-execution section 31 specifies the scenario 1 and scenario 2 each having the address "BBB@bbb".

The central-execution section 31 determines which one of the scenario 1 and the scenario 2 is selected first based on the selected order of scenario selection reported from the scenario selection order determination section 312. In the example in FIG. 18, since the scenario 1 is selected first, the central-execution section 31 determines the scenario 1 as the first scenario that has been selected from the scenarios 1 and 3.

Thus, the central-execution section 31 determines not to read the document based on the scenario 2. The central-execution section 31 then requests the document read section 33 to read the document based on the scenario 1 and the scenario 3 as illustrated in FIGS. 19A and 19B (S22).

Note that as can be clear from the example of FIGS. 19A and 19B, steps S16 to S21 of the first embodiment illustrated in FIGS. 9A and 9B or those of the second embodiment illustrated in FIGS. 16A and 16B are not executed in the third embodiment. Since neither the scenario 1 nor the scenario 3 are modified in the third embodiment, the delivery server 14 is able to determine whether the attached scenarios 1 and 3 are valid without having to newly register the scenario 1 and the scenario 3 in the scenario DB 28.

As described above, in the image forming apparatus utilization system 100 according to the third embodiment, if plural scenarios are selected, only one of the scenarios having the duplicated delivery destination information is selected in the order of scenario selection. Accordingly, although the document is read based on the different reading conditions to generate image data, the image data may be prevented from being transmitted two or more times to the same address. Further, since computers to which the image data are delivered may be prevented from receiving the image data two or more times, storage regions of such computers may have an increase in their available capacities. Since the image data are transmitted based on the delivery setting of the scenario that has been selected first, the user can easily identify which one of the scenario's delivery settings is used for reading the document. Moreover, the transmission cost may also be reduced. Further, since the scenario DB 28 does not need to register any other scenarios (i.e., new or modified scenarios), the available capacity of the scenario DB 28 may also be increased.

[Fourth Embodiment]

An image forming apparatus utilization system 100 according to a fourth embodiment capable of causing the image delivery server 14 to transmit image data once to the duplicated address of the delivery destination information without having to register new scenarios or modified scenarios by utilizing the cost of scenario execution is specifically described.

Figure 20:
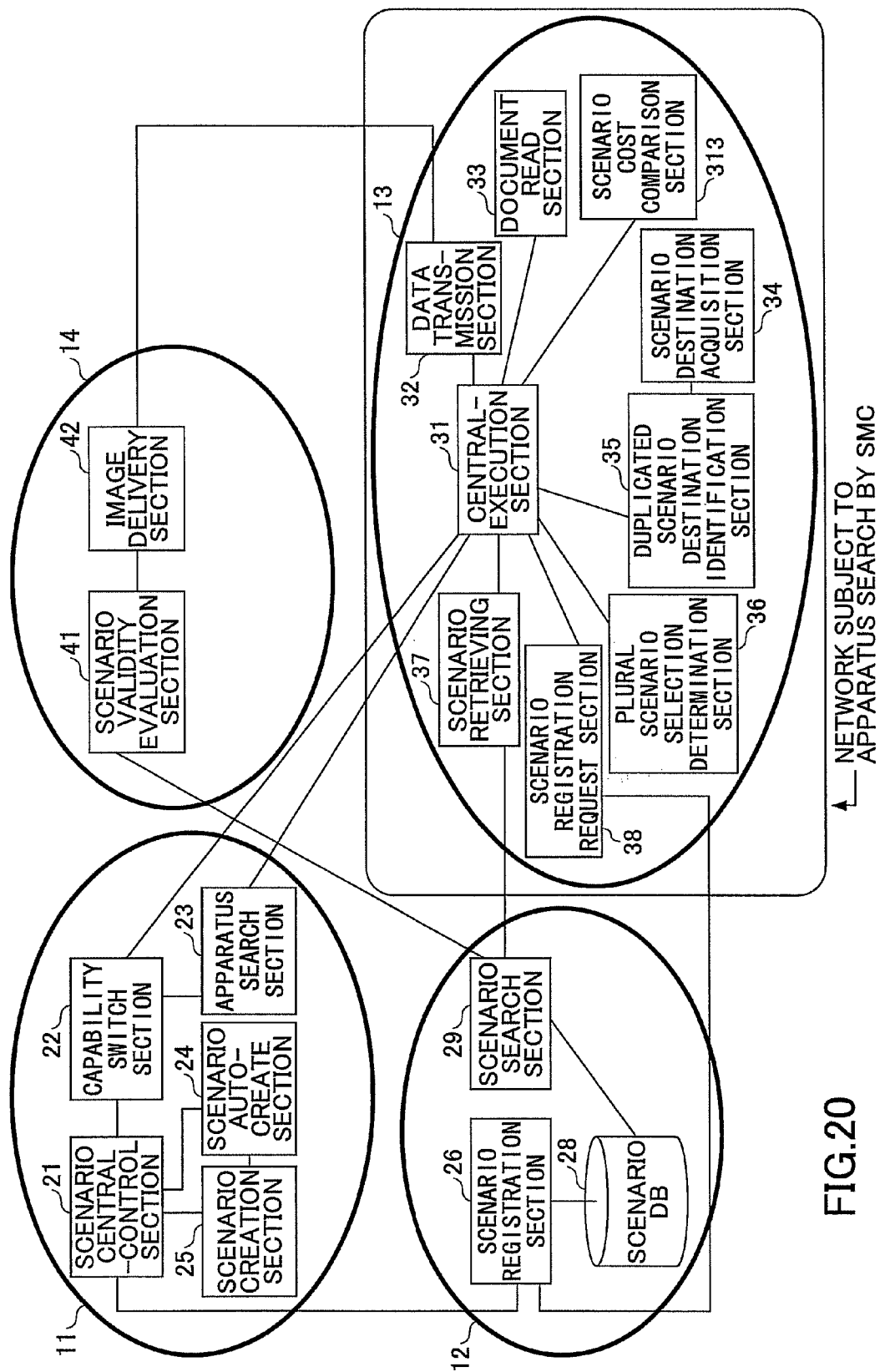
FIG. 20 is a block diagram illustrating an example of functional components of an image forming apparatus utilization system according to a fourth embodiment.

FIG. 20 is a block diagram illustrating an example of functional components of the image forming apparatus utilization system 100 according to the fourth embodiment. As illustrated in FIG. 20, components identical to those of FIG. 6 are provided with the same reference numerals and the descriptions thereof are omitted. In the image forming apparatus utilization system 100 according to the fourth embodiment, the image forming apparatus 13 includes a scenario cost comparison section 313 (scenario cost computation unit). The scenario cost comparison section 313 compares the costs of transmitting image data (i.e., executing the scenarios) based on the respective reading settings and delivery settings of the scenarios. In this case, the cost of transmitting image data includes a delivery cost on the basis of a delivery method (delivery type) and an image cost on the basis of the size of an image. In the fourth embodiment, the delivery costs are initially compared among the scenarios. However, if the scenario is not able to be selected based on the comparison results of the delivery costs, the image costs are then compared. Note that the above-described comparing method is only an example. Various methods may be used for comparing the costs of transmitting image data. For example, for each of the scenarios, weights may be are assigned to the delivery cost and the image cost, and overall costs are compared between the scenarios. Or temporal cost may be used for that comparison.

For example, the delivery cost includes the following relationship.

(1-1) Delivery cost: Low/Delivery type: SMB
(1-2) Delivery cost: Moderate/Delivery type: E-mail, FTP
(1-3) Delivery cost: High/Delivery type: FAX The image cost includes the following relationship.
(2-1) Image cost: (Very low)/Color mode: Monochrome*Resolution: Low
(2-2) Image cost: (Low)/Color mode: Monochrome*Resolution: Moderate
(2-3) Image cost: (Relatively low)/Color mode: Monochrome*Resolution: High
(2-4) Image cost: (Relatively high)/Color mode: Full-color*Resolution: Low
(2-5) Image cost: (High)/Color mode: Full-color*Resolution: Moderate
(2-6) Image cost: (Very high)/Color mode: Full-color*Resolution: High The scenario cost comparison section 313 refers to the above-described table to assign cost ratings to the plural scenarios in ascending order of cost (i.e., from very low to very high), and reports the corresponding cost ratings assigned to the scenarios to the central-execution section 31. Note that the above-described table may be stored in advance in the HDD or the like of the image forming apparatus 13. The central-execution section 31 requests the document read section 33 to execute the scenario having the lowest cost rating selected from the scenarios having the duplicated delivery destination information. If the scenario having the duplicated delivery destination information is selected in that manner, the scenario need not be modified. Accordingly, the scenario registration section 26 need not newly register the modified scenario with the scenario DB 28.

FIGS. 21A and 21B depict a sequence diagram illustrating an example of a procedure in which the image forming apparatus 13 specifies a scenario that has the lowest cost rating and executes the specified scenario. Note that in FIGS. 21A and 21B, components identical to those of FIGS. 9A and 9B are provided with the same reference numerals and the descriptions thereof are omitted. Note that steps S1 through S15 of the fourth embodiment illustrated in FIGS. 21A and 21B are identical to those of the first to the third embodiments. As illustrated in the first to the third embodiments, the duplicated scenario destination identification section 35 transfers all the selected scenarios that include the duplicated delivery destination information (obtained as a result of the query) to the central-execution section 31 (S15) as illustrated in FIGS. 21A and 21D.

The central-execution section 31 requests the scenario cost comparison section 313 to provide the cost ratings of scenarios in ascending order of cost (S301). The scenario cost comparison section 313 refers to the above-described table to assign corresponding cost ratings to the plural scenarios in ascending order of cost (i.e., from very low to very high), and reports the corresponding cost ratings assigned to the scenarios to the central-execution section 31 (S302). Note that the scenario cost comparison section 313 assigns the corresponding cost ratings to all the scenarios (i.e., scenarios 1 through 3 in FIG. 11) regardless of their having or not having the duplicated delivery destination information. For example, the cost ratings ascend in the order of the scenarios 1, 2, and 3.

The central-execution section 31 needs to specify the scenario having duplicated delivery destination information among the scenarios whose cost ratings are reported from the duplicated scenario destination identification section 35. Referring back to the example in FIG. 11, since the duplicated delivery destination information is the address "BBB@bbb", the central-execution section 31 specifies the scenario 1 and the scenario 2 as having the address "BBB@bbb".

The central-execution section 31 determines which one of the scenario 1 and the scenario 2 is selected first based on the corresponding cost ratings of the scenarios reported from the scenario cost comparison section 313. In this case, it is assumed that the scenario 1 has the lowest cost rating, so that the central-execution section 31 removes the scenario 2 from the scenarios 1 through 3 that are subject to execution.

The central-execution section 31 then requests the document read section 33 to read the document based on the scenario 1 and the scenario 3 as illustrated in FIGS. 21A and 21B (S22).

Note that as can be clear from the example of FIGS. 21A and 21B, steps S16 to S21 of the first embodiment illustrated in FIGS. 9A and 9B or those of the second embodiment illustrated in FIGS. 16A and 16B are not executed in the fourth embodiment. Since neither the scenario 1 nor the scenario 3 is modified in the fourth embodiment, the delivery server 14 is able to determine whether the attached scenarios 1 and 3 are valid without having to newly register the scenario 1 and the scenario 3 in the scenario DB 28.

As described above, in the image forming apparatus utilization system 100 according to the fourth embodiment, if plural scenarios are selected, one of the scenarios having the duplicated delivery destination information is selected based on the cost ratings of the scenarios. Accordingly, although the document is read based on the different reading conditions to generate image data, the image data may be prevented from being transmitted two or more times to the same address. Further, since computers to which the image data are delivered may be prevented from receiving the image data two or more times, storage regions of such computers may have an increase in their available capacities. Moreover, the transmission cost may also be reduced in comparison to the above-described other embodiments. Furthermore, since the scenario DB 28 does not need to register any other scenarios (i.e., new or modified scenarios), the available capacity of the scenario DB 28 may also be increased.

[Fifth Embodiment]

In the image forming apparatus utilization system 100 according to the first to fourth embodiments, the image forming apparatus 13 deletes the duplicated delivery destination information or selects the scenario to be executed. An image forming apparatus utilization system 100 according to a fifth embodiment is capable of allowing the user to select the scenario to be executed.

Figure 22:
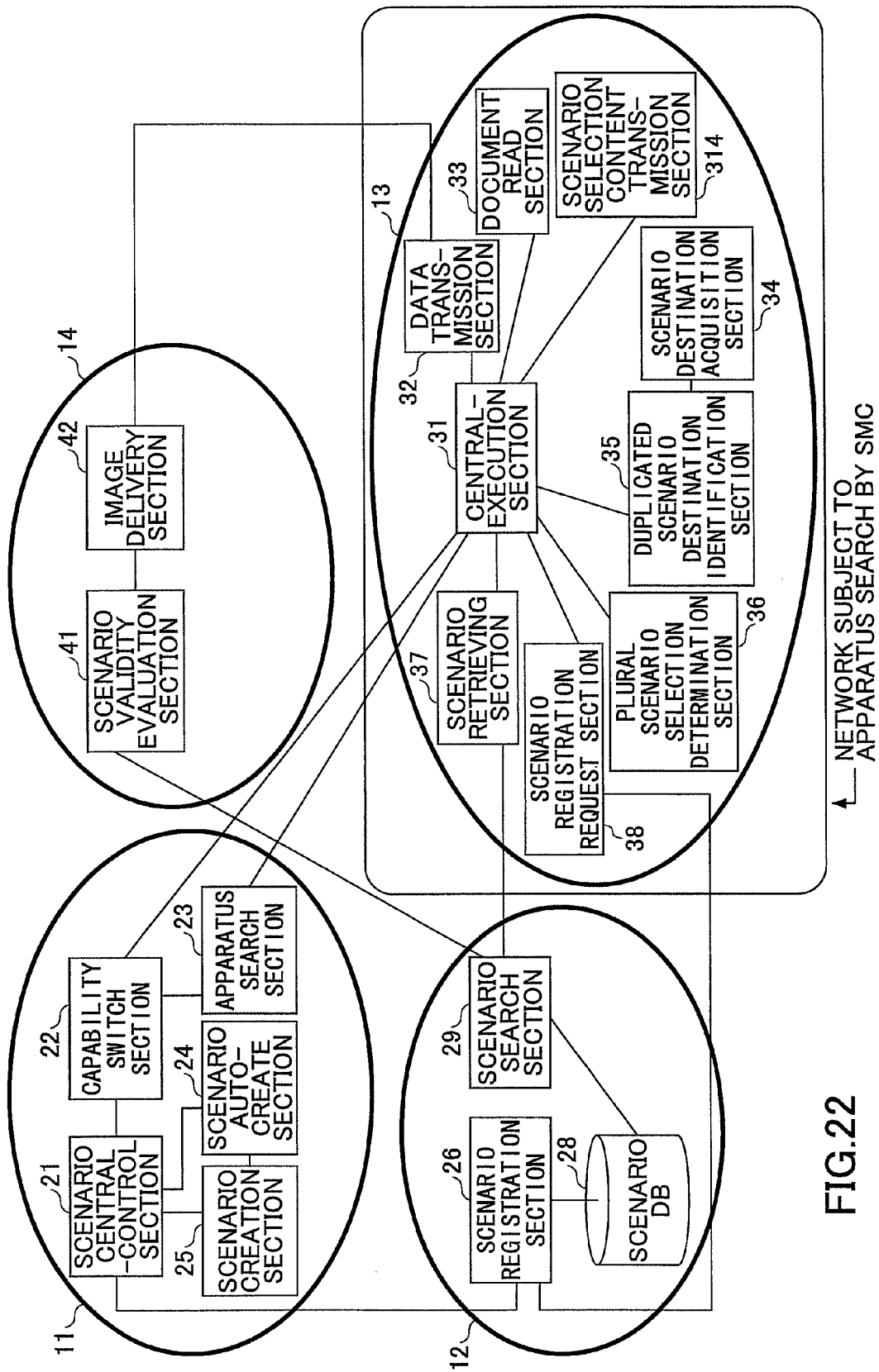
FIG. 22 is a block diagram illustrating an example of functional components of an image forming apparatus utilization system according to a fifth embodiment.

FIG. 22 is a block diagram illustrating an example of functional components of the image forming apparatus utilization system 100 according to the fifth embodiment. As illustrated in FIG. 22, components identical to those of FIG. 6 are provided with the same reference numerals and the descriptions thereof are omitted. In the image forming apparatus utilization system 100 according to the fifth embodiment, the image forming apparatus 13 includes a scenario selection content transmission section 314 (scenario selection content reception unit). The scenario selection content transmission section 314 displays a list of scenarios having duplicated delivery destination information on the operations panel 57 and receives the scenario selected by the user. In the fifth embodiment, the usability of the image forming apparatus utilization system 100 for the user is much improved because the user selects which scenario (having delivery destination information) he or she would like to execute.

Figure 23B:
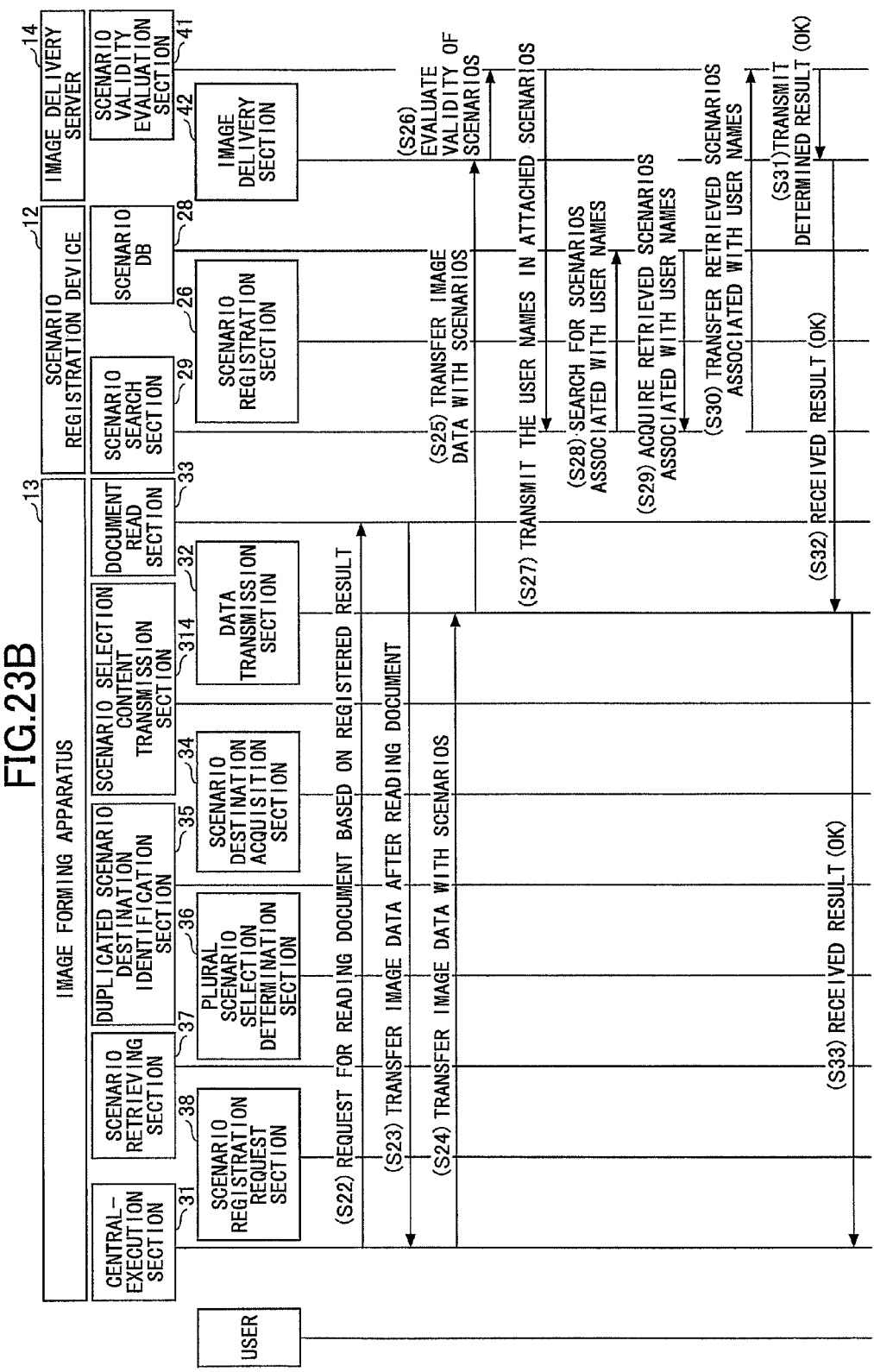

FIGS. 23A and 23B depict a sequence diagram illustrating an example of a procedure in which a user selects a scenario that includes duplicated delivery destination information. Note that in FIGS. 23A and 23B, components identical to those of FIGS. 9A and 9B are provided with the same reference numerals and the descriptions thereof are omitted. Note that steps S1 through S15 of the fifth embodiment illustrated in FIGS. 23A and 23B are identical to those of the first to fourth embodiments. As illustrated in the first to the fourth embodiments, the duplicated scenario destination identification section 35 transfers all the selected scenarios that include the duplicated delivery destination information (obtained as a result of the query) to the central-execution section 31 (S15) as illustrated in FIGS. 23A and 23B.

The central-execution section 31 requests the scenario selection content transmission section 314 to report the selected result of the scenario determined by the user (S401). The central-execution section 31 specifies the scenarios having duplicated delivery destination information reported by the duplicated scenario destination identification section 35. Referring back to the example in FIG. 11, since the duplicated delivery destination information is the address "BBB@bbb", the central-execution section 31 specifies the scenario 1 and the scenario 2 having the address "BBB@bbb". The central-execution section 31 reports the scenario 1 and the scenario 2 having the duplicated delivery destination information to the scenario selection content transmission section 314.

Figure 24:
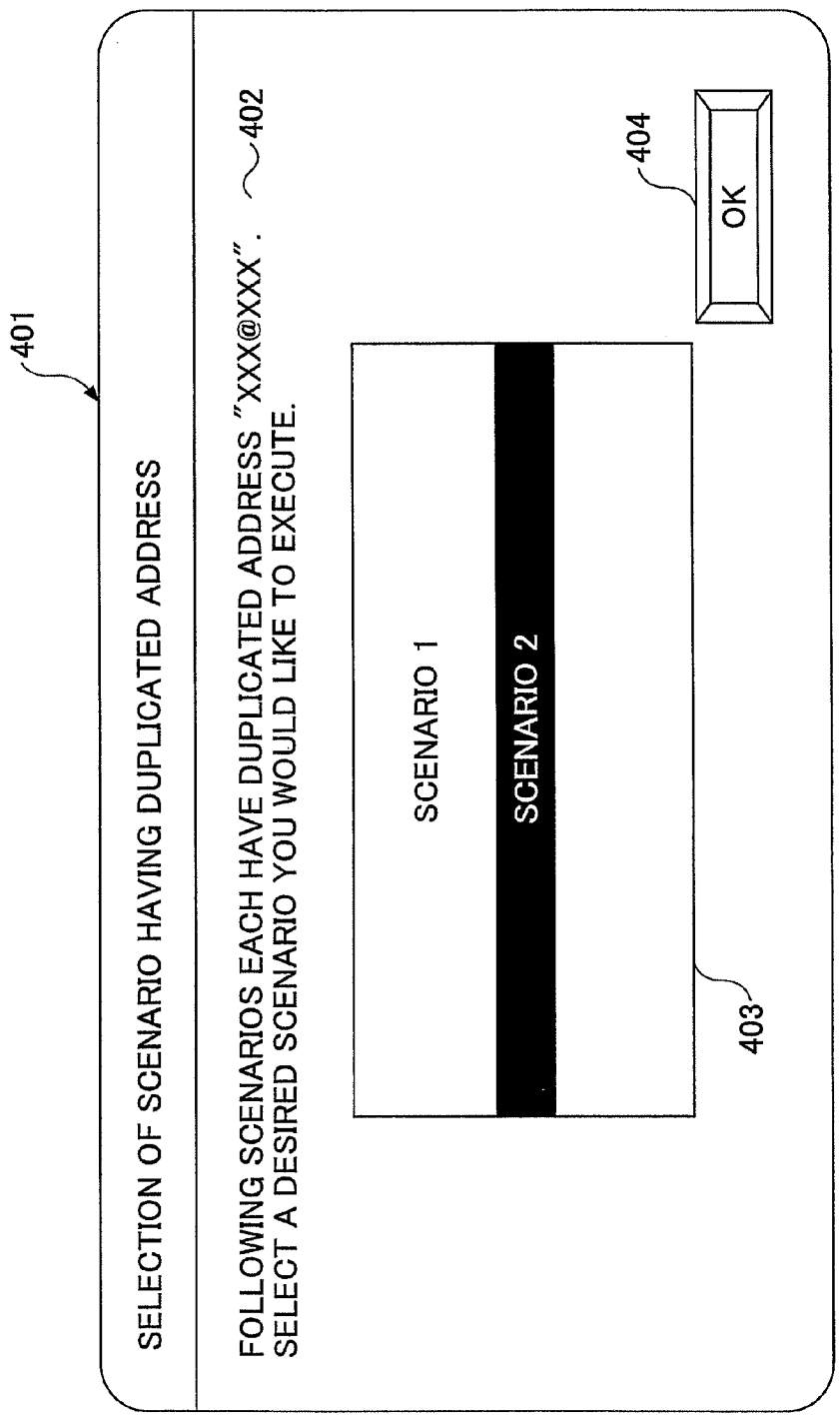
FIG. 24 is a diagram illustrating an example of a screen displaying a list of scenarios on an operations panel.

The scenario selection content transmission section 314 displays a list of the scenarios reported by the central-execution section 31 on the operations panel 57 so that the user can select a desired one of the scenarios (S402). FIG. 24 is a diagram illustrating an example of a screen 401 displaying a list of scenarios on the operations panel 57. As illustrated in FIG. 24, the scenario selection screen 401 displays a message 402 "the following scenarios have the duplicated address "XXX@xxx". Select a desired scenario you would like to execute", a scenario list 403, and an "OK" button 404. For example, with this screen 401, the user may press a not-shown "detail button" to check the delivery setting of each of the scenarios. When the user selects one of the scenarios from the scenario list 403, the scenario selection content transmission section 314 receives the selected scenario (S403). The scenario selection content transmission section 314 reports the received scenario (i.e., selected result determined by the user) to the central-execution section 31 (S404).

The central-execution section 31 selects the scenario 1 to be executed from the list of scenario 1 and scenario based on the selected result reported by the scenario selection content transmission section 314. Thus, the central-execution section 31 determines not to read the document based on the scenario 2. The central-execution section 31 then requests the document read section 33 to read the document based on the scenario 1 and the scenario 3 as illustrated in FIGS. 23A and 233 (S22).

Note that as can be clear from the example of FIGS. 23A and 233, steps S16 to S21 of the first embodiment illustrated in FIGS. 9A and 9B or those of the second embodiment illustrated in FIGS. 16A and 16B are not executed in the fifth embodiment. Since neither the scenario 1 nor the scenario 3 are modified in the fifth embodiment, the delivery server 14 is able to determine whether the attached scenarios 1 and 3 are valid without having to newly register the scenario 1 and the scenario 3 in the scenario DB 28.

As described above, in the image forming apparatus utilization system 100 according to the fifth embodiment, if plural scenarios are selected, one of the scenarios having the duplicated delivery destination information is selected by the user. Accordingly, although the document is read based on the different reading conditions to generate image data, the image data may be prevented from being transmitted two or more times to the same address. Further, since computers to which the image data are delivered may be prevented from receiving the image data two or more times, storage regions of such computers may have an increase in their available capacities. Moreover, the transmission cost may also be reduced. Furthermore, since the scenario DB 28 does not need to register any other scenarios (i.e., new or modified scenarios), the available capacity of the scenario DE 28 may also be increased. In the fifth embodiment, the usability of the image forming apparatus utilization system 100 for the user is much improved because the user selects which scenario (having delivery destination information) he or she would like to execute.

[Sixth Embodiment]

In the image forming apparatus utilization system 100 according to the third to fifth embodiments, the image forming apparatus operates in a predetermined manner. However, if the user can select the operations of the image forming apparatus 13, the usability of the image forming apparatus utilization system 100 may be much improved. An image forming apparatus utilization system 100 according to a sixth embodiment is capable of allowing the user to select one of the criteria including the "order of scenario selection", the "scenario cost rating", and the "selected result determined by the user" in advance, such that the image forming apparatus 13 is capable of selecting one of the scenarios based on the criterion selected by the user. A description is given below of the image forming apparatus utilization system 100 according to the sixth embodiment.

Figure 25:
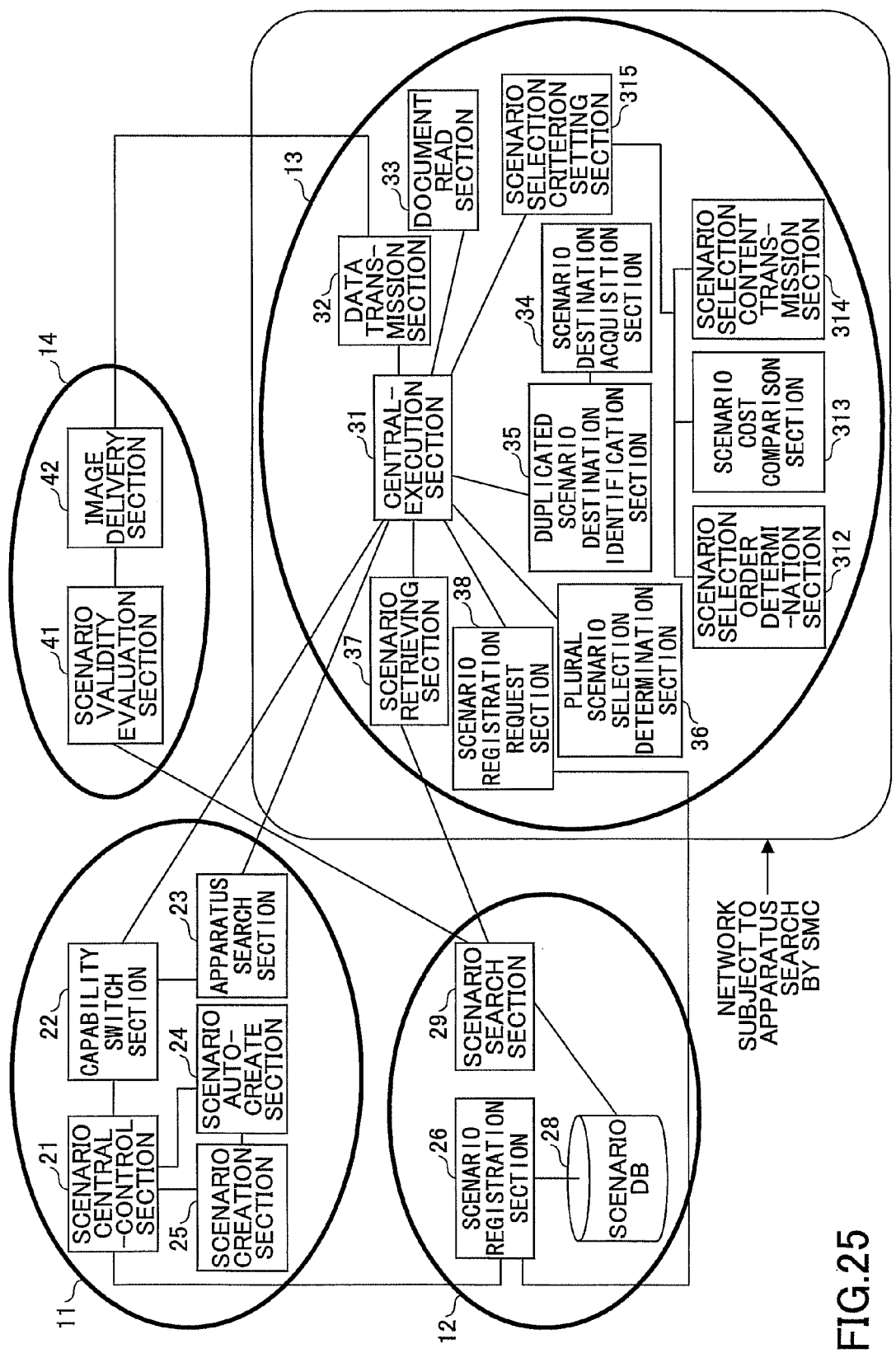
FIG. 25 is a block diagram illustrating an example of functional components of the image forming utilization system according to a sixth embodiment.

FIG. 25 is a block diagram illustrating an example of functional components of the image forming utilization system 100 according to the sixth embodiment. As illustrated in FIG. 25, components identical to those of FIG. 6 are provided with the same reference numerals and the descriptions thereof are omitted. In the image forming apparatus utilization system 100 according to the sixth embodiment, the image forming apparatus 13 includes a scenario selection criterion setting section 315 (scenario selection criterion reception unit). The scenario selection criterion setting section 315 is connected to the scenario selection order determination section 312, the scenario cost comparison section 313, and the scenario selection content transmission section 314. The scenario selection criterion setting section 315 displays a list of scenario selection criteria including the "order of scenario selection", the "scenario cost rating", and the "selected result determined by the user" for selecting one of the scenarios on the operations panel 57. When the user selects one of the scenario selection criteria, the scenario selection criterion setting section 315 receives the selected criterion to set it to the image forming apparatus 13.

Note that the user may select one of the scenario selection criteria with any operation or at any time. For example, the user may start setting one of the scenario selection criteria to the image forming apparatus 13 by pressing a "system initial configuration" key of the image forming apparatus 13 and subsequently selecting one of tabs of the displayed screen.

Figure 26:
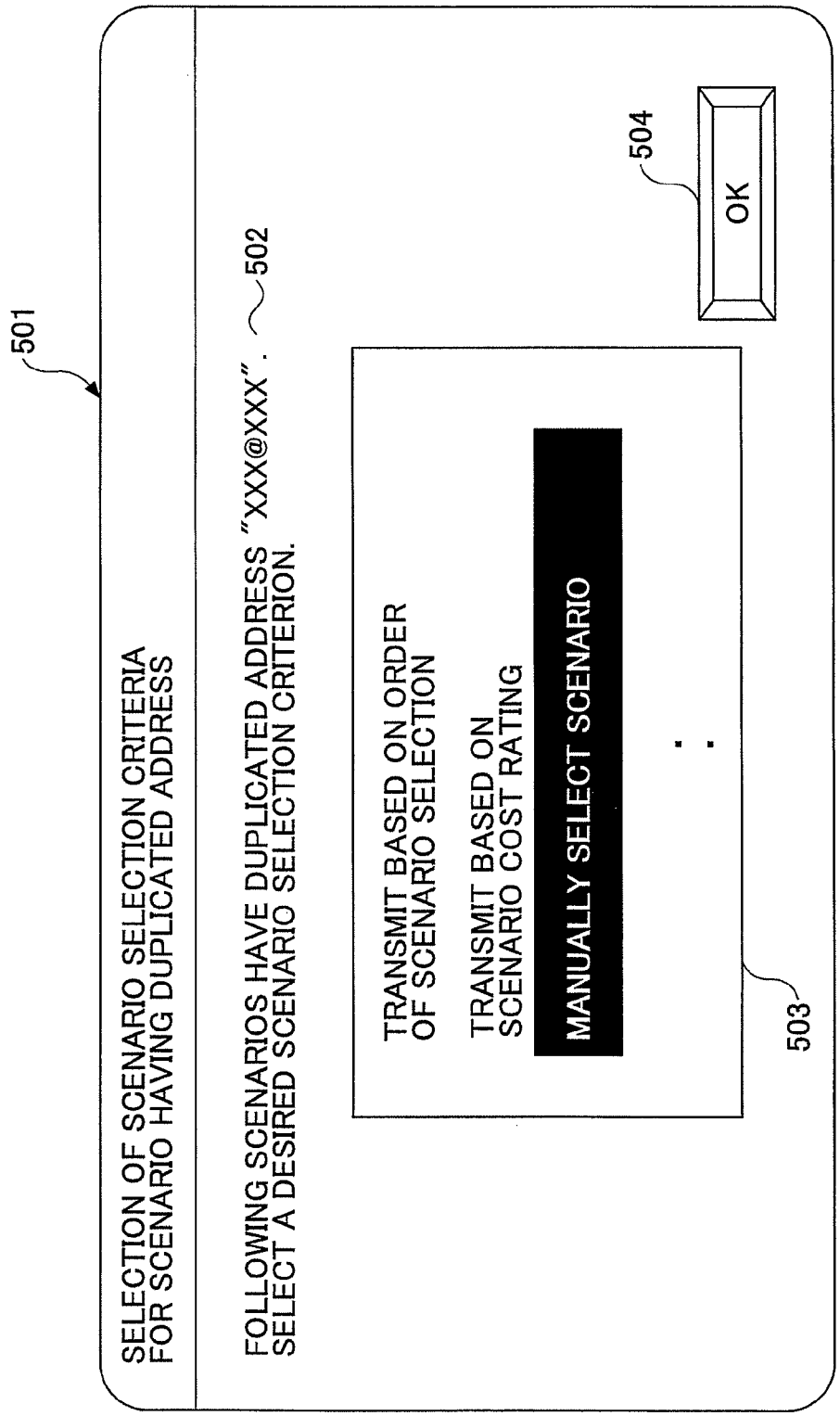
FIG. 26 is a diagram illustrating an example of a screen for setting a scenario selection criterion when the delivery destination information is duplicated in the scenarios.

FIG. 26 is a diagram illustrating an example of a screen 501 for setting a scenario selection criterion when the delivery destination information is duplicated in the plural scenarios. The scenario selection criterion setting section 315 receives a series of operations (i.e., pressing of the "system configuration" key, selecting one of the tabs of the display screen), and displays the screen 501 illustrated in FIG. 26 on the operations panel 57. As illustrated in FIG. 26, the scenario selection screen 501 displays a message 502 "the following scenarios have the duplicated address "XXX@xxx". Select a desired scenario selection criterion", a scenario selection criteria list 503, and an "OK" button 504. The scenario selection criteria list 503 includes "transmit based on order of scenario selection", "transmit based on scenario cost rating", and "manually select scenario" items.

When the "transmit based on order of scenario selection" item is selected, the scenario selection criterion setting section 315 activates the scenario selection order determination section 312. Similar to the third embodiment, the scenario selection order determination section 312 records the order of scenario selection determined by the user and, reports the order of scenario selection for the selected scenarios to the central-execution section 31. When the "transmit based on scenario cost rating" item is selected, the scenario selection criterion setting section 315 activates the scenario cost comparison section 312. Similar to the fourth embodiment, the scenario cost comparison section 313 assigns cost ratings for transmitting image data to the plural scenarios in ascending order of cost (i.e., from very low to very high), and reports the corresponding cost ratings assigned to the scenarios to the central-execution section 31. When the "user select scenario at transmission" item is selected, the scenario selection criterion setting section 315 activates the scenario selection content transmission section 314. Similar to the fifth embodiment, the scenario selection content transmission section 314 receives the selected result of the scenario determined by the user and reports the received selected result to the central-execution section 31.

The scenario selection criterion setting section 315 replaces the selected one of the scenario selection criteria with a flag or the like and stores the flag or the like. With this flag, the central-execution section 31 is able to detect a currently active scenario selection criterion.

Figure 27B:
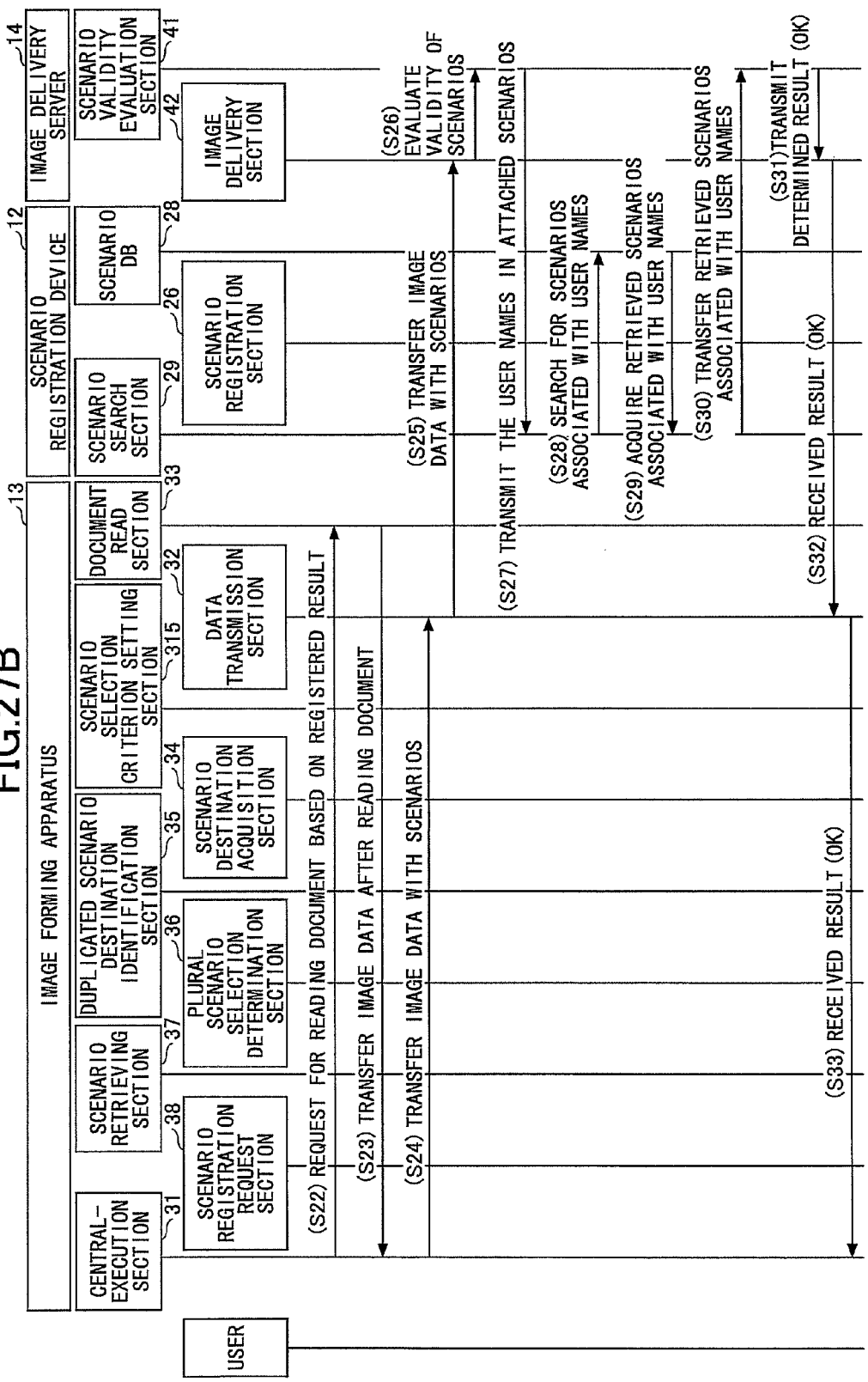

FIGS. 27A and 273 depict a sequence diagram illustrating an example of a procedure in which an image forming apparatus 13 selects one of scenarios based on the scenario selection criterion selected (set) by the user. Note that in FIGS. 27A and 27B, components identical to those of FIGS. 9A and 9B are provided with the same reference numerals and the descriptions thereof are omitted. Note that steps S1 through S15 of the sixth embodiment illustrated in FIGS. 27A and 273 are identical to those of the first to fifth embodiments. That is, one of the scenario selection criteria is already selected by the user before the processing illustrated in the sequence diagram of FIGS. 27A and 27B is initiated.

As illustrated in the first to the fifth embodiments, the duplicated scenario destination identification section 35 transfers all the selected scenarios that include the duplicated delivery destination information (obtained as a result of the query) to the central-execution section 31 (S15) as illustrated in FIGS. 27A and 27B.

The central-execution section 31 requests the scenario selection criterion setting section 315 to transmit a selected one of the scenario selection criteria set by the user (S501). The scenario selection criterion setting section 315 reports the currently selected one of the scenario selection criteria with the corresponding flag or the like to the central-execution section 31 (S502).

The central-execution section 31 acquires the scenario selection criterion selected by the user from the scenario selection criterion setting section 315 and selects one of the scenarios having duplicated delivery destination information based on the selected scenario selection criterion. That is, if the selected one of the scenario selection criteria determined by the user is the "transmit based on order of scenario selection", the central-execution section 31 requests the scenario selection order determination section 312 to provide the order of scenario selection (S201). If the selected one of the scenario selection criteria determined by the user is the "transmit based on scenario cost rating", the central-execution section 31 requests the scenario cost comparison section 313 to provide the cost ratings of scenarios in ascending order of cost (S301). If the selected one of the scenario selection criteria determined by the user is the "user select scenario at transmission", the central-execution section 31 requests the scenario selection content transmission section 314 to provide the selected result of the scenario determined by the user (S401). The corresponding processing for steps S201, S301, and S401 is the same as those described in the third, fourth, and fifth embodiments.

As described above, in the image forming apparatus utilization system 100 according to the sixth embodiment, the user is able to select a desired one of the scenario selection criteria. Accordingly, the usability of the image forming apparatus utilization system 100 according to the sixth embodiment for the user is much improved because the user is able to set any one of the scenario selection criteria of the third, fourth, and fifth embodiments in the image forming apparatus 13.

[Seventh Embodiment]

In the sixth embodiment, the user sets one of the scenario selection criteria in advance in a system initial configuration of the image forming apparatus if the plural scenarios include duplicated delivery destination information. However, in the sixth embodiment, once the scenario selection criterion selected is set in advance in the image forming apparatus 13, it is difficult to alter the selected scenario selection criterion after the image forming apparatus 13 has started the execution of the selected scenario. Thus, an image forming apparatus utilization system 100 according to a seventh embodiment is capable of allowing the user to set one of duplicated address scenario selection criteria in the image forming apparatus 13 after the image forming apparatus 13 has started the execution of the selected scenario. A description of the image forming apparatus utilization system 100 according to the seventh embodiment is given below.

Figure 28:
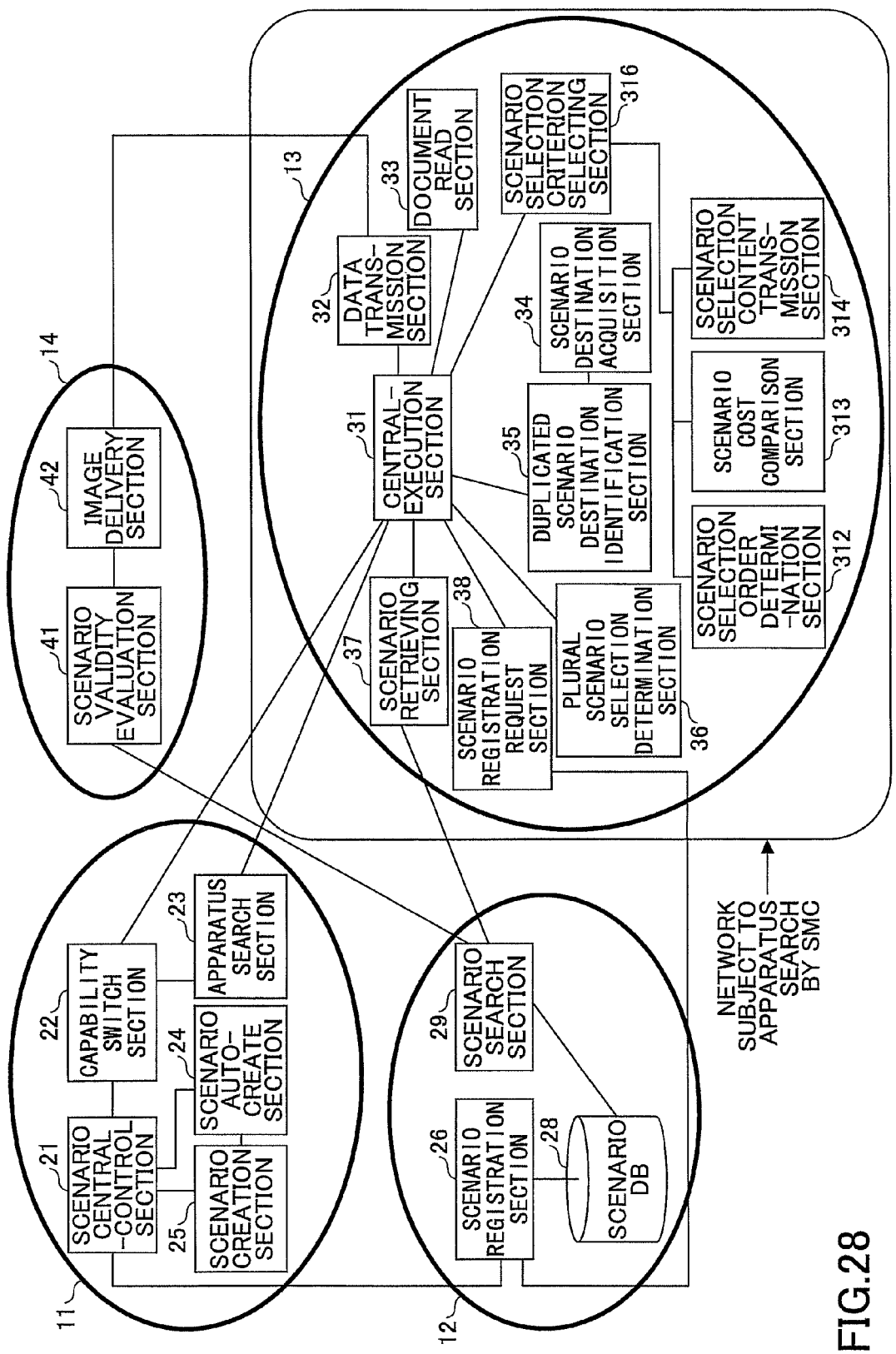
FIG. 28 is a block diagram illustrating an example of functional components of the image forming utilization system according to a seventh embodiment.

FIG. 28 is a block diagram illustrating an example of functional components of the image forming utilization system 100 according to the seventh embodiment. As illustrated in FIG. 28, components identical to those of FIG. 25 are provided with the same reference numerals and the descriptions thereof are omitted. In the image forming apparatus utilization system 100 according to the seventh embodiment, the image forming apparatus 13 includes a scenario selection criterion selecting section 316 (scenario selection criterion reception unit). The scenario selection criterion selecting section 316 is connected to the scenario selection order determination section 312, the scenario cost comparison section 313, and the scenario selection content transmission section 314. The scenario selection criterion selecting section 316 displays a list of scenario selection criteria including the "order of scenario selection", the "scenario cost rating", and the "selected result determined by the user" for selecting one of the scenarios on the operations panel 57. When the user select one of the scenario selection criteria, the scenario selection criterion selecting section 316 dynamically activates a corresponding one of the scenario selection order determination section 312, the scenario cost comparison section 313, and the scenario selection content transmission section 314 based on the selected result (i.e., selected scenario selection criterion) determined by the user.

Figure 29B:
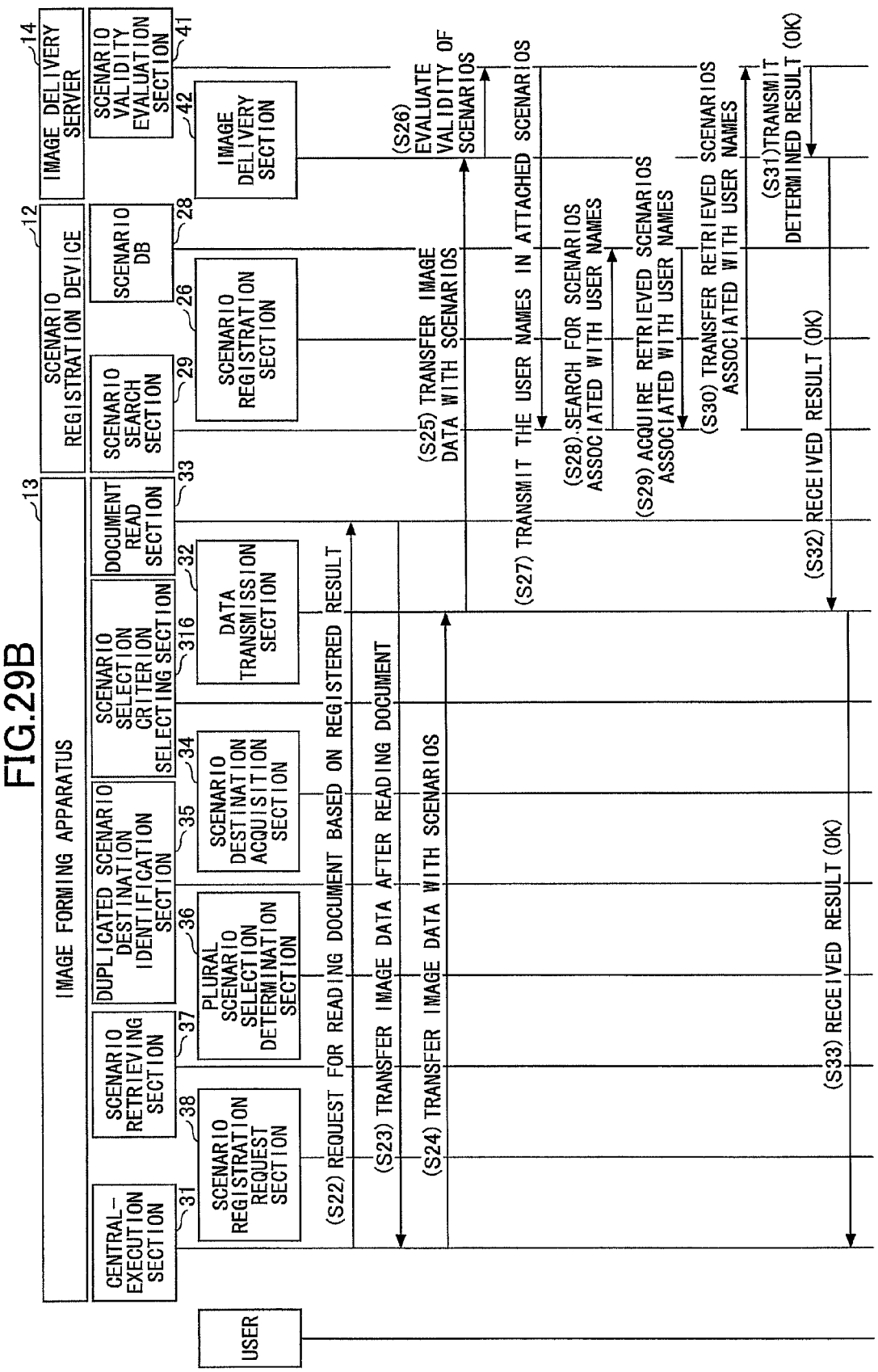

FIGS. 29A and 29B depict a sequence diagram illustrating an example of a procedure in which an image forming apparatus 13 selects one of scenarios based on the scenario selection criterion selected (set) by the user. Note that in FIGS. 29A and 29B, components identical to those of FIGS. 9A and 9B are provided with the same reference numerals and the descriptions thereof are omitted.

Note that steps S1 through S15 of the seventh embodiment illustrated in FIGS. 29A and 29B are identical to those of the first to fifth embodiments. As illustrated in the first to fifth embodiments, the duplicated scenario destination identification section 35 transfers all the selected scenarios that include the duplicated delivery destination information (obtained as a result of the query) to the central-execution section 31 (S15) as illustrated in FIGS. 29A and 29B.

Figure 30:
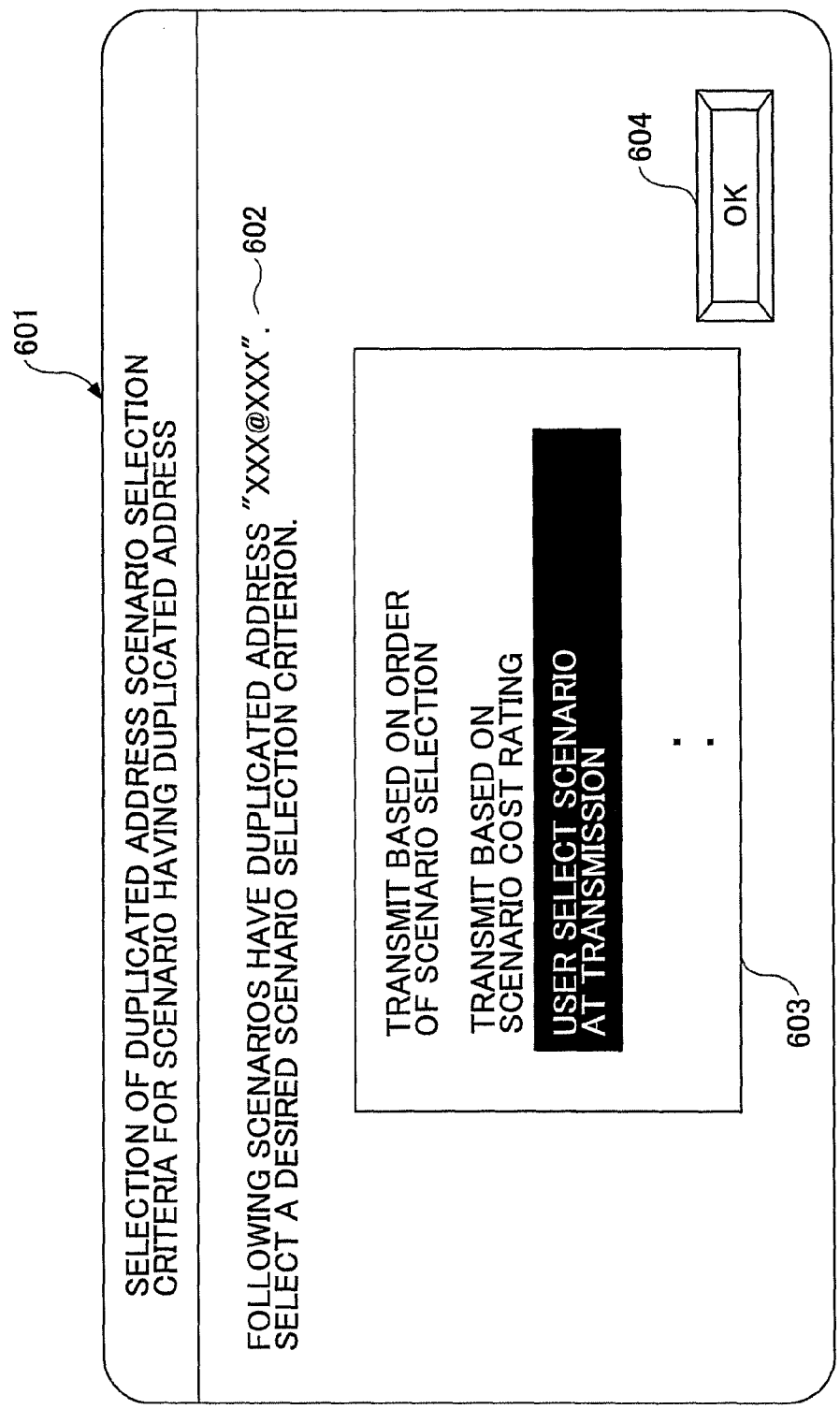
FIG. 30 is a diagram illustrating an example of a scenario determination basis selection screen displayed on an operations panel.

The central-execution section 31 requests the scenario selection criterion selecting section 316 to display a duplicated address scenario selection criterion selection screen 601 (see FIG. 30) on the operations panel 57 (S601). The scenario selection criterion selecting section 316 displays the scenario selection criterion selection screen 601 on the operations panel 57 (S602). FIG. 30 is a diagram illustrating an example of the duplicated scenario selection criterion selection screen 601 displayed on the operations panel 57.

The duplicated address scenario selection criterion selection screen 601 displays a message 602 "the selected scenarios have the duplicated address "XXX@xxx". Select a desired scenario selection criterion", a scenario selection criteria list 603, and an "OK" button 604. The scenario selection criteria list 603 includes "transmit based on order of scenario selection", "transmit based on scenario cost rating", and "transmit based on scenario manually selected by user" items.

The user selects any of the items of the scenario selection criteria list 603. The scenario selection criterion selecting section 316 receives a selected result determined by the user (S603). When the "transmit based on order of scenario selection" item is selected, the scenario selection criterion selecting section 316 activates the scenario selection order determination section 312. Similar to the third embodiment, the scenario selection order determination section 312 records the order of scenario selection determined by the user and reports the order of scenario selection for the selected scenarios to the central-execution section 31 (S604). The central-execution section 31 selects one of the scenarios based on the order of scenario selection.

When the "transmit based on scenario cost rating" item is selected, the scenario selection criterion selecting section 316 activates the scenario cost comparison section 313. Similar to the fourth embodiment, the scenario cost comparison section 313 assigns cost ratings for transmitting image data to the plural scenarios in ascending order of cost (i.e., from very low to very high), and reports the corresponding cost ratings assigned to the scenarios to the central-execution section 31 (S604). The central-execution section 31 selects one of the scenarios based on the cost ratings of the scenarios.

Further, when the "user select scenario at transmission" item is selected, the scenario selection criterion selecting section 316 activates the scenario selection content transmission section 314. Similar to the fifth embodiment, the scenario selection content transmission section 314 displays a list of the scenarios reported by the central-execution section 31 on the operations panel 57 so that the user can select a desired one of the scenarios. That is, a screen displays a list of scenarios similar to that in FIG. 24 on an operations panel. When the user selects one of the scenarios from the scenario list, the scenario selection content transmission section 314 receives the selected scenario. The scenario selection content transmission section 314 reports the received scenario (i.e., selected result determined by the user) to the central-execution section 31 (S604). Subsequent processing (i.e., steps) is the same as those described in the third, fourth, and fifth embodiments.

As described above, in the image forming apparatus utilization system 100 according to the seventh embodiment, the user is able to select a desired one of the scenario selection criteria. Accordingly, the usability of the image forming apparatus utilization system 100 according to the seventh embodiment for the user is much improved because the user is able to dynamically set any one of the scenario selection criteria of the third, fourth, and fifth embodiments to the image forming apparatus 13 while the scenarios are being executed.

According to the first to seventh embodiments, there are provided the image forming apparatus having an excellent user-friendly interface capable of facilitating a user's understanding of a relationship between destinations and processing conditions for image data when plural processing conditions are selected in the directory service, the image forming utilization system and the method for generating image data in the image forming apparatus.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

What is claimed is:

1. An image forming apparatus comprising:
    an acquisition unit configured to acquire a plurality of combinations of document reading settings and delivery destination information of image data from a storage device configured to store the plurality of combinations;
    a reception unit configured to display the plurality of combinations acquired by the acquisition unit and receive a selection of the plurality of combinations by a user;
    a duplication identification unit configured to determine, upon the reception unit receiving the selection, whether the selected plurality of combinations contain duplicated delivery destination information; and
    a control unit configured to control, upon the duplication identification unit determining that the selected plurality of combinations selected contain the duplicated delivery destination information, a transmission of image data such that the image data is transmitted once to a delivery destination corresponding to the duplicated delivery destination information.

2. The image forming apparatus as claimed in claim 1, further comprising:
    a selection order identification unit configured to determine a selection order of the plurality of combinations selected by the user upon the reception unit receiving the selection, wherein
    the control unit controls the transmission of image data such that the image acquired based on the document reading setting included in one of the plurality of combinations containing the duplicated delivery destination information is transmitted to the delivery destination, the selection order of the one of the plurality of combinations being determined by the selection order identification unit as an earliest order.

3. The image forming apparatus as claimed in claim 1, further comprising:
    a cost computation unit configured to compute a cost of the transmission of image data based on the plurality of combinations of document reading settings upon the image data being transmitted to the delivery destination, wherein
    the control unit controls the transmission of image data such that the image data acquired based on the document reading setting included in one of the plurality of combinations containing the duplicated delivery destination information is transmitted to the delivery destination, the document reading setting of the one of the plurality of combinations implementing a lowest cost of the transmission of image data computed by the cost computation unit.

4. The image forming apparatus as claimed in claim 1, further comprising:
    a selection reception unit configured to receive a selection of one of the plurality of combinations containing the duplicated delivery destination information, wherein
    the control unit controls transmission of image data such that the image data acquired based on the document reading setting contained in the selected one of the plurality of combinations is transmitted to the delivery destination.

5. The image forming apparatus as claimed in claim 1, further comprising:
    a determination standard reception unit configured to receive a determination standard for determining one of the plurality of combinations containing the duplicated delivery destination information, wherein
    the control unit determines one of the plurality of combinations containing the duplicated delivery destination information based on the determination standard received by the determination standard reception unit, and controls the transmission of image data such that the image data acquired based on the document reading setting contained in the determined combination is transmitted to the delivery destination.

6. The image forming apparatus as claimed in claim 5, wherein
    the determination standard is one of the selection order upon the reception unit receiving the selection of the plurality of combinations, an ascending order of a cost of the transmission of image data to the delivery destination computed based on the plurality of combinations of document reading settings, and an assignment of a priority to the plurality of combinations selected by the user.

7. The image forming apparatus as claimed in claim 5, further comprising:
    a transmission unit configured to transmit the image data and the delivery destination information to an image delivery apparatus based on the delivery destination information.

8. A system comprising:
    the image forming apparatus as claimed in claim 1 configured to read a document to generate image data;
    a storage device configured to store a plurality of combinations of document reading settings and delivery destination information of the image data; and
    an image delivery apparatus configured to deliver the image data, the image forming apparatus, the storage device, and the image delivery apparatus being connected via a network.

9. The system as claimed in claim 8, wherein the image forming apparatus further comprises:
    a selection order identification unit configured to determine a selection order of the plurality of combinations selected by the user upon the reception unit receiving the selection, wherein
    the control unit controls the transmission of image data such that the image acquired based on the document reading setting included in one of the plurality of combinations containing the duplicated delivery destination information is transmitted to the delivery destination, the selection order of the one of the plurality of combinations being determined by the selection order identification unit as an earliest order.

10. The system as claimed in claim 8, wherein the image forming apparatus further comprises:
    a cost computation unit configured to compute a cost of the transmission of image data based on the plurality of combinations of document reading settings upon the image data being transmitted to the delivery destination, wherein
    the control unit controls transmission of the image data such that the image data acquired based on the document reading setting included in one of the plurality of combinations containing the duplicated delivery destination information is transmitted to the delivery destination, the document reading setting of the one of the combinations implementing a lowest cost of the transmission of image data computed by the cost computation unit.

11. The system as claimed in claim 8, wherein the image forming apparatus further comprises:
a selection reception unit configured to receive a selection of one of the plurality of combinations containing the duplicated delivery destination information, wherein
the control unit controls the transmission of image data such that the image data acquired based on the document reading setting contained in the selected one of the plurality of combinations is transmitted to the delivery destination.

12. The system as claimed in claim 8, wherein the image forming apparatus further comprises:
a determination standard reception unit configured to receive a determination standard for determining one of the plurality of combinations containing the duplicated delivery destination information, wherein
the control unit determines one of the plurality of combinations containing the duplicated delivery destination information based on the determination standard received by the determination standard reception unit, and controls the transmission of image data such that the image data acquired based on the document reading setting contained in the determined combination is transmitted to the delivery destination.

13. A method comprising:
acquiring, using an image forming apparatus, a plurality of combinations of document reading settings and delivery destination information of image data from a storage device configured to store the plurality of combinations;
displaying, using the image forming apparatus, the plurality of combinations acquired by the image forming apparatus and receive a selection of the plurality of combinations by a user;
determining, using the image forming apparatus, whether a selection, by a user, of the plurality of selected combinations contain duplicated delivery destination information upon the image forming apparatus receiving the selection; and
controlling, using the image forming apparatus, a transmission of image data such that the image data is transmitted once to a delivery destination corresponding to the duplicated delivery destination information upon the image forming apparatus determining that the selection contain the duplicated delivery destination information.

14. The method as claimed in claim 13, further comprising:
determining, using the image forming apparatus, a selection order of the plurality of combinations selected by the user upon the reception unit receiving the selection, wherein
the controlling of the transmission of image data is such that the image acquired based on the document reading setting included in one of the plurality of combinations containing the duplicated delivery destination information is transmitted to the delivery destination, the selection order of the one of the plurality of combinations being determined as an earliest order.

15. The method as claimed in claim 13, further comprising:
computing, using the image forming apparatus, a cost of the transmission of image data based on the plurality of combinations of document reading settings upon the image data being transmitted to the delivery destination, wherein
the controlling of the transmission of image data is such that the image data acquired based on the document reading setting included in one of the plurality of combinations containing the duplicated delivery destination information is transmitted to the delivery destination, the document reading setting of the one of the plurality of combinations implementing a lowest computed cost of the transmission of image data.

16. The method as claimed in claim 13, further comprising:
receiving, using the image forming apparatus, a selection of one of the plurality of combinations containing the duplicated delivery destination information, wherein
the controlling of the transmission of image data is such that the image data acquired based on the document reading setting contained in the selected one of the plurality of combinations is transmitted to the delivery destination.

17. The method as claimed in claim 13, further comprising:
receiving, using the image forming apparatus, a determination standard for determining one of the plurality of combinations containing the duplicated delivery destination information, wherein
the controlling of the transmission of image data is such that the image data acquired based on the document reading setting contained in the determined combination is transmitted to the delivery destination upon determining that one of the plurality of combinations containing the duplicated delivery destination information based on the determination standard is received by the image forming apparatus.

18. The method as claimed in claim 17, wherein the determination standard is one of the selection order of upon the reception unit receiving the selection of the plurality of combinations, an ascending order of a cost of the transmission of image data to the delivery destination computed based on the plurality of combinations of document reading settings, and an assignment of a priority to the plurality of combinations selected by the user.

19. The method as claimed in claim 18, further comprising:
transmitting, using the image forming apparatus, the image data and the delivery destination information to an image delivery apparatus based on the delivery destination information.

20. An image forming apparatus comprising:
an acquisition unit configured to acquire a plurality of combinations of document reading settings and delivery destination information of image data from a storage device configured to store the plurality of combinations;
a reception unit configured to display the plurality of combinations acquired by the acquisition unit and receive a selection of the plurality of combinations by a user;
a selection order identification unit configured to determine a selection order of the plurality of combinations selected by the user upon the reception unit receiving the selection;
a duplication identification unit configured to determine, upon the reception unit receiving the selection, whether the selected plurality of combinations contain duplicated delivery destination information; and
a control unit configured to,
control, upon the duplication identification unit determining that the selected plurality of combinations selected contain the duplicated delivery destination information, a transmission of image data such that the image data is transmitted once to a delivery destination corresponding to the duplicated delivery destination information, and control the transmission of image data such that the image acquired based on the document reading setting included in one of the plurality of combinations containing the duplicated delivery destination information is transmitted to the delivery destination, the selection order of the one of the plurality of combinations being determined by the selection order identification unit as an earliest order.

* * * * *

UNITED STATES PATENT AND TRADEMARK OFFICE
CERTIFICATE OF CORRECTION

| | | |
|---|---|---|
| PATENT NO. | : 8,570,582 B2 | Page 1 of 1 |
| APPLICATION NO. | : 13/675746 | |
| DATED | : October 29, 2013 | |
| INVENTOR(S) | : Osamu Torii and Hiroki Hiraguchi | |

It is certified that error appears in the above-identified patent and that said Letters Patent is hereby corrected as shown below:

On the Title Page

(73) Assignee should read: Ricoh Company, Ltd., Toyko (JP)

Signed and Sealed this
Twenty-fifth Day of March, 2014

Michelle K. Lee
*Deputy Director of the United States Patent and Trademark Office*